United States Patent
Yang et al.

(10) Patent No.: US 10,178,676 B2
(45) Date of Patent: Jan. 8, 2019

(54) DATA TRANSMISSION METHOD, DEVICE, AND SYSTEM

(71) Applicant: HUAWEI TECHNOLOGIES CO., LTD., Shenzhen (CN)

(72) Inventors: Anquan Yang, Chengdu (CN); Wei Li, Toronto (CA); Xunlin Xu, Chengdu (CN); Sha Yang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 117 days.

(21) Appl. No.: 15/221,945

(22) Filed: Jul. 28, 2016

(65) Prior Publication Data

US 2016/0338066 A1 Nov. 17, 2016

Related U.S. Application Data

(63) Continuation of application No. PCT/CN2014/071824, filed on Jan. 29, 2014.

(51) Int. Cl.
*H04W 72/10* (2009.01)
*H04W 72/04* (2009.01)
(Continued)

(52) U.S. Cl.
CPC ....... *H04W 72/0466* (2013.01); *H04L 1/1812* (2013.01); *H04L 1/1822* (2013.01);
(Continued)

(58) Field of Classification Search
CPC ........... H04W 52/146; H04W 72/0413; H04W 52/48; H04W 72/04; H04W 48/12;
(Continued)

(56) References Cited

U.S. PATENT DOCUMENTS 8,472,368 B2 * 6/2013 Baldemair ............ H04L 5/0053
370/318
9,402,252 B2 * 7/2016 Kim .................... H04B 7/0413
(Continued)

FOREIGN PATENT DOCUMENTS

CN 102355733 A 2/2012
CN 102468945 A 5/2012
(Continued)

OTHER PUBLICATIONS

International Search Report dated Nov. 26, 2014 in corresponding International Application No. PCT/CN2014/071824.
(Continued)

*Primary Examiner* — Raj Jain
(74) *Attorney, Agent, or Firm* — Staas & Halsey LLP

(57) ABSTRACT

The present invention provides a data transmission method, device, and system, which relate to the communications field and can improve data transmission efficiency. The method includes: sending, by a secondary base station, first information to a primary base station, where the first information includes one of the number x of first PUCCH code channel resources, the number x of first data blocks sent by the secondary base station to a user equipment UE, and a first channel code word; sending, by the secondary base station, identifiers of the x first PUCCH code channel resources and the x first data blocks to the UE; and receiving, by the secondary base station, a feedback from the primary base station, where the feedback is received by the primary base station from the UE by using the first PUCCH code channel resource.

23 Claims, 28 Drawing Sheets

(51) Int. Cl.
  *H04L 1/18* (2006.01)
  *H04W 16/32* (2009.01)
(52) U.S. Cl.
  CPC .......... *H04L 1/1874* (2013.01); *H04L 1/1896* (2013.01); *H04W 72/04* (2013.01); *H04W 72/042* (2013.01); *H04W 72/0413* (2013.01); *H04W 72/0426* (2013.01); *H04W 72/10* (2013.01); *H04W 16/32* (2013.01)
(58) Field of Classification Search
  CPC .. H04W 72/1284; H04L 5/001; H04L 5/0073; H04L 1/0003; H04L 1/0026
  See application file for complete search history.

(56) References Cited

U.S. PATENT DOCUMENTS

| | | | |
|---|---|---|---|
| 2013/0182676 A1 | 7/2013 | Lee et al. | |
| 2013/0242913 A1* | 9/2013 | Lan | H04L 5/001 370/329 |
| 2013/0259011 A1* | 10/2013 | Nakashima | H04W 72/0473 370/336 |
| 2013/0343238 A1* | 12/2013 | Seo | H04L 5/001 370/280 |
| 2014/0204811 A1 | 7/2014 | Lu et al. | |
| 2014/0269575 A1 | 9/2014 | Zhang et al. | |
| 2015/0085774 A1 | 3/2015 | Lin et al. | |
| 2015/0092750 A1 | 4/2015 | Huang et al. | |
| 2015/0117342 A1* | 4/2015 | Loehr | H04W 72/1284 370/329 |
| 2015/0305016 A1 | 10/2015 | Dai et al. | |
| 2016/0007300 A1* | 1/2016 | Suzuki | H04W 52/50 370/329 |
| 2016/0050059 A1 | 2/2016 | Guan et al. | |
| 2016/0081113 A1 | 3/2016 | Li et al. | |
| 2016/0338066 A1* | 11/2016 | Yang | H04L 1/1874 |

FOREIGN PATENT DOCUMENTS

| | | |
|---|---|---|
| CN | 102469610 A | 5/2012 |
| CN | 102651680 A | 8/2012 |
| CN | 103139911 A | 6/2013 |
| CN | 103166745 A | 6/2013 |
| CN | 103188792 A | 7/2013 |
| CN | 103368715 A | 10/2013 |
| CN | 103517355 A | 1/2014 |
| EP | 2 621 233 A1 | 7/2013 |
| WO | 2012/142973 A1 | 10/2012 |
| WO | 2013/023555 A1 | 2/2013 |
| WO | 2013/170472 A1 | 11/2013 |
| WO | 2013/182228 A1 | 12/2013 |

OTHER PUBLICATIONS

International Search Report and Written Opinion dated Nov. 26, 2014 in corresponding International Patent Application No. PCT/CN2014/071824.
Chinese Office Action dated Oct. 9, 2016 in corresponding Chinese Patent Application No. 201480000352.5.
Extended European Search Report dated Dec. 15, 2016 in corresponding European Patent Application No. 14880751.4.
"3rd Generation Partnership Project; Technical Specification Group Radio Access Network; Evolved Universal Terrestrial Radio Access (E-UTRA); Physical layer procedures (Release 12)", 3GPP TS 36.213 V12.0.0, 3GPP Organizational Partners, Dec. 2013, Valbonne, France, pp. 1-186.
"3rd Generation Partnership Project; Technical Specification Group Radio Access Network; Evolved Universal Terrestrial Radio Access (E-UTRA); Multiplexing and channel coding (Release 12)", 3GPP TS 36.212 V12.0.0, 3GPP Organizational Partners, Dec. 2013, Valbonne, France, pp. 1-88.

* cited by examiner

DATA TRANSMISSION METHOD, DEVICE, AND SYSTEM

CROSS-REFERENCE TO RELATED APPLICATIONS

This application is a continuation of International Application No. PCT/CN2014/071824 filed on Jan. 29, 2014, which is incorporated herein by reference in its entirety.

TECHNICAL FIELD

The present invention relates to the communications field, and in particular, to a carrier aggregation data transmission method, device, and system.

BACKGROUND

In the CA (Carrier Aggregation, carrier aggregation) technology, multiple continuous or discontinuous carriers are aggregated into greater bandwidth (100 MHz at most), so as to satisfy a requirement for a higher rate and improve utilization of discrete spectrum.

As an important evolution solution, a HetNet (Heterogeneous Network, heterogeneous network) implements accurate coverage of a mobile communications network, which notably improves network performance, and brings better voice and mobile data service experience to a user. A network side of the HetNet may include a core network, a transmission network, and a base station; user equipments communicating with the network include a UE (User Equipment, user equipment) having a CA capability and a UE not having a CA capability.

Using the UE having a CA capability as an example, when the HetNet transmits data in a CA manner, an EPC (Evolved Packet Core, evolved packet core) network delivers data information to the UE by using both a primary base station and a secondary base station, and the UE needs to send a feedback to the primary base station, where the feedback is used for indicating receiving situations of the data information delivered by the primary base station and/or the secondary base station. In the prior art, the secondary base station allocates PDSCH (Physical Downlink Shared Channel, physical downlink shared channel) and PDCCH (Packet Data Control Channel, packet data control channel) resources to the UE, and requests, from the primary base station, a data block to be sent to the UE; after receiving the data block delivered by the primary base station, the secondary base station determines an identifier of a PUCCH (Physical Uplink Control CHannel, physical uplink control channel) code channel resource; the secondary base station sends the identifier of the PUCCH code channel resource to the primary base station, and meanwhile sends the data block and the identifier of the PUCCH code channel resource to the UE; the UE sends a feedback for the data block on a corresponding PUCCH code channel resource according to the identifier of the PUCCH code channel resource; the primary base station may demodulate the feedback after receiving the feedback on a corresponding PUCCH code channel according to the identifier of the PUCCH code channel resource. Feedbacks obtained by means of the demodulation may include two types: an NACK (Negative Acknowledgement, negative acknowledgement) and an ACK (Acknowledgement, acknowledgement), and the secondary base station needs to perform HARQ (Hybrid Automatic Repeat Request, hybrid automatic repeat request) retransmission on data corresponding to the NACK. However, transmission efficiency in the foregoing data transmission process is relatively low.

SUMMARY

Embodiments of the present invention provide a data transmission method, device, and system, which can improve data transmission efficiency.

To achieve the foregoing objective, the following technical solutions are used in the embodiments of the present invention.

A first aspect provides a data transmission method, including:

sending, by a secondary base station, first information to a primary base station, where the first information includes one of the number x of first physical uplink control channel PUCCH code channel resources, the number x of first data blocks sent by the secondary base station to a user equipment UE, and a first channel code word, so that the primary base station determines identifiers of the x first PUCCH code channel resources and the x first data blocks, where the first PUCCH code channel resource is used for sending a feedback for the first data block to the primary base station by the UE, and the first channel code word is a channel code word corresponding to the x first data blocks;

receiving, by the secondary base station, the identifiers of the x first PUCCH code channel resources and the x first data blocks that are sent by the primary base station:

sending, by the secondary base station, the identifiers of the x first PUCCH code channel resources and the x first data blocks to the UE; and receiving, by the secondary base station, the feedback from the primary base station, where the feedback is received by the primary base station from the UE by using the first PUCCH code channel resource, where the secondary base station serves a secondary component carrier of the UE, and the primary base station serves a primary component carrier of the UE.

A second aspect provides a data transmission method, including:

receiving, by a primary base station, first information sent by a secondary base station, where the first information includes one of the number x of first physical uplink control channel PUCCH code channel resources, the number x of first data blocks sent by the secondary base station to a user equipment UE, and a first channel code word, the first PUCCH code channel resource is used for sending a feedback for the first data block to the primary base station by the UE, and the first channel code word is a channel code word corresponding to the x first data blocks:

sending, by the primary base station, identifiers of the x first PUCCH code channel resources and the x first data blocks to the secondary base station, so that the secondary base station sends the identifiers of the x first PUCCH code channel resources and the x first data blocks to the UE:

receiving, by the primary base station by using the first PUCCH code channel resource, the feedback sent by the UE; and sending, by the primary base station, the feedback to the secondary base station, where the secondary base station serves a secondary component carrier of the UE, and the primary base station serves a primary component carrier of the UE.

A third aspect provides a base station, including a sending unit and a receiving unit, where the sending unit is configured to send first information to a first base station, where the first information includes one of the number x of first physical uplink control channel PUCCH code channel resources, the number x of first data blocks sent by the base station to a user equipment UE, and a first channel code word, so that the first base station determines identifiers of the x first PUCCH code channel resources and the x first data blocks, where the first PUCCH code channel resource is used for sending a feedback for the first data block to the first base station by the UE, and the first channel code word is a channel code word corresponding to the x first data blocks;

the receiving unit is configured to receive the identifiers of the x first PUCCH code channel resources and the x first data blocks that are sent by the first base station;

the sending unit is further configured to send the identifiers of the x first PUCCH code channel resources and the x first data blocks to the UE; and the receiving unit is further configured to receive the feedback from the first base station, where the feedback is received by the first base station from the UE by using the first PUCCH code channel resource, where the base station serves a secondary component carrier of the UE, and the first base station serves a primary component carrier of the UE.

A fourth aspect provides a base station, including a receiving unit and a sending unit, where the receiving unit is configured to receive first information sent by a second base station, where the first information includes one of the number x of first physical uplink control channel PUCCH code channel resources, the number x of first data blocks sent by the second base station to a user equipment UE, and a first channel code word, the first PUCCH code channel resource is used for sending a feedback for the first data block to the base station by the UE, and the first channel code word is a channel code word corresponding to the x first data blocks:

the sending unit is configured to send identifiers of the x first PUCCH code channel resources and the x first data blocks to the second base station, so that the second base station sends the identifiers of the x first PUCCH code channel resources and the x first data blocks to the UE:

the receiving unit is further configured to receive, by using the first PUCCH code channel resource, the feedback sent by the UE; and the sending unit is further configured to send the feedback to the second base station, where the second base station serves a secondary component carrier of the UE, and the base station serves a primary component carrier of the UE.

A fifth aspect provides a base station, including a bus, and a memory and a processor that are connected by using the bus, where the memory is configured to store a computer instruction, and the processor executes the computer instruction to:

send first information to a first base station, where the first information includes one of the number x of first physical uplink control channel PUCCH code channel resources, the number x of first data blocks sent by the base station to a user equipment UE, and a first channel code word, so that the first base station determines identifiers of the x first PUCCH code channel resources and the x first data blocks, where the first PUCCH code channel resource is used for sending a feedback for the first data block to the first base station by the UE, and the first channel code word is a channel code word corresponding to the x first data blocks:

receive the identifiers of the x first PUCCH code channel resources and the x first data blocks that are sent by the first base station:

send the identifiers of the x first PUCCH code channel resources and the x first data blocks to the UE; and receive the feedback from the first base station, where the feedback is received by the first base station from the UE by using the first PUCCH code channel resource, where the base station serves a secondary component carrier of the UE, and the first base station serves a primary component carrier of the UE.

A sixth aspect provides a base station, including a bus, and a memory and a processor that are connected by using the bus, where the memory is configured to store a computer instruction, and the processor executes the computer instruction to:

receive first information sent by a second base station, where the first information includes one of the number x of first physical uplink control channel PUCCH code channel resources, the number x of first data blocks sent by the second base station to a user equipment UE, and a first channel code word, the first PUCCH code channel resource is used for sending a feedback for the first data block to the base station by the UE, and the first channel code word is a channel code word corresponding to the x first data blocks;

send identifiers of the x first PUCCH code channel resources and the x first data blocks to the second base station, so that the second base station sends the identifiers of the x first PUCCH code channel resources and the x first data blocks to the UE;

receive, by using the first PUCCH code channel resource, the feedback sent by the UE; and send the feedback to the second base station, where the second base station serves a secondary component carrier of the UE, and the base station serves a primary component carrier of the UE.

A seventh aspect provides a data transmission system, including the base station provided in the third aspect and the base station provided in the fourth aspect.

An eighth aspect provides a data transmission system, including the base station provided in the fifth aspect and the base station provided in the sixth aspect.

In the data transmission method, device, and system provided in the present invention, a primary base station determines identifiers of x first PUCCH code channel resources, and a secondary base station sends the identifiers of the x first PUCCH code channel resources and x first data blocks to a UE; therefore, when the primary base station receives the identifiers of the first PUCCH code channel resources and the first data blocks, the primary base station has acquired a demodulation basis for feedbacks for the first data blocks, so that the primary base station can demodulate and forward the feedbacks in a timely manner, thereby improving data transmission efficiency.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

CA is a technology in which two or more carrier units are aggregated to support greater transmission bandwidth. In the embodiments of the present invention, a primary base station and a secondary base station are relative concepts, and are distinguished for a specific UE. The primary base station is a base station working on a primary component carrier, that is, the primary base station serves the primary component carrier of the UE, and the UE performs a connection establishment initialization process or a connection reestablishment starting process on the base station. The secondary base station is a base station working on a secondary component carrier, that is, the secondary base station serves the secondary component carrier of the UE, and once an RRC (Radio Resource Control, radio resource control) connection is established, the secondary base station can be configured to provide extra radio resources. The embodiments of the present invention are applicable to various communications systems and scenarios, for example, the primary base station may be a macro base station, and the secondary base station may be micro base station, and for another example, the communications systems may be systems corresponding to 3GPP R10 (3rd Generation Partnership Project Release 10, 3rd Generation Partnership Project Release 10).

Embodiment 1

Figure 1:
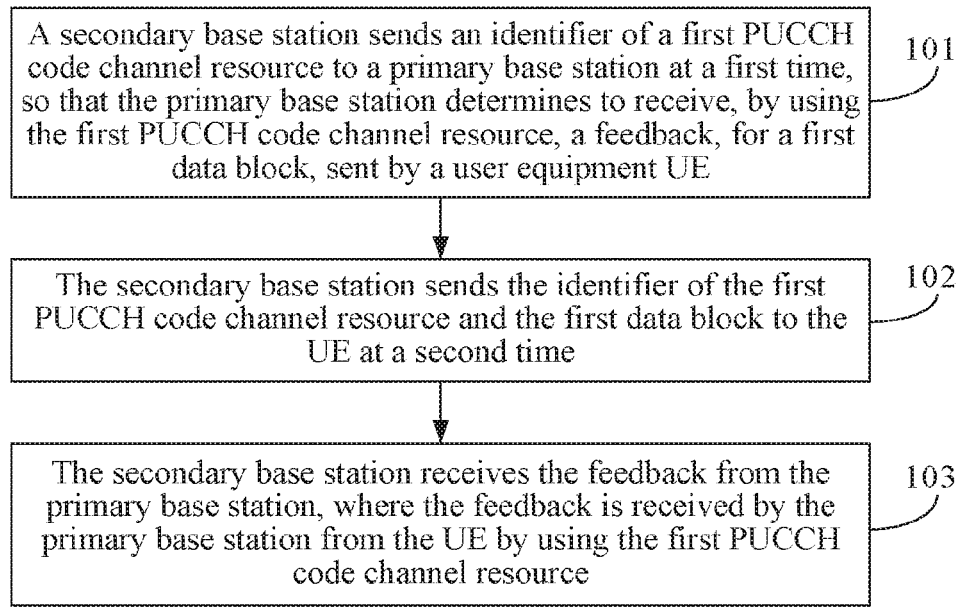
FIG. 1 is a schematic diagram of a data transmission method according to Embodiment 1 of the present invention.

This embodiment of the present invention provides a data transmission method, where the method is applicable to a communications system including a first base station, a second base station, and a UE, and both the first base station and the second base station can serve the UE. The following makes description by using an example in which the first base station is a primary base station of the UE, and the second base station is a secondary base station of the UE. As shown in FIG. 1, the method may include the following steps:

Step 101: The secondary base station sends an identifier of a first PUCCH code channel resource to the primary base station at a first time, so that the primary base station determines to receive, by using the first PUCCH code channel resource, a feedback, for a first data block, sent by the user equipment UE.

Step 102: The secondary base station sends the identifier of the first PUCCH code channel resource and the first data block to the UE at a second time.

Step 103: The secondary base station receives the feedback from the primary base station, where the feedback is received by the primary base station from the UE by using the first PUCCH code channel resource.

The second time is later than the first time, and an interval T between the second time and the first time is greater than or equal to one unidirectional inter-station transmission delay t between the secondary base station and the primary base station. The secondary base station serves a secondary component carrier of the UE, and the primary base station serves a primary component carrier of the UE.

Optionally, the unidirectional inter-station transmission delay t between the secondary base station and the primary base station satisfies the following formula:

$$t = t1 * A + B,$$

where t1 is a theoretical transmission delay between the primary base station and the secondary base station, A is a constant for adjusting t1, and B is an offset constant of t1.

In this way, because the secondary base station sends the identifier of the first PUCCH code channel resource to the primary base station at the first time, the primary base station receives the identifier of the first PUCCH code channel resource at an intermediate time between the first time and the second time, which ensures that, at the second time, that is, when the secondary base station sends the identifier of the first PUCCH code channel resource and the first data block to the UE, the primary base station has acquired a demodulation basis for the feedback for the first data block, so that the primary base station can demodulate and forward the feedback in a timely manner, thereby improving data transmission efficiency.

Optionally, in this embodiment, before the first time, the secondary base station determines x, where x is the number of first data blocks, and the secondary base station receives and temporarily stores a service sent by the primary base station; before the second time, the secondary base station acquires the x first data blocks from the temporarily stored service. For example, when a first condition is satisfied, the secondary base station acquires the x first data blocks from the temporarily stored service, or the secondary base station sends x to the primary base station, where the first condition may include: A priority of the UE is higher than a priority of another UE accessing the secondary base station. Further, the first condition may further include: A priority of the service is higher than a priority of a message that is sent by the secondary base station to the another UE accessing the secondary base station.

Optionally, in this embodiment, the method further includes: before the first time, determining, by the secondary base station, x, where x is the number of first data blocks; sending, by the secondary base station, x to the primary base station at the first time; and before the second time, receiving, by the secondary base station, the x first data blocks sent by the primary base station.

It may be understood that, in this embodiment, the secondary base station may perform different subsequent processing according to the feedback received in step 103, and the following makes description by using examples.

For example, the method further includes: if the feedback includes a negative acknowledgement NACK, retransmitting, by the secondary base station, retransmission data to the UE, where the retransmission data includes a data block, corresponding to the NACK, in the first data block; determining, by the secondary base station, whether the retransmission fails; and if the secondary base station determines that the retransmission fails, sending, by the secondary base station, information indicating that the retransmission fails and a sequence number corresponding to the retransmission data to the primary base station, where the information indicating that the retransmission fails is used for triggering the primary base station to retransmit the retransmission data to the UE.

For another example, if the secondary base station receives the feedback from the primary base station within a preset time period, and the feedback includes an NACK, the method further includes: retransmitting, by the secondary base station, retransmission data to the UE in an automatic repeat request ARQ manner, where the retransmission data includes a data block, corresponding to the NACK, in the first data block.

For still another example, if a first HARQ buffer and a second HARQ buffer are disposed in the secondary base station, the method further includes: if the feedback includes a negative acknowledgement NACK, and statuses of all HARQ processes in the first HARQ buffer are occupied states, retransmitting, by the secondary base station, retransmission data to the UE by using an HARQ process in the second HARQ buffer, where the retransmission data includes a data block, corresponding to the NACK, in the first data block. Optionally, process numbers of the HARQ processes in the first HARQ buffer may correspond to process numbers of HARQ processes in the second HARQ buffer in a one-to-one manner. Therefore, assuming that an HARQ process having a process number y in the first HARQ buffer is used for sending the first data block to the UE, the retransmitting, by the secondary base station, retransmission data to the UE by using an HARQ process in the second HARQ buffer includes the following two possible implementation manners:

First: If a status of an HARQ process having the process number y in the second HARQ buffer is an occupied state, the secondary base station retransmits the retransmission data to the UE by using another process in the second HARQ buffer, and sends a downlink scheduling authorization message to the UE, where the downlink scheduling authorization message carries an NDI value, the another process is different from the HARQ process having the process number y in the second HARQ buffer, a status of the another process is an idle state, and the NDI value is different from an NDI value previously sent by the secondary base station to the UE.

Second: If a status of an HARQ process having the process number y in the second HARQ buffer is an idle state, the secondary base station retransmits the retransmission data to the UE by using the HARQ process having the process number y in the second HARQ buffer, and sends a downlink scheduling authorization message to the UE, where the downlink scheduling authorization message carries an NDI value, and the NDI value is the same as an NDI value previously sent by the secondary base station to the UE.

Embodiment 2

Figure 2:
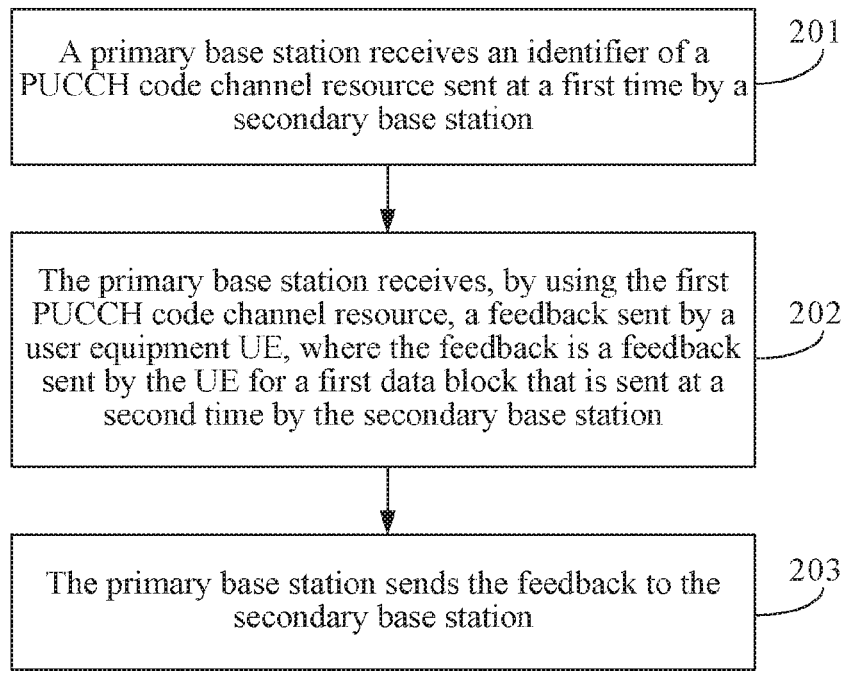
FIG. 2 is a schematic diagram of a data transmission method according to Embodiment 2 of the present invention.

This embodiment of the present invention provides a data transmission method, where the method is applicable to a communications system including a first base station, a second base station, and a UE, and both the first base station and the second base station can serve the UE. The following makes description by using an example in which the first base station is a primary base station of the UE, and the second base station is a secondary base station of the UE. As shown in FIG. 2, the method may include the following steps:

Step 201: The primary base station receives an identifier of a PUCCH code channel resource sent at a first time by the secondary base station.

Step 202: The primary base station receives, by using the first PUCCH code channel resource, a feedback sent by the user equipment UE, where the feedback is a feedback sent by the UE for a first data block that is sent at a second time by the secondary base station.

Step 203: The primary base station sends the feedback to the secondary base station.

The second time is later than the first time, and an interval T between the second time and the first time is greater than or equal to one unidirectional inter-station transmission delay t between the secondary base station and the primary base station. The secondary base station serves a secondary component carrier of the UE, and the primary base station serves a primary component carrier of the UE.

Optionally, the unidirectional inter-station transmission delay t between the secondary base station and the primary base station satisfies the following formula:

$t=t1*A+B,$ where t1 is a theoretical transmission delay between the primary base station and the secondary base station. A is a constant for adjusting t1, and B is an offset constant of t1.

In this way, before the second time, the primary base station receives the identifier of the first PUCCH code channel resource, which ensures that, at the second time, that is, when the secondary base station sends the identifier of the first PUCCH code channel resource and the first data block to the UE, the primary base station has acquired a demodulation basis for the feedback for the first data block, so that the primary base station can demodulate and forward the feedback in a timely manner, thereby improving data transmission efficiency.

Optionally, before the first time, the method further includes: receiving, by the primary base station, the identifier of the first physical uplink control channel PUCCH code channel resource sent at the first time by the secondary base station; receiving, by the primary base station by using the first PUCCH code channel resource, the feedback sent by the user equipment UE, where the feedback is the feedback sent by the UE for the first data block that is sent at the second time by the secondary base station; and sending, by the primary base station, the feedback to the secondary base station, where the second time is later than the first time, the interval T between the second time and the first time is greater than or equal to one unidirectional inter-station transmission delay t between the secondary base station and the primary base station, the secondary base station serves the secondary component carrier of the UE, and the primary base station serves the primary component carrier of the UE.

Further, before the first time, the method may further include: receiving, by the primary base station, a service bearer establishment request sent by the UE or a gateway, where the service bearer establishment request is used for requesting establishment of a service bearer among the UE, the gateway and the primary base station; and establishing, by the primary base station, a first Radio Link Control layer RLC layer logical channel and a second RLC layer logical channel, where the first RLC layer logical channel is used for transmission between the primary base station and the UE, and the second RLC layer logical channel is used for transmission between the primary base station and the secondary base station.

Furthermore, the method may further include: receiving, by the primary base station, a service sent by the gateway; before the first time, sending, by the primary base station by using the second RLC layer logical channel, a service whose service type is non-delay-sensitive data in the service to the secondary base station, or, receiving, by the primary base station, x sent at the first time by the secondary base station, where x is the number of first data blocks sent at the second time by the secondary base station to the UE; and before the second time, acquiring, by the primary base station, the x first data blocks from the service whose service type is non-delay-sensitive data in the service, and sending the x first data blocks to the secondary base station by using the second RLC layer logical channel.

Alternatively, furthermore, the method further includes: receiving, by the primary base station, a service sent by the gateway; determining, by the primary base station, a second PUCCH code channel resource, where the second PUCCH code channel resource is used for sending a feedback for a second data block to the primary base station by the UE; and sending, by the primary base station, an identifier of the second PUCCH code channel resource and the second data block to the UE by using the first RLC layer logical channel, where the second data block is a data block corresponding to a service whose service type is delay-sensitive in the service.

Optionally, in this embodiment, after the sending, by the primary base station, the feedback to the secondary base station, the method further includes: receiving, by the primary base station, information indicating that retransmission fails and a sequence number corresponding to retransmission data that are sent by the secondary base station, where the information indicating that the retransmission fails is sent by the secondary base station to the primary base station after the feedback includes an NACK and the secondary base station fails to retransmit the retransmission data to the UE; and retransmitting, by the primary base station, the retransmission data to the UE, where the retransmission data is a data block, corresponding to the NACK, in the first data block.

Embodiment 3

The following further describes, by using Embodiment 3 as an example, the methods provided in Embodiment 1 and Embodiment 2. In this embodiment of the present invention, when a data transmission system supporting CA needs to perform data transmission, a UE or a gateway that is on an EPC network may trigger establishment of a service bearer, where the service bearer is a service bearer among the UE, the gateway and a primary base station, and then service transmission is performed on a corresponding service bearer, for example, when a voice service is performed, the UE is a called party, and the gateway triggers the establishment of the service bearer; for another example, when the UE needs to download data, the UE triggers the establishment of the service bearer.

This embodiment of the present invention makes description by using the example in which the UE triggers the establishment of the service bearer. In addition, in this embodiment, it is assumed that a second time is later than a first time, an interval T between the second time and the first time is greater than or equal to one unidirectional inter-station transmission delay t between a secondary base station and the primary base station, the secondary base station serves a secondary component carrier of the UE, and the primary base station serves a primary component carrier of the UE. Optionally, t satisfies the following formula: t=t1*A+B, where t1 is a theoretical transmission delay between the primary base station and the secondary base station, A is a constant for adjusting t1, and B is an offset constant of t1. A unit oft may be ms.

Figure 3:
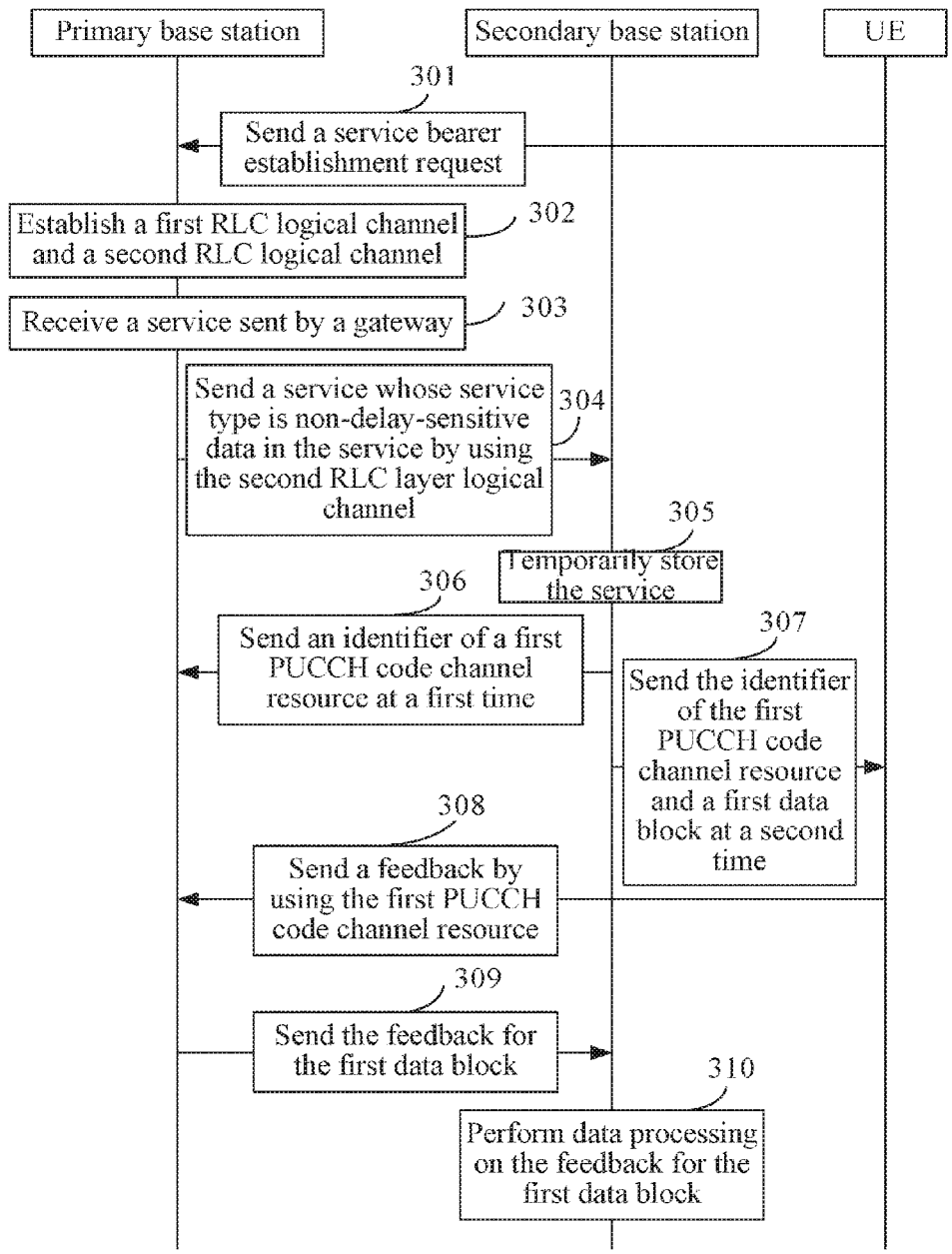
FIG. 3 is a schematic diagram of a data transmission method according to Embodiment 3 of the present invention.

This embodiment of the present invention provides a data transmission method. As shown in FIG. 3, the method includes:

Step 301: The UE sends a service bearer establishment request to the primary base station.

The service bearer establishment request is used for requesting establishment of a service bearer among the UE, the gateway and the primary base station. A process of establishing the service bearer is the same as that in the prior art, and no further details are provided in the present invention.

Step 302: The primary base station establishes a first Radio Link Control layer RLC (Radio Link Control, Radio Link Control) logical channel and a second RLC layer logical channel.

The first RLC layer logical channel is used for transmission between the primary base station and the UE, and the second RLC layer logical channel is used for transmission between the primary base station and the secondary base station. A wireless communications system such as a GPRS (General Packet Radio Service, general packet radio service technology), a WCDMA (Wideband Code Division Multiple Access, Wideband Code Division Multiple Access), a TD-SCDMA (Time Division-Synchronous Code Division Multiple Access, Time Division-Synchronous Code Division Multiple Access), or an LTE (Long Term Evolution, Long Term Evolution) wireless communications system includes an RLC layer. For example, in the WCDMA system, the RLC layer is located on a MAC (Medium/Media Access Control, Medium/Media Access Control) layer, and is used for ensuring sequential delivery of service data. In this embodiment of the present invention, the RLC layer logical channels (which may be briefly referred to as RLC logical channels) are located at the RLC layer, and is used for service transmission, connection control, traffic control, and the like. A function of the RLC layer is implemented by an RLC entity deployed on a base station.

Step 303: The primary base station receives a service sent by the gateway.

The service received by the primary base station is sent by the gateway on the EPC network, and a service type of the service may include at least one of a non-delay-sensitive data service and a delay-sensitive data service. The non-delay-sensitive data service refers to a data service not having a high requirement for a delay, for example, a data downloading service; the delay-sensitive data service refers to a service having a high requirement for a delay, for example, a real-time small packet service such as a signaling service or a voice service. The primary base station may determine the service type of the service by using at least one of a QCI (QoS Class Identifier, QoS class identifier) type, a service feature, a delay parameter, and the like; for a specific method, reference may be made to the prior art. The QCI is a service type distinguishing method in a standard protocol; QoS (Quality of Service, quality of service) is a security mechanism of a network, and is a technology used for solving problems such as network delay and congestion; the service feature includes a data volume, a data coding feature and the like; the delay parameter may be a PDB (Packet Delay Budget, packet delay budget).

Step 304: The primary base station sends a service whose service type is non-delay-sensitive data in the service to the secondary base station by using the second RLC layer logical channel.

Step 305: The secondary base station temporarily stores the service.

After receiving the service sent by the primary base station, the secondary base station may temporarily store the service locally, and in this embodiment, the service sent by the primary base station is a non-delay-sensitive data service.

In the prior art, an RLC entity (entity) of a data service is deployed on the primary base station; when the UE is scheduled, the secondary base station requests, from the primary base station, a data block that needs to be sent to the UE; after receiving the data block sent by the primary base station, the secondary base station sends the data block to the UE; therefore, the UE can receive the data block only after the UE waits for at least one unidirectional inter-station transmission delay (or referred to as duration between a time when one base station sends information to another base station and a time when the another base station receives the information) between the secondary base station and the primary base station.

Further, in this embodiment of the present invention, an RLC agent (RLC Agent) module may be disposed on the secondary base station, and the RLC agent module is configured to temporarily store a service sent by the primary base station by using an RLC layer logical channel, so that when the UE is scheduled, the secondary base station acquires a data block from the service temporarily stored by the RLC agent module, and sends the data block to the UE. In this way, when the UE is scheduled, the secondary base station does not need to temporarily request a data block from the primary base station, and can send a data block after acquiring, from the buffer, the data block that needs to be sent to the UE, thereby reducing a waiting time of the UE and improving data transmission efficiency.

Step 306: The secondary base station sends an identifier of a first PUCCH code channel resource to the primary base station at the first time.

When receiving the identifier of the first PUCCH code channel resource, the primary base station may determine to receive, by using the first PUCCH code channel resource, a feedback, for a first data block, sent by the UE.

In this embodiment of the present invention, the identifier of the first PUCCH code channel resource is determined by the secondary base station before the first time. For example, before the first time, the secondary base station determines x, where x is the number of first data blocks, and then the secondary base station determines the identifier of the corresponding first PUCCH code channel resource according to x. Exemplarily, x is 1 or 2. In a method for determining x by the secondary base station, the secondary base station may predict, according to a transmission mode configuration and a RANK (rank indication) value of the UE, a volume of to-be-transmitted data of the service, and an average throughput rate of the secondary base station, whether the UE may be scheduled by the secondary base station at the second time, and if the UE may be scheduled by the secondary base station, predict the number of data blocks that the secondary base station may send to the UE, where the data block is also referred to as a TB (Transmission block, transmission block), and the RANK value is used for indicating the number of valid data layers of a PDSCH. In this embodiment of the present invention, assuming that the secondary base station obtains by means of prediction that the UE may be scheduled at the second time, the number of data blocks that is obtained by means of prediction is the number x of the first data blocks.

It should be noted that, when the UE accesses the secondary base station, the secondary base station may configure a preset number of PUCCH code channel resources for the UE, and the preset number of PUCCH code channel resources are configured according to a preset standard, which is the same as a standard according to which the primary base station configures a PUCCH code channel resource for the UE, for example, the preset number is 4. Optionally, the number of PUCCH code channel resources (may also be briefly referred to as the number of code channels) included in the first PUCCH code channel resource is equal to the number of first data blocks. Therefore, in this embodiment, the determined number of the first PUCCH code channel resources may be x, for example, the secondary base station selects x PUCCH code channel resources from the preset number of PUCCH code channel resources, and acquires identifiers of the x PUCCH code channel resources as the identifier of the first PUCCH code channel resource.

Step 307: The secondary base station sends the identifier of the first PUCCH code channel resource and a first data block to the UE at the second time.

It should be noted that, before the second time, the secondary base station may acquire the x first data blocks from the temporarily buffered service. For example, when a first condition is satisfied, the secondary base station acquires the x first data blocks from the temporarily stored service, or the secondary base station sends x to the primary base station, where the first condition includes: A priority of the UE is higher than a priority of another UE accessing the secondary base station. Optionally, the first condition further includes: A priority of the service is higher than a priority of a message that is sent by the secondary base station to the another UE accessing the secondary base station.

Exemplarily, when the priority of the UE is higher than the priority of the another UE accessing the secondary base station, and the priority of the service is lower than the priority of the message that is sent by the secondary base station to the another UE accessing the secondary base station, the secondary base station does not acquire the x first data blocks; until the priority of the UE is higher than the priority of the another UE accessing the secondary base station, and the priority of the service is higher than the priority of the message that is sent by the secondary base station to the another UE accessing the secondary base station, the secondary base station acquires the x first data blocks from the temporarily stored service.

In this way, in a process in which the secondary base station schedules the UE, it can be ensured that a message having a higher priority, such as a system message or a paging message, of the another UE accessing the secondary base station is sent preferentially, thereby preventing transmission congestion of the message having the higher priority caused by occupation of a channel resource by the UE.

It should be noted that, the secondary base station may send the first PUCCH code channel resource and the x first data blocks by scheduling a PDCCH resource and a PDSCH resource. For example, the PDCCH resource bears DCI (Downlink Control Information, downlink control information), including resource allocation and other control information on one or more user equipments, and in this embodiment, the PDCCH resource may carry the first PUCCH code channel resource. For another example, the PDSCH resource is used for bearing data from a transmission channel DSCH (Downlink Shared Channel, downlink shared channel), and the PDSCH resource may carry the x first data blocks. The secondary base station transmits the first PUCCH code channel resource and the x first data blocks to the UE by using an air interface.

Step 308: The primary base station receives, by using the first PUCCH code channel resource, a feedback sent by the UE.

It may be understood that, after receiving the identifier of the first PUCCH code channel resource and the first data block from the secondary base station, the UE may send the feedback for the first data block to the primary base station by using the first PUCCH code channel resource. Correspondingly, the primary base station receives, by using the first PUCCH code channel resource, the feedback sent by the UE.

A rule for sending the feedback by the UE corresponds to a rule for parsing information by the primary base station, thereby ensuring consistent understanding of the information by the sender and the receiver. The identifier of the first PUCCH code channel resource may include identifiers of multiple PUCCH code channel resources; therefore, the UE sends different signals on PUCCH code channel resources indicated by different identifiers, to represent different feedbacks, that is, each feedback is determined according to an identifier of a PUCCH channel resource in which a signal exists and a type of the signal. In this embodiment of the present invention, there may be multiple types of rules for sending the feedback by the UE and multiple types of rules for parsing information by the primary base station. For example, the UE receives 2 data blocks, that is, x=2, and correspondingly, the identifier of the first PUCCH code channel resource includes identifiers of 2 PUCCH code channel resources. Refer to table 1, which indicates transmission situations when the number of PUCCH code channel resources is 2, where (PUCCH, 0) represents an identifier of the first PUCCH code channel resource, (PUCCH, 1) represents an identifier of the second PUCCH code channel resource. HARQ-ACK (0) represents the first data block, and HARQ-ACK (1) represents the second data block. As shown in table 1, when the UE sends a signal "1, 1" on the second PUCCH code channel resource, that is, (PUCCH, 1), it represents that the first data block corresponds to an ACK response and the second data block corresponds to an ACK response; when the UE sends the signal "1, 1" on the first PUCCH code channel resource, that is, (PUCCH, 0), it represents that the first data block corresponds to an ACK response and the second data block corresponds to an NACK response; when the UE sends a signal "0, 0" on the second PUCCH code channel resource, that is, (PUCCH, 1), it represents that the first data block corresponds to an NACK response and the second data block corresponds to an ACK response; when the UE sends the signal "0, 0" on the first PUCCH code channel resource, that is, (PUCCH, 0), it represents that the first data block corresponds to an NACK response and the second data block corresponds to an NACK response. It should be noted that, DTX (Discontinuous Transmission, discontinuous transmission) in table 1 represents that the secondary base station sends only the PDCCH resources to the UE, and does not send a PDSCH resource, with the result that no data is transmitted on the corresponding PUCCH code channel resources. In this embodiment of the present invention, it is assumed that the secondary base station sends both the PDCCH resources and the PDSCH resource to the UE; therefore, a DTX response is not involved in this embodiment.

TABLE 1

| First data block | Second data block | Identifier of a PUCCH code channel resource | Signal |
|---|---|---|---|
| HARQ-ACK (0) | HARQ-ACK (1) | $n_{PUCCH}^{(1)}$ | b(0) b(1) |
| ACK | ACK | $n_{PUCCH,1}^{(1)}$ | 1, 1 |
| ACK | NACK/DTX | $n_{PUCCH,0}^{(1)}$ | 1, 1 |
| NACK/DTX | ACK | $n_{PUCCH,1}^{(1)}$ | 0, 0 |
| NACK | NACK/DTX | $n_{PUCCH,0}^{(1)}$ | 0, 0 |
| DTX | NACK/DTX |  | No transmission |

Optionally, the primary base station scans each PUCCH code channel resource; if it is obtained by means of scanning that there is a signal in the first PUCCH code channel resource, the primary base station parses the signal in the first code channel resource to obtain the feedback for the first data block. The rule for parsing information by the primary base station corresponds to the rule for sending the feedback by the UE; for details, reference may be made to the foregoing example. The feedback representation method is only exemplary description, and may be preset according to specific situations in an actual application.

Step 309: The primary base station sends the feedback for the first data block to the secondary base station.

Optionally, the primary base station may receive multiple feedbacks from the UE, which include not only a feedback, of the UE, for a data block sent by the primary base station to the UE, but also a feedback for the first data block. The primary base station may exclude, from the received feedbacks, the feedback for the data block sent by the primary base station to the UE, use the remaining feedback as the feedback for the first data block, and send the feedback to the secondary base station.

Step 310: The secondary base station performs data processing on the feedback for the first data block.

Optionally, after receiving the feedback for the first data block sent by the primary base station, the secondary base station determines whether the feedback includes an NACK; if the feedback includes the NACK, the secondary base station may retransmit first retransmission data to the UE. Exemplarily, the secondary base station may retransmit the first retransmission data to the UE in an HARQ manner, where the first retransmission data includes a data block, corresponding to the NACK, in the first data block. Herein, the first retransmission data may be the data block, corresponding to the NACK, in the first data block. Further, the secondary base station may determine whether the retransmission fails; if the secondary base station determines that the retransmission fails, the secondary base station sends information indicating that the retransmission fails and an SN (Sequence Number, sequence number) corresponding to the first retransmission data to the primary base station, so that the primary base station retransmits the first retransmission data to the UE, where the information indicating that the retransmission fails is used for triggering the primary base station to retransmit the first retransmission data to the UE, and the primary base station may acquire the corresponding first retransmission data by means of a query according to the SN in the primary base station, and retransmit the first retransmission data to the UE in an ARQ retransmission manner. In this way, after the secondary base station fails to perform retransmission for the first time, the primary base station retransmits the first retransmission data again, which can ensure that the first retransmission data is effectively sent to the UE, thereby reducing a sending failure rate of data.

Optionally, the secondary base station may periodically detect whether the feedback sent by the primary base station is received. Assuming that a length of one period is a preset time period, if the secondary base station receives the feedback from the primary base station within the preset time period, and the feedback includes an NACK, the secondary base station may also retransmit second retransmission data to the UE in an ARQ (Automatic RepeatreQuest, automatic repeat request) manner, where the second retransmission data includes a data block, corresponding to the NACK, in the first data block, and may further include a data block, corresponding to the NACK, in another feedback of the UE within the preset time period. The ARQ is a periodic retransmission manner; therefore, when the secondary base station uses the ARQ manner, the number of stop and wait times can be reduced, thereby improving data transmission efficiency. Exemplarily, if the preset time period is equal to 4 HARQ RTTs (Round-Trip Time, round trip time), and one HARQ RTT is 8 ms, the preset time period is 32 ms, and the secondary base station may detect whether feedback information is received within 32 ms; if the feedback information is received within the preset time period, the secondary base station detects whether the feedback information includes an NACK. In the present invention, assuming that there are 4 NACKs, the secondary base station retransmits data corresponding to the 4 NACKs to the UE in the ARQ manner.

Optionally, a first HARQ buffer and a second HARQ buffer may be disposed in the secondary base station; if the feedback includes a negative acknowledgement NACK, and statuses of all HARQ processes in the first HARQ buffer are occupied states, the secondary base station retransmits third retransmission data to the UE by using an HARQ process in the second HARQ buffer, where the third retransmission data includes a data block, corresponding to the NACK, in the first data block.

In this embodiment, process numbers of the HARQ processes in the first HARQ buffer correspond to process numbers of HARQ processes in the second HARQ buffer in a one-to-one manner. Assuming that an HARQ process having a process number y in the first HARQ buffer is used for sending the first data block to the UE, this embodiment includes the following two possible implementation solutions.

First: If a status of an HARQ process having the process number y in the second HARQ buffer is an occupied state, the secondary base station retransmits the third retransmission data to the UE by using another process in the second HARQ buffer, and sends a downlink scheduling authorization message to the UE, where the downlink scheduling authorization message carries an NDI value, the another process is different from the HARQ process having the process number y in the second HARQ buffer, a status of the another process is an idle state, and the NDI value is different from an NDI value previously sent by the secondary base station to the UE, or second: If a status of an HARQ process having the process number y in the second HARQ buffer is an idle state, the secondary base station retransmits the third retransmission data to the UE by using the HARQ process having the process number y in the second HARQ buffer, and sends a downlink scheduling authorization message to the UE, where the downlink scheduling authorization message carries an NDI value, and the NDI value is the same as an NDI value previously sent by the secondary base station to the UE.

In this way, the number of HARQ buffers in the secondary base station is increased, so that all the HARQ processes in the first HARQ buffer are in a state of waiting for feedback information, and the second HARQ buffer is used to retransmit to-be-transmitted data, which reduces a stop and wait phenomenon in the data transmission process, and prevents a delay caused by the stop and wait, thereby reducing an overall delay of data transmission and improving data transmission efficiency.

It should be noted that, in step 304 and step 305, the first data block is acquired from the buffer by the secondary base station when the secondary base station schedules the UE. In step 306, one unidirectional inter-station transmission delay t exists when the secondary base station sends the identifier of the first PUCCH code channel resource to the primary base station at the first time, and then in step 307, the secondary base station sends the identifier of the first PUCCH code channel resource and the first data block to the UE at the second time; therefore, it can be seen that, a minimum interval between the first time and the second time is the unidirectional inter-station transmission delay t between the secondary base station and the primary base station, and when the first data block is acquired from the buffer by the secondary base station when the secondary base station schedules the UE, an interval T between the second time and the first time is t.

Figure 4:
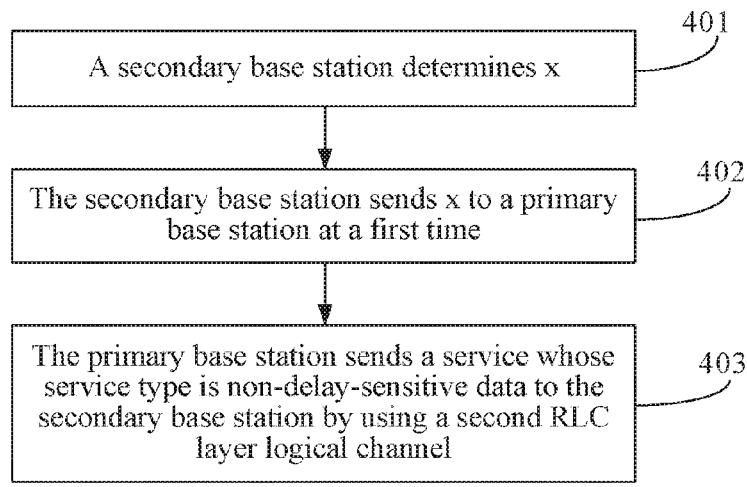
FIG. 4 is a schematic diagram of another data transmission method according to Embodiment 3 of the present invention.

This embodiment of the present invention further provides a method for requesting the first data block from the primary base station when the secondary base station schedules the UE. Specifically, as shown in FIG. 4, the method includes:

Step 401: The secondary base station determines x.

x is the number of first data blocks.

Step 402: The secondary base station sends x to the primary base station at the first time.

When a first condition is satisfied, the secondary base station sends x to the primary base station.

The first condition includes: A priority of the UE is higher than a priority of another UE accessing the secondary base station. Optionally, the first condition further includes: A priority of the service is higher than a priority of a message that is sent by the secondary base station to the another UE accessing the secondary base station.

Step 403: The primary base station sends a service whose service type is non-delay-sensitive data in the service to the secondary base station by using the second RLC layer logical channel.

After receiving x sent at the first time by the secondary base station, the primary base station may acquire the x first data blocks from the service whose service type is non-delay-sensitive data in the service, and sends the x first data blocks to the secondary base station by using the second RLC layer logical channel.

Optionally, step 402 and step 306 are performed simultaneously, and step 403 is performed after step 306. For example, x in step 402 and the identifier of the first PUCCH code channel resource in step 306 are carried in a same message, and are sent by the secondary base station to the primary base station. At the first time, the secondary base station sends the identifier of the first PUCCH code channel resource to the primary base station in step 306 and the secondary base station sends x to the primary base station in step 402, and therefore one unidirectional inter-station transmission delay exists; then, the primary base station sends a service whose service type is non-delay-sensitive data in the service to the secondary base station by using the second RLC layer logical channel in step 403, and therefore another unidirectional inter-station transmission delay exists; the secondary base station sends the identifier of the first PUCCH code channel resource and the first data block to the UE at the second time in step 307. Therefore, it can be seen that, a minimum interval between the first time and the second time is two inter-station transmission delays 2t between the secondary base station and the primary base station, and when the first data block is obtained by means of a request from the primary base station when the secondary base station schedules the UE, an interval T between the second time and the first time is 2t when the foregoing steps are performed, that is, an interval between a time when the secondary base station requests a data block from the primary base station and a time when the secondary base station sends the data block to the UE is 2t. In the prior art, the secondary base station requests, from the primary base station, a data block to be sent to the UE, the primary base station sends the data block to the secondary base station, and then the secondary base station sends an identifier of a PUCCH code channel resource to the primary base station and sends the identifier of the PUCCH code channel resource and the data block to the UE after the primary base station receives the identifier of the PUCCH code channel resource, so as to ensure that the primary base station acquires the identifier of the PUCCH code channel resource before the UE. As can be seen, in the existing process, an interval between a time when the secondary base station requests a data block from the primary base station and a time when the secondary base station sends the data block to the UE is 3t. Therefore, by using the data transmission method in the present invention, the delay can be effectively reduced, and data transmission efficiency can be effectively improved.

In this embodiment of the present invention, in addition to the process including the foregoing steps, the primary base station may further perform another process that is in parallel with the foregoing process, for example, the primary base station may receive a service sent by the gateway, and determine a second PUCCH code channel resource, where the second PUCCH code channel resource is used for sending a feedback for a second data block to the primary base station by the UE; the primary base station sends an identifier of the second PUCCH code channel resource and the second data block to the UE by using the first RLC layer logical channel, where the second data block is a data block corresponding to a service whose service type is delay-sensitive in the service.

In the prior art, after receiving the service sent by the gateway, the primary base station may separately send different data blocks in service data having a same service type to the secondary base station and the UE, the data block sent to the secondary base station is then sent by the secondary base station to the UE; therefore, it is possible that sequence numbers of the data blocks are disordered due to an inter-station transmission delay between the primary base station and the secondary base station. However, in this embodiment of the present invention, two RLC layer logical channels are established and corresponding service types are distinguished, so that services having different service types are split effectively, and data blocks having a same service type are sent by using only a same RLC layer logical channel, thereby preventing sequence number of the data blocks from becoming disordered, and improving time validity of the service.

Further, the primary base station may simultaneously send the identifier of the second PUCCH code channel resource and the second data block to the UE by using the first RLC layer logical channel, that is, at the second time; in this way, at the second time, the primary base station and the secondary base station simultaneously send the data block to the UE, which can implement carrier aggregation of the primary base station and the secondary base station, and improve a peak throughput rate of a data transmission system.

In the data transmission method provided in this embodiment of the present invention, a secondary base station sends an identifier of a first PUCCH code channel resource to a primary base station at a first time; therefore, the primary base station receives the identifier of the first PUCCH code channel resource at an intermediate time between the first time and a second time, which ensures that, at the second time, that is, when the secondary base station sends the identifier of the first PUCCH code channel resource and a first data block to a UE, the primary base station has acquired a demodulation basis for a feedback for the first data block, so that the primary base station can demodulate and forward the feedback in a timely manner, thereby improving data transmission efficiency.

Embodiment 4

Figure 5:
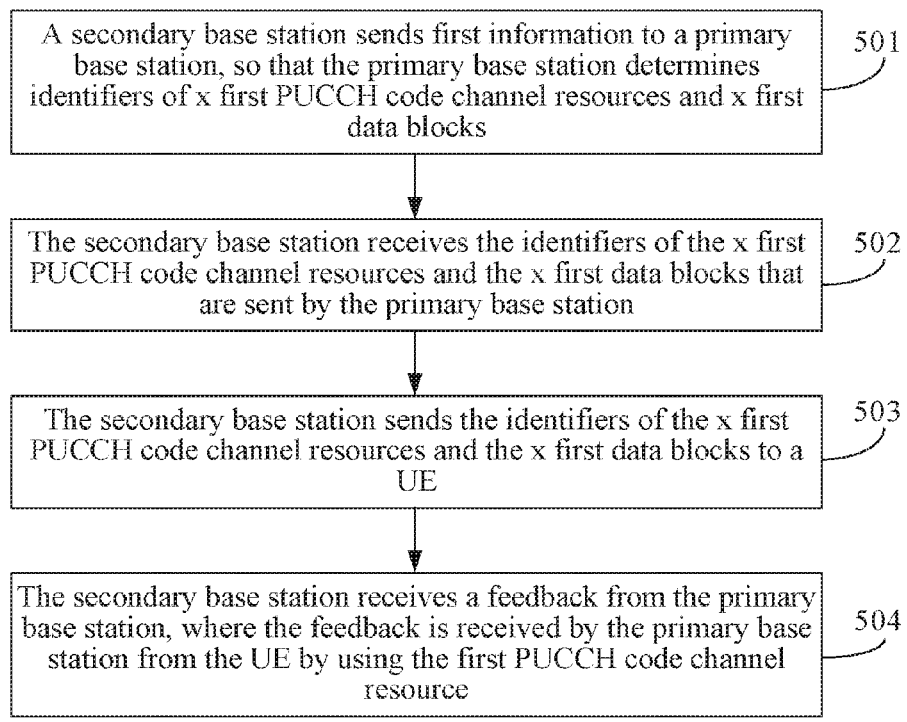
FIG. 5 is a schematic diagram of a data transmission method according to Embodiment 4 of the present invention.

This embodiment of the present invention provides a data transmission method, where the method is applicable to a communications system including a first base station, a second base station, and a UE, and both the first base station and the second base station can serve the UE. The following makes description by using an example in which the first base station is a primary base station of the UE, and the second base station is a secondary base station of the UE. As shown in FIG. 5, the method may include the following steps:

Step 501: The secondary base station sends first information to the primary base station, so that the primary base station determines identifiers of x first PUCCH code channel resources and x first data blocks.

The first information includes one of the number x of first physical uplink control channel PUCCH code channel resources, the number x of first data blocks sent by the secondary base station to the user equipment UE, and a first channel code word (code word), where the first PUCCH code channel resource is used for sending a feedback for the first data block to the primary base station by the UE, and the first channel code word is a channel code word corresponding to the x first data blocks.

Optionally, the sending, by the secondary base station, first information to the primary base station includes: when the secondary base station determines that a priority of the UE is higher than a priority of another UE accessing the secondary base station, sending, by the secondary base station, the first information to the primary base station.

Step 502: The secondary base station receives the identifiers of the x first PUCCH code channel resources and the x first data blocks that are sent by the primary base station.

Step 503: The secondary base station sends the identifiers of the x first PUCCH code channel resources and the x first data blocks to the UE.

Step 504: The secondary base station receives a feedback from the primary base station, where the feedback is received by the primary base station from the UE by using the first PUCCH code channel resource.

In this embodiment of the present invention, the secondary base station serves a secondary component carrier of the UE, and the primary base station serves a primary component carrier of the UE.

In this way, the primary base station determines the identifiers of the x first PUCCH code channel resources, and the secondary base station sends the identifiers of the x first PUCCH code channel resources and the x first data blocks to the UE; therefore, when the primary base station receives the identifiers of the first PUCCH code channel resources and the first data blocks, the primary base station has acquired a demodulation basis for feedbacks for the first data blocks, so that the primary base station can demodulate and forward the feedbacks in a timely manner, thereby improving data transmission efficiency.

Further, the method may further include: if the feedback includes a negative acknowledgement NACK, retransmitting, by the secondary base station, retransmission data to the UE, where the retransmission data includes a data block, corresponding to the NACK, in the x data blocks; determining, by the secondary base station, whether the retransmission fails; and if the secondary base station determines that the retransmission fails, sending, by the secondary base station, information indicating that the retransmission fails and a sequence number corresponding to the retransmission data to the primary base station, where the information indicating that the retransmission fails is used for triggering the primary base station to retransmit the retransmission data to the UE.

Alternatively, further, if the secondary base station receives the feedback from the primary base station within a preset time period, and the feedback includes an NACK, the method may further include: retransmitting, by the secondary base station, retransmission data to the UE in an automatic repeat request ARQ manner, where the retransmission data includes a data block, corresponding to the NACK, in the x data blocks.

Alternatively, further, if a first hybrid automatic repeat request HARQ buffer and a second HARQ buffer are disposed in the secondary base station, the method may further include: if the feedback includes a negative acknowledgement NACK, and statuses of all HARQ processes in the first HARQ buffer are occupied states, retransmitting, by the secondary base station, retransmission data to the UE by using an HARQ process in the second HARQ buffer, where the retransmission data includes a data block, corresponding to the NACK, in the x data blocks.

Furthermore, process numbers of the HARQ processes in the first HARQ buffer correspond to process numbers of HARQ processes in the second HARQ buffer in a one-to-one manner. Assuming that an HARQ process having a process number y in the first HARQ buffer is used for sending the first data block to the UE, the retransmitting, by the secondary base station, retransmission data to the UE by using an HARQ process in the second HARQ buffer includes the following two possible implementation manners:

First: If a status of an HARQ process having the process number y in the second HARQ buffer is an occupied state, the secondary base station retransmits the retransmission data to the UE by using another process in the second HARQ buffer, and sends a downlink scheduling authorization message to the UE, where the downlink scheduling authorization message carries an NDI value, the another process is different from the HARQ process having the process number y in the second HARQ buffer, a status of the another process is an idle state, and the NDI value is different from an NDI value previously sent by the secondary base station to the UE.

Second: If a status of an HARQ process having the process number y in the second HARQ buffer is an idle state, the secondary base station retransmits the retransmission data to the UE by using the HARQ process having the process number y in the second HARQ buffer, and sends a downlink scheduling authorization message to the UE, where the downlink scheduling authorization message carries an NDI value, and the NDI value is the same as an NDI value previously sent by the secondary base station to the UE.

Optionally, in this embodiment of the present invention, the method further includes: sending, by the secondary base station, second information to the primary base station, where the second information includes one of the number m of third PUCCH code channel resources, the number m of data blocks of the retransmission data sent by the secondary base station to the UE, and a second channel code word, so that the primary base station allocates an identifier of a second PUCCH code channel resource to the secondary base station, where the second PUCCH code channel resource is used for sending a feedback for the retransmission data to the primary base station by the UE, and the second channel code word is a channel code word corresponding to a data block of the retransmission data; receiving, by the secondary base station, identifiers of the m third PUCCH code channel resources sent by the primary base station; sending, by the secondary base station, the identifiers of the m third PUCCH code channel resources to the UE; and receiving, by the secondary base station, the feedback for the retransmission data from the primary base station, where the feedback for the retransmission data is received by the primary base station from the UE by using the third PUCCH code channel resource.

Alternatively, in this embodiment of the present invention, the feedback includes an NACK, and the receiving, by the secondary base station, a feedback from the primary base station includes: receiving, by the secondary base station, the feedback and an identifier of a third PUCCH code channel resource from the primary base station, where the third PUCCH code channel resource is used for sending a feedback for the retransmission data to the primary base station by the UE. The method further includes: sending, by the secondary base station, the identifier of the third PUCCH code channel resource to the UE; and receiving, by the secondary base station, the feedback for the retransmission data from the primary base station, where the feedback for the retransmission data is received by the primary base station from the UE by using the third PUCCH code channel resource.

Embodiment 5

Figure 6:
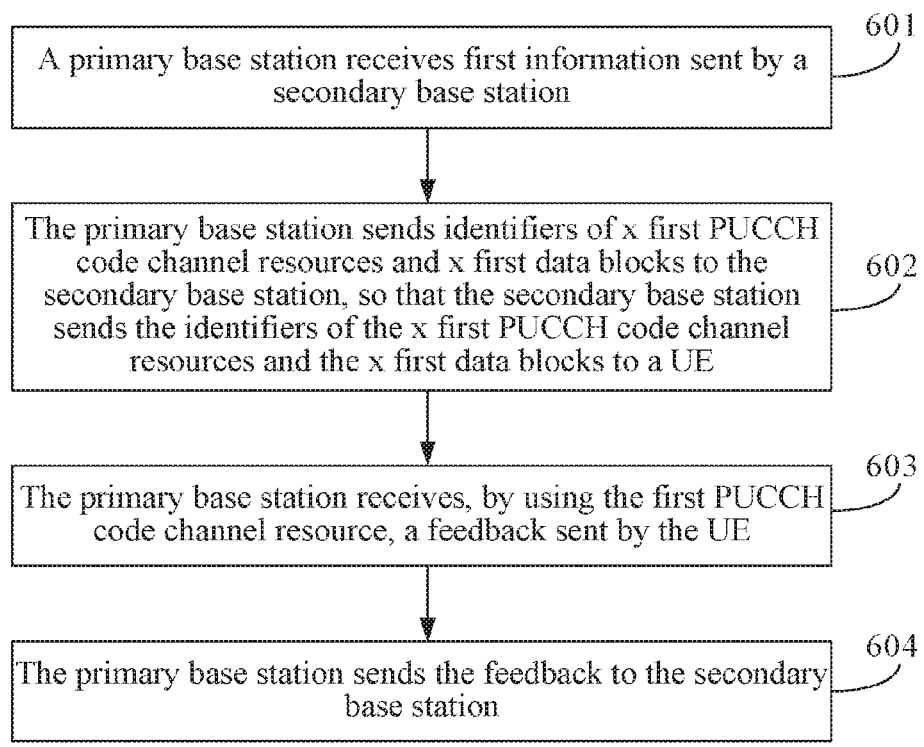
FIG. 6 is a schematic diagram of a data transmission method according to Embodiment 5 of the present invention.

This embodiment of the present invention provides a data transmission method, where the method is applicable to a communications system including a first base station, a second base station, and a UE, and both the first base station and the second base station can serve the UE. The following makes description by using an example in which the first base station is a primary base station of the UE, and the second base station is a secondary base station of the UE. As shown in FIG. 6, the method may include the following steps:

Step 601: The primary base station receives first information sent by the secondary base station.

The first information includes one of the number x of first physical uplink control channel PUCCH code channel resources, the number x of first data blocks sent by the secondary base station to the user equipment UE, and a first channel code word, where the first PUCCH code channel resource is used for sending a feedback for the first data block to the primary base station by the UE, and the first channel code word is a channel code word corresponding to the x first data blocks.

Step 602: The primary base station sends identifiers of x first PUCCH code channel resources and x first data blocks to the secondary base station, so that the secondary base station sends the identifiers of the x first PUCCH code channel resources and the x first data blocks to the UE.

Step 603: The primary base station receives, by using the first PUCCH code channel resource, a feedback sent by the UE.

Step 604: The primary base station sends the feedback to the secondary base station.

In this embodiment of the present invention, the secondary base station serves a secondary component carrier of the UE, and the primary base station serves a primary component carrier of the UE.

In this way, the primary base station determines the identifiers of the x first PUCCH code channel resources, and the secondary base station sends the identifiers of the x first PUCCH code channel resources and the x first data blocks to the UE, therefore, when the primary base station receives the identifiers of the first PUCCH code channel resources and the first data blocks, the primary base station has acquired a demodulation basis for feedbacks for the first data blocks, so that the primary base station can demodulate and forward the feedbacks in a timely manner, thereby improving data transmission efficiency.

Optionally, before the receiving, by the primary base station, first information sent by the secondary base station in step 601, the method further includes: receiving, by the primary base station, a service bearer establishment request sent by the UE or a gateway, where the service bearer establishment request is used for requesting establishment of a service bearer among the UE, the gateway and the primary base station; and establishing, by the primary base station, a first Radio Link Control RLC layer logical channel and a second RLC layer logical channel, where the first RLC layer logical channel is used for transmission between the primary base station and the UE, and the second RLC layer logical channel is used for transmission between the primary base station and the secondary base station.

Further, the method may further include: receiving, by the primary base station, a service sent by the gateway; and acquiring, by the primary base station, the x first data blocks from a service whose service type is non-delay-sensitive data in the service, and determining the identifiers of the x first PUCCH code channel resources. The sending, by the primary base station, identifiers of x first PUCCH code channel resources and x first data blocks to the secondary base station includes: sending, by the primary base station, the identifiers of the x first PUCCH code channel resources and the x first data blocks to the secondary base station by using the second RLC layer logical channel.

Optionally, the method further includes: receiving, by the primary base station, a service sent by the gateway; determining, by the primary base station, an identifier of a second PUCCH code channel resource, where the second PUCCH code channel resource is used for sending a feedback for a second data block to the primary base station by the UE; and sending, by the primary base station, the identifier of the second PUCCH code channel resource and the second data block to the UE by using the first RLC layer logical channel, where the second data block is a data block corresponding to a service whose service type is delay-sensitive in the service.

Optionally, in this embodiment of the present invention, if the feedback includes a negative acknowledgement NACK, after the sending, by the primary base station, the feedback to the secondary base station, the method further includes: receiving, by the primary base station, information indicating that retransmission fails and a sequence number corresponding to retransmission data that are sent by the secondary base station, where the information indicating that the retransmission fails is sent by the secondary base station to the primary base station after the feedback includes the NACK and the secondary base station fails to retransmit the retransmission data to the UE; and retransmitting, by the primary base station, the retransmission data to the UE, where the retransmission data includes a data block, corresponding to the NACK, in the x first data blocks.

Alternatively, in this embodiment of the present invention, if the feedback includes an NACK, after the sending, by the primary base station, the feedback to the secondary base station, the method further includes: receiving, by the primary base station, second information sent by the secondary base station, where the second information includes one of the number m of third PUCCH code channel resources, the number m of data blocks of retransmission data sent by the secondary base station to the UE, and a second channel code word, the third PUCCH code channel resource is used for sending a feedback for the retransmission data to the primary base station by the UE, the second channel code word is a channel code word corresponding to a data block of the retransmission data, and the retransmission data includes a data block, corresponding to the NACK, in the x first data blocks; sending, by the primary base station, identifiers of the m third PUCCH code channel resources to the secondary base station, so that the secondary base station sends the identifiers of the m third PUCCH code channel resources to the UE, receiving, by the primary base station, the feedback for the retransmission data from the UE by using the third PUCCH code channel resource; and sending, by the primary base station, the feedback for the retransmission data to the secondary base station.

Alternatively, in this embodiment of the present invention, if the feedback includes an NACK, the sending, by the primary base station, the feedback to the secondary base station includes: sending, by the primary base station, the feedback and an identifier of a third PUCCH code channel resource to the secondary base station, so that the secondary base station sends the identifier of the third PUCCH code channel resource to the UE, where the third PUCCH code channel resource is used for sending a feedback for retransmission data to the primary base station by the UE, and the retransmission data includes a data block, corresponding to the NACK, in the x first data blocks, and is sent by the secondary base station to the UE. The method further includes: receiving, by the primary base station, the feedback for the retransmission data from the UE by using the third PUCCH code channel resource; and sending, by the primary base station, the feedback for the retransmission data to the secondary base station.

Embodiment 6

The following further describes, by using Embodiment 6 as an example, the methods provided in Embodiment 4 and Embodiment 5. In this embodiment of the present invention, when a data transmission system supporting CA needs to perform data transmission, a UE or a gateway that is on an EPC network may trigger establishment of a service bearer, where the service bearer is a service bearer among the UE, the gateway and a primary base station, and then service transmission is performed on a corresponding service bearer, for example, when a voice service is performed, the UE is a called party, and the gateway triggers the establishment of the service bearer; for another example, when the UE needs to download data, the UE triggers the establishment of the service bearer.

Figure 7:
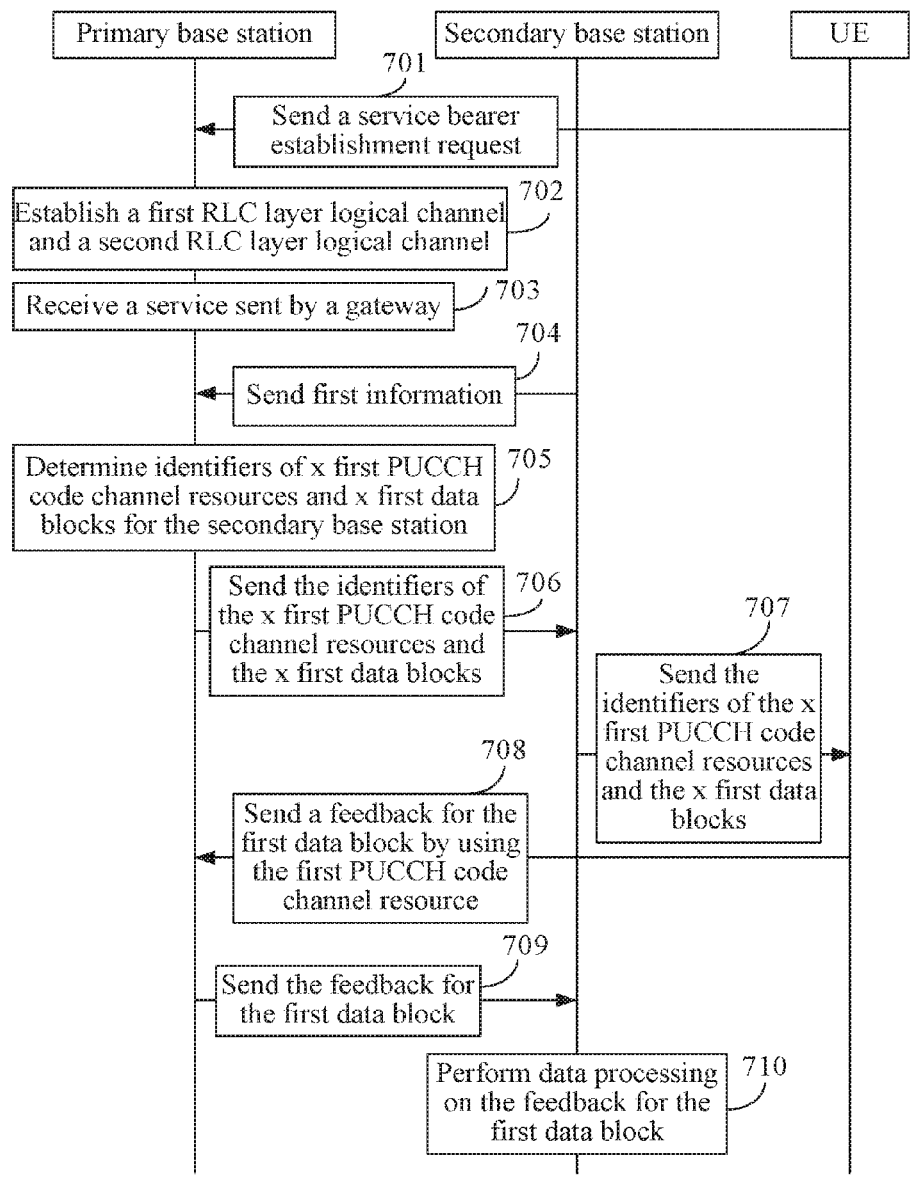
FIG. 7 is a schematic diagram of a data transmission method according to Embodiment 6 of the present invention.

This embodiment of the present invention makes description by using the example in which the UE triggers the establishment of the service bearer. In addition, in this embodiment, it is assumed that the secondary base station serves a secondary component carrier of the UE, and the primary base station serves a primary component carrier of the UE, as shown in FIG. 7.

Step 701: The UE sends a service bearer establishment request to the primary base station.

The service bearer establishment request is used for requesting establishment of a service bearer among the UE, the gateway and the primary base station. A process of establishing the service bearer is the same as that in the prior art, and no further details are provided in the present invention.

Step 702: The primary base station establishes a first RLC layer logical channel and a second RLC layer logical channel according to the service bearer establishment request.

The first RLC layer logical channel is used for transmission between the primary base station and the UE, and the second RLC layer logical channel is used for transmission between the primary base station and the secondary base station. A wireless communications system such as a GPRS, a WCDMA, a TD-SCDMA, or an LTE wireless communications system includes an RLC layer. For example, in the WCDMA system, the RLC layer is located on a MAC layer, and is used for ensuring sequential delivery of service data. In this embodiment of the present invention, the RLC layer logical channels are located at the RLC layer, and is used for service transmission, connection control, traffic control, and the like. A function of the RLC layer is implemented by an RLC entity deployed on a base station.

Step 703: The primary base station receives a service sent by the gateway.

The service received by the primary base station is sent by the gateway on the EPC network, and a service type of the service may include at least one of a non-delay-sensitive data service and a delay-sensitive data service. The non-delay-sensitive data service refers to a data service not having a high requirement for a delay, for example, a data downloading service; the delay-sensitive data service refers to a service having a high requirement for a delay, for example, a real-time small packet service such as a signaling service or a voice service. The primary base station may determine the service type of the service by using at least one of a QCI (QoS Class Identifier, QoS class identifier) type, a service feature, a delay parameter, and the like; for a specific method, reference may be made to the prior art. The QCI is a service type distinguishing method in a standard protocol; QoS (Quality of Service, quality of service) is a security mechanism of a network, and is a technology used for solving problems such as network delay and congestion; the service feature includes a data volume, a data coding feature and the like; the delay parameter may be a PDB.

Step 704: The secondary base station sends first information to the primary base station, where the first information includes one of the number x of first PUCCH code channel resources, the number x of first data blocks sent by the secondary base station to the user equipment UE, and a first channel code word.

For example, the first PUCCH code channel resource is used for sending a feedback for the first data block to the primary base station by the UE, and the first channel code word is a channel code word corresponding to the x first data blocks. The first information may be independently sent by the secondary base station to the primary base station, or may be carried in a resource request sent by the secondary base station party to the primary base station.

Exemplarily, the secondary base station may determine x, for example, x is 1 or 2. In a method for determining x by the secondary base station, the secondary base station may predict, according to a transmission mode configuration and a RANK (rank indication) value of the UE, a volume of to-be-transmitted data of the service, and an average throughput rate of the secondary base station, whether the UE may be scheduled by the secondary base station at the second time, and if the UE may be scheduled by the secondary base station, predict the number of data blocks that the secondary base station may send to the UE, where the data block is also referred to as a TB, and the RANK value is used for indicating the number of valid data layers of a PDSCH. In this embodiment of the present invention, it is assumed that the number of data blocks that is predicted by the secondary base station is the number x of the first data blocks.

Optionally, the number of PUCCH code channel resources (may also be briefly referred to as the number of code channels) included in the first PUCCH code channel resource is equal to the number of first data blocks. Therefore, because the secondary base station has determined the number x of first data blocks, correspondingly, the secondary base station may determine that the number of first PUCCH code channel resources is x. Specially, the number x of data blocks corresponds to a code word in a one-to-one manner as well. Exemplarily, when the number of data blocks is 1, the number corresponds to a single code word, and when the number of data blocks is 2, the number corresponds to a dual code word. Therefore, in this step, the first information sent by the secondary base station to the primary base station is one of the number x of first PUCCH code channel resources, the number x of first data blocks sent by the secondary base station to the user equipment UE, and the first channel code word, each of which enables the primary base station to determine the number of first PUCCH code channel resources and the number of first data blocks that are needed by the secondary base station, so that the primary base station (refer to the following step 705) allocates the first PUCCH code channel resource and the first data block to the secondary base station.

Optionally, in this embodiment of the present invention, when a first condition is satisfied, the secondary base station sends the first information to the primary base station, where the first condition includes: A priority of the UE is higher than a priority of another UE accessing the secondary base station. Further, the first condition may further include: A priority of the service is higher than a priority of a message that is sent by the secondary base station to the another UE accessing the secondary base station.

Exemplarily, when the priority of the UE is higher than the priority of the another UE accessing the secondary base station, and the priority of the service is lower than the priority of the message that is sent by the secondary base station to the another UE accessing the secondary base station, the secondary base station does not send the first information to the primary base station; until the priority of the UE is higher than the priority of the another UE accessing the secondary base station, and the priority of the service is higher than the priority of the message that is sent by the secondary base station to the another UE accessing the secondary base station, the secondary base station sends the first information to the primary base station, so that the primary base station allocates identifiers of the x first PUCCH code channel resources and the x first data blocks to the secondary base station according to the first information.

In this way, in a process in which the secondary base station schedules the UE, it can be ensured that a message having a higher priority, such as a system message or a paging message, of the another UE accessing the secondary base station is sent preferentially, thereby preventing transmission congestion of the message having the higher priority caused by occupation of a channel resource by the UE.

Step 705: The primary base station determines identifiers of the x first PUCCH code channel resources and the x first data blocks for the secondary base station.

The first information includes one of the number x of first PUCCH code channel resources, the number x of first data blocks sent by the secondary base station to the user equipment UE, and the first channel code word; therefore, when the first information includes the number x of first PUCCH code channel resources, the primary base station may correspondingly determine that the number of first data blocks is x; when the first information includes the number x of first data blocks, the primary base station may correspondingly determine that the number of first PUCCH code channel resources is x; when the first information includes the first channel code word, the primary base station determines the number of first data blocks according to the first channel code word, and then determines the number of first PUCCH code channel resources according to the number of first data blocks, for example, if the first channel code word included in the first information is a single code word, the primary base station determines that the number of first data blocks is 1, and the number of first PUCCH code channel resources is also 1.

The primary base station may acquire the x first data blocks from a service whose service type is non-delay-sensitive data in the service, and determine the identifiers of the x first PUCCH code channel resources, where the determining the identifiers of the x first PUCCH code channel resources may be an action of allocating an identifier of a first PUCCH code channel resource.

It should be noted that, when the UE accesses the primary base station, the primary base station may configure a preset number of PUCCH code channel resources for the UE, and the preset number of PUCCH code channel resources are configured according to a preset standard, which is the same as a standard according to which the secondary base station configures a PUCCH code channel resource for the UE, for example, the preset number is 4. Optionally, the number of PUCCH code channel resources (may also be briefly referred to as the number of code channels) included in the first PUCCH code channel resource is equal to the number of first data blocks. Therefore, in this embodiment, the determined number of first PUCCH code channel resources may be x, for example, the primary base station selects x PUCCH code channel resources from the preset number of PUCCH code channel resources, and acquires identifiers of the x PUCCH code channel resources as the identifiers of the first PUCCH code channel resources.

Step 706: The primary base station sends the identifiers of the x first PUCCH code channel resources and the x first data blocks to the secondary base station.

Optionally, the primary base station sends the identifiers of the x first PUCCH code channel resources and the x first data blocks to the secondary base station by using the second RLC layer logical channel.

Step 707: The secondary base station sends the identifiers of the x first PUCCH code channel resources and the x first data blocks to the UE.

Optionally, the secondary base station may send the first PUCCH code channel resources and the x first data blocks by scheduling a PDCCH resource and a PDSCH resource. For example, the PDCCH resource bears DCI, including resource allocation and other control information on one or more user equipments, and in this embodiment, the PDCCH resource may carry the first PUCCH code channel resources. For another example, the PDSCH resource is used for bearing data from a transmission channel DSCH, and the PDSCH resource may carry the x first data blocks. The secondary base station transmits the first PUCCH code channel resources and the x first data blocks to the UE by using an air interface.

Step 708: The primary base station receives, by using the first PUCCH code channel resource, a feedback sent by the UE.

It may be understood that, after receiving the identifier of the first PUCCH code channel resource and the first data block from the secondary base station, the UE may send the feedback for the first data block to the primary base station by using the first PUCCH code channel resource. Correspondingly, the primary base station receives, by using the first PUCCH code channel resource, the feedback sent by the UE.

A rule for sending the feedback by the UE corresponds to a rule for parsing information by the primary base station, thereby ensuring consistent understanding of the information by the sender and the receiver. The identifier of the first PUCCH code channel resource may include identifiers of multiple PUCCH code channel resources; therefore, the UE sends different signals on PUCCH code channel resources indicated by different identifiers, to represent different feedbacks, that is, each feedback is determined according to an identifier of a PUCCH channel resource in which a signal exists and a type of the signal. In this embodiment of the present invention, there may be multiple types of rules for sending the feedback by the UE and multiple types of rules for parsing information by the primary base station. For example, the UE receives 2 data blocks, that is, x=2, and correspondingly, the identifier of the first PUCCH code channel resource includes identifiers of 2 PUCCH code channel resources. Refer to table 1, and table 1 is shown in Embodiment 3, and indicates transmission situations when the number of PUCCH code channel resources is 2, where (PUCCH, 0) represents an identifier of the first PUCCH code channel resource, (PUCCH, 1) represents an identifier of the second PUCCH code channel resource, HARQ-ACK (0) represents the first data block, and HARQ-ACK (1) represents the second data block. As shown in table 1, when the UE sends a signal "1, 1" on the second PUCCH code channel resource, that is, (PUCCH, 1), it represents that the first data block corresponds to an ACK response and the second data block corresponds to an ACK response; when the UE sends the signal "1, 1" on the first PUCCH code channel resource, that is, (PUCCH, 0), it represents that the first data block corresponds to an ACK response and the second data block corresponds to an NACK response; when the UE sends a signal "0, 0" on the second PUCCH code channel resource, that is, (PUCCH, 1), it represents that the first data block corresponds to an NACK response and the second data block corresponds to an ACK response; when the UE sends the signal "0, 0" on the first PUCCH code channel resource, that is, (PUCCH, 0), it represents that the first data block corresponds to an NACK response and the second data block corresponds to an NACK response. It should be noted that, DTX (Discontinuous Transmission, discontinuous transmission) in table 1 represents that the secondary base station sends only the PDCCH resources to the UE, and does not send a PDSCH resource, with the result that no data is transmitted on the corresponding PUCCH code channel resources. In this embodiment of the present invention, it is assumed that the secondary base station sends both the PDCCH resources and the PDSCH resource to the UE; therefore, a DTX response is not involved in this embodiment.

Optionally, the primary base station scans each PUCCH code channel resource; if it is obtained by means of scanning that there is a signal in the first PUCCH code channel resource, the primary base station parses the signal in the first code channel resource to obtain the feedback for the first data block. The rule for parsing information by the primary base station corresponds to the rule for sending the feedback by the UE; for details, reference may be made to the foregoing example. The feedback representation method is only exemplary description, and may be preset according to specific situations in an actual application.

Step 709: The primary base station sends the feedback for the first data block to the secondary base station.

Optionally, the primary base station may receive multiple feedbacks from the UE, which include not only a feedback, of the UE, for a data block directly sent (that is, a sending process does not include forwarding of another device) by the primary base station to the UE, but also a feedback for the first data block. The primary base station may exclude, from the received feedbacks, the feedback for the data block directly sent by the primary base station to the UE, use the remaining feedback as the feedback for the first data block, and send the feedback to the secondary base station.

Step 710: The secondary base station performs processing according to the feedback for the first data block.

For example, after receiving the feedback for the first data block sent by the primary base station, the secondary base station determines whether the feedback includes an NACK; if the feedback includes the NACK, the secondary base station may retransmit first retransmission data to the UE. Exemplarily, the secondary base station may retransmit the first retransmission data to the UE in an HARQ manner, where the first retransmission data includes a data block, corresponding to the NACK, in the first data block. Herein, the first retransmission data may be the data block, corresponding to the NACK, in the first data block.

Further, the secondary base station may determine whether the retransmission fails; if the secondary base station determines that the retransmission fails, the secondary base station sends information indicating that the retransmission fails and a sequence number (SN) corresponding to the first retransmission data to the primary base station, so that the primary base station retransmits the first retransmission data to the UE, where the information indicating that the retransmission fails is used for triggering the primary base station to retransmit the first retransmission data to the UE; in this way, after the secondary base station fails to perform retransmission for the first time, the primary base station retransmits the first retransmission data again, which can ensure that the first retransmission data is effectively sent to the UE, thereby reducing a sending failure rate of data.

For another example, the secondary base station may periodically detect whether the feedback sent by the primary base station is received. Assuming that a length of one period is a preset time period, if the secondary base station receives the feedback from the primary base station within the preset time period, and the feedback includes an NACK, the secondary base station may also retransmit second retransmission data to the UE in an ARQ (Automatic Repeat-reQuest, automatic repeat request) manner, where the second retransmission data may include a data block, corresponding to the NACK, in the first data block, and may further include a data block, corresponding to the NACK, in another feedback of the UE within the preset time period. The ARQ is a periodic retransmission manner; therefore, when the secondary base station uses the ARQ manner, the number of stop and wait times can be reduced, thereby improving data transmission efficiency. Exemplarily, if the preset time period is equal to 4 HARQ RTTs, and one HARQ RTT is 8 ms, the preset time period is 32 ms, and the secondary base station may detect whether feedback information is received within 32 ms; if the feedback information is received within the preset time period, the secondary base station detects whether the feedback information includes an NACK. In the present invention, assuming that there are 4 NACKs, the secondary base station retransmits data corresponding to the 4 NACKs to the UE in the ARQ manner.

For still another example, a first HARQ buffer and a second HARQ buffer may be disposed in the secondary base station. If the feedback includes a negative acknowledgement NACK, and statuses of all HARQ processes in the first HARQ buffer are occupied states, the secondary base station retransmits third retransmission data to the UE by using an HARQ process in the second HARQ buffer, where the third retransmission data includes a data block, corresponding to the NACK in the first data block.

In this embodiment, process numbers of the HARQ processes in the first HARQ buffer correspond to process numbers of HARQ processes in the second HARQ buffer in a one-to-one manner. Assuming that an HARQ process having a process number y in the first HARQ buffer is used for sending the first data block to the UE, this embodiment includes the following two possible implementation solutions.

First: If a status of an HARQ process having the process number y in the second HARQ buffer is an occupied state, the secondary base station retransmits the third retransmission data to the UE by using another process in the second HARQ buffer, and sends a downlink scheduling authorization message to the UE, where the downlink scheduling authorization message carries an NDI value, the another process is different from the HARQ process having the process number y in the second HARQ buffer, a status of the another process is an idle state, and the NDI value is different from an NDI value previously sent by the secondary base station to the UE.

Second: If a status of an HARQ process having the process number y in the second HARQ buffer is an idle state, the secondary base station retransmits the third retransmission data to the UE by using the HARQ process having the process number y in the second HARQ buffer, and sends a downlink scheduling authorization message to the UE, where the downlink scheduling authorization message carries an NDI value, and the NDI value is the same as an NDI value previously sent by the secondary base station to the UE.

In this way, the number of HARQ buffers in the secondary base station is increased, so that all the HARQ processes in the first HARQ buffer are in a state of waiting for feedback information, and the second HARQ buffer is used to retransmit to-be-transmitted data, which reduces a stop and wait phenomenon in the data transmission process, and prevents a delay caused by the stop and wait, thereby reducing an overall delay of data transmission and improving data transmission efficiency.

Optionally, in a process in which the retransmission data is retransmitted, the secondary base station acquires an identifier of a third PUCCH code channel resource in different manners, where the third PUCCH code channel resource is used for sending a feedback for the retransmission data to the primary base station by the UE. For example, the secondary base station requests the identifier of the third PUCCH code channel resource from the primary base station; for another example, the primary base station actively allocates the identifier of the third PUCCH code channel resource to the secondary base station. The following gives detailed descriptions.

Figure 8:
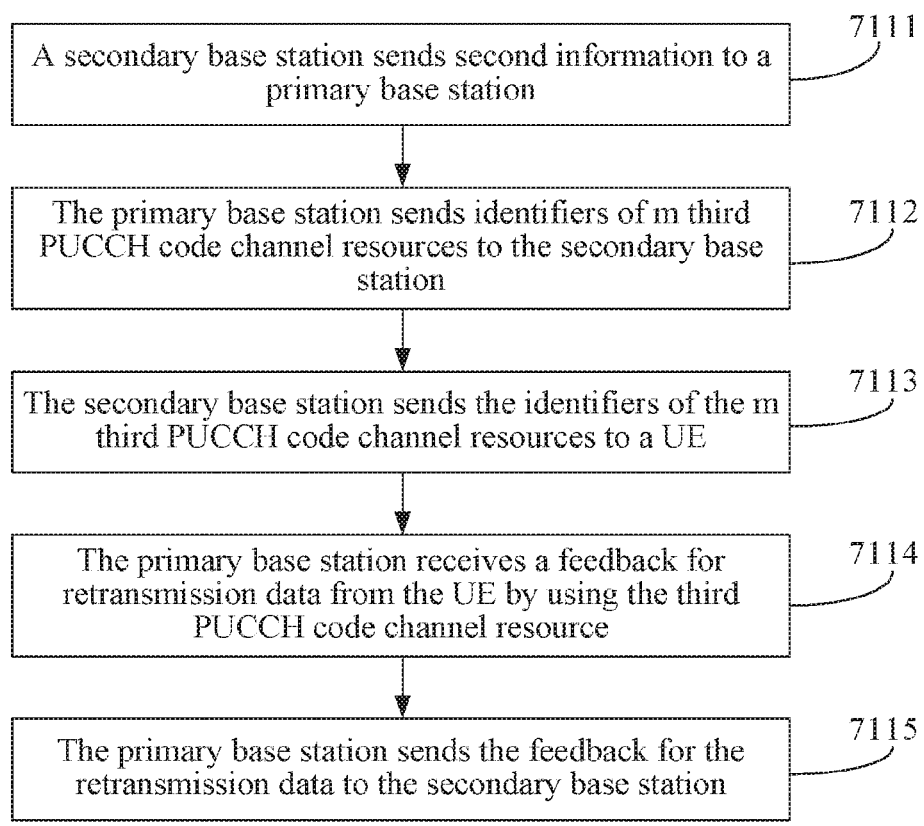
FIG. 8 is a schematic diagram of a method for requesting, by a secondary base station, an identifier of a third PUCCH code channel resource from a primary base station according to Embodiment 6 of the present invention.

As shown in FIG. 8, the method for requesting the identifier of the third PUCCH code channel resource from the primary base station by the secondary base station includes:

7111: The secondary base station sends second information to the primary base station.

The second information is generated after the secondary base station receives the feedback, where the second information includes one of the number m of third PUCCH code channel resources, the number m of data blocks of the retransmission data sent by the secondary base station to the UE, and a second channel code word, the third PUCCH code channel resource is used for sending a feedback for the retransmission data to the primary base station by the UE, and the second channel code word is a channel code word corresponding to a data block of the retransmission data.

Optionally, the number of PUCCH code channel resources included in the third PUCCH code channel resource is equal to the number of data blocks of the retransmission data, so that the secondary base station can correspondingly determine that the number of third PUCCH code channel resources is m because the secondary base station has determined the number m of data blocks of the retransmission data. Specially, the number m of data blocks corresponds to a code word in a one-to-one manner as well. Exemplarily, when the number of data blocks is 1, the number corresponds to a single code word; when the number of data blocks is 2, the number corresponds to a dual code word.

It may be understood that, the second information may trigger the primary base station to allocate the third PUCCH code channel resource to the secondary base station (as in step 7112); therefore, the second information may be considered to be used for requesting a PUCCH code channel resource.

7112: The primary base station sends identifiers of m third PUCCH code channel resources to the secondary base station.

It may be understood that, in this step, the primary base station determines, according to the second information, the m third PUCCH code channel resources allocated to the secondary base station, and then sends the identifiers of the m third PUCCH code channel resources to the secondary base station.

For example, if the second information includes the number m of third PUCCH code channel resources, the primary base station may directly determine that the number of third PUCCH code channel resources is m. For another example, if the first information includes the number m of data blocks of the retransmission data, the primary base station may correspondingly determine that the number of first PUCCH code channel resources is the same as the number of data blocks of the retransmission data, which is m. For still another example, when the first information includes the second channel code word, if the second channel code word is a dual code word, the primary base station determines that the number of data blocks of the retransmission data is 2; if the second channel code word is a single code word, the primary base station determines that the number of data blocks of the retransmission data is 1, and then the primary base station determines the number of third PUCCH code channel resources to be the same as the number of data blocks of the retransmission data.

When the UE accesses the primary base station, the primary base station may configure a preset number of PUCCH code channel resources for the UE, where the preset number of PUCCH code channel resources are configured according to a preset standard, which is the same as a standard according to which the secondary base station configures a PUCCH code channel resource for the UE. The primary base station may configure m third PUCCH code channel resources for the secondary base station, that is, select m PUCCH code channel resources from the preset number of PUCCH code channel resources, and acquire identifiers of the m PUCCH code channel resources as the identifier of the third PUCCH code channel resource, and then send the identifiers of the m third PUCCH code channel resources to the secondary base station.

7113: The secondary base station sends the identifiers of the m third PUCCH code channel resources to the UE.

7114: The primary base station receives the feedback for the retransmission data from the UE by using the third PUCCH code channel resource.

For the feedback process, reference may be made to the foregoing step 708.

7115: The primary base station sends the feedback for the retransmission data to the secondary base station.

Figure 9:
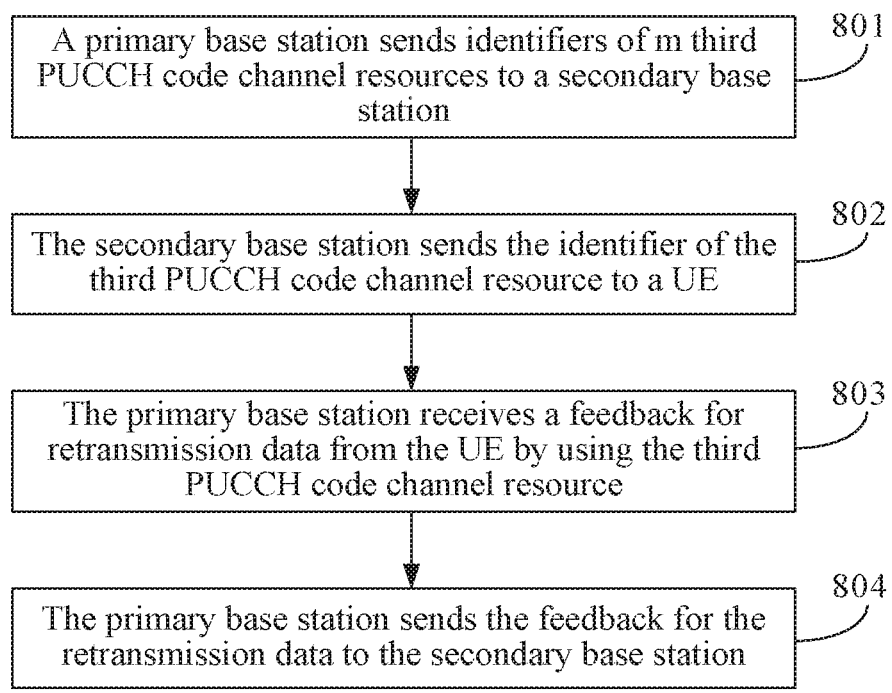
FIG. 9 is a schematic diagram of a method for actively allocating, by a primary base station, an identifier of a third PUCCH code channel resource to a secondary base station according to Embodiment 6 of the present invention.

As shown in FIG. 9, the method for actively allocating the identifier of the third PUCCH code channel resource to the secondary base station by the primary base station includes:

801: The primary base station sends identifiers of m third PUCCH code channel resources to the secondary base station.

The third PUCCH code channel resource is used for sending the feedback for the retransmission data to the primary base station by the UE.

It should be noted that, the primary base station may exclude, from the received feedbacks, a feedback for a data block sent by the primary base station to the UE, use the remaining feedback as the feedback for the first data block, and then determine whether the feedback for the first data block includes an NACK; if the NACK exists, the primary base station allocates the third PUCCH code channel resource to a data block, corresponding to the NACK, in the first data block, that is, the retransmission data. Step 801 and step 708 are performed simultaneously, that is, when sending the feedback for the first data block, the primary base station sends the identifier of the third PUCCH code channel resource at the same time, so that the primary base station performs step 801 without needing to wait for another trigger. In this way, the number of inter-station transmission times and the delay can be effectively reduced.

802: The secondary base station sends the identifier of the third PUCCH code channel resource to the UE.

803: The primary base station receives the feedback for the retransmission data from the UE by using the third PUCCH code channel resource.

For the feedback process, reference may be made to the foregoing step 708.

804: The primary base station sends the feedback for the retransmission data to the secondary base station.

It should be noted that, in a process of performing the foregoing steps, the primary base station may receive a service sent by the gateway, and determine a second PUCCH code channel resource, where the second PUCCH code channel resource is used for sending a feedback for a second data block to the primary base station by the UE; the primary base station sends an identifier of the second PUCCH code channel resource and the second data block to the UE by using the first RLC layer logical channel, where the second data block is a data block corresponding to a service whose service type is delay-sensitive in the service.

In the prior art, after receiving the service sent by the gateway, the primary base station may separately send different data blocks in service data having a same service type to the secondary base station and the UE, the data block sent to the secondary base station is then sent by the secondary base station to the UE; therefore, it is possible that sequence numbers of the data blocks are disordered due to an inter-station transmission delay between the primary base station and the secondary base station. However, in this embodiment of the present invention, two RLC layer logical channels are established and corresponding service types are distinguished, so that services having different service types are split effectively, and data blocks having a same service type are sent by using only a same RLC layer logical channel, thereby preventing sequence number of the data blocks from becoming disordered, and improving time validity of the service.

Further, the primary base station may simultaneously send the identifier of the second PUCCH code channel resource and the second data block to the UE by using the first RLC layer logical channel with step 707; in this way, the primary base station and the secondary base station simultaneously send the data block to the UE, which can implement carrier aggregation of the primary base station and the secondary base station, and improve a peak throughput rate of a data transmission system.

In the data transmission method provided in this embodiment of the present invention, a primary base station determines identifiers of x first PUCCH code channel resources, and a secondary base station sends the identifiers of x first PUCCH code channel resources and x first data blocks to a UE; therefore, when the primary base station receives the identifiers of the first PUCCH code channel resources and the first data blocks, the primary base station has acquired a demodulation basis for feedbacks for the first data blocks, so that the primary base station can demodulate and forward the feedbacks in a timely manner, thereby improving data transmission efficiency.

Embodiment 7

This embodiment of the present invention provides a data transmission method, where the method is applicable to a communications system including a first base station and a UE, and the first base station serves the UE. Further, the method is also applicable to a scenario in which both the first base station and a second base station serve the UE. For example, Embodiment 1 to Embodiment 6 provide examples in which the method is applicable to CA scenarios, where the first base station is a primary base station of the UE, and the second base station is a secondary base station of the UE.

Figure 10:
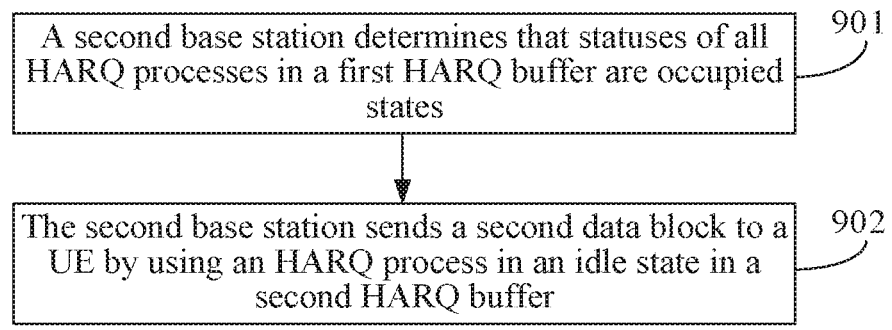
FIG. 10 is a schematic diagram of a data transmission method according to Embodiment 7 of the present invention.

In this embodiment, as shown in FIG. 10, the method includes the following steps:

Step 901: The second base station determines that statuses of all HARQ processes in a first HARQ buffer are occupied states.

Step 902: The second base station sends a second data block to the user equipment UE by using an HARQ process in an idle state in a second HARQ buffer.

The first HARQ buffer and the second HARQ buffer are different HARQ buffers disposed in the second base station. A preset number of HARQ processes are set in each of the HARQ buffers, and the number of HARQ processes in one HARQ buffer is equal to the number of TTIs (Transmission Time Interval, transmission time interval).

In this way, the number of HARQ buffers is increased by disposing the first HARQ buffer and the second HARQ buffer in the second base station; when the statuses of all the HARQ processes in the first HARQ buffer are occupied states, the HARQ process in the idle state in the second HARQ buffer is used to send the second data block, which reduces a stop and wait phenomenon in a data transmission process, and reduces a delay caused by the stop and wait, thereby improving data transmission efficiency.

Optionally, process numbers of the HARQ processes in the first HARQ buffer correspond to process numbers of HARQ processes in the second HARQ buffer in a one-to-one manner.

Further, before the determining, by the second base station, that statuses of all HARQ processes in a first HARQ buffer are occupied states, the method further includes; sending, by the second base station, a first data block to the UE by using an HARQ process having a process number y in the first HARQ buffer.

Correspondingly, before the sending, by the second base station, a second data block to the UE by using an HARQ process in an idle state in a second HARQ buffer, the method further includes: receiving, by the second base station, a feedback, for the first data block, of the UE. If the feedback includes a negative acknowledgement NACK, the second data block is a data block, corresponding to the NACK, in the first data block; or, if the feedback includes an acknowledgement ACK, the second data block is a data block different from the first data block.

Furthermore, if the feedback includes an NACK, and a status of an HARQ process having the process number y in the second HARQ buffer is an idle state, the sending, by the second base station, a second data block to the UE by using an HARQ process in an idle state in a second HARQ buffer includes: sending, by the second base station, the second data block to the UE by using the HARQ process having the process number y in the second HARQ buffer, and sending a downlink scheduling authorization message to the UE, where the downlink scheduling authorization message carries an NDI value, and the NDI value is the same as an NDI value previously sent by the second base station to the UE.

Optionally, if the feedback includes an NACK, after the sending, by the second base station, a second data block to the UE by using an HARQ process in an idle state in a second HARQ buffer, the method further includes: determining, by the second base station, that the sending of the second data block by using the HARQ process in the idle state in the second HARQ buffer fails; and sending, by the second base station, information indicating the failure and a sequence number corresponding to the second data block to the first base station, where the information indicating the failure is used for triggering the first base station to retransmit the second data block to the UE, the second base station serves a secondary component carrier of the UE, and the first base station serves a primary component carrier of the UE.

Optionally, in this embodiment, the receiving, by the second base station, a feedback, for the first data block, of the UE includes: receiving, by the second base station, the feedback from the first base station, where the feedback is sent by the UE to the first base station by using a first physical uplink control channel PUCCH code channel resource, and an identifier of the first PUCCH code channel resource is determined and sent to the first base station and the UE by the second base station; or, an identifier of the first PUCCH code channel resource is received from the first base station after the second base station requests allocation of a PUCCH code channel resource from the first base station.

Embodiment 8

The following further describes, by using Embodiment 8 as an example, the method provided in Embodiment 7, and cross reference may be made to this embodiment and Embodiment 1 to Embodiment 6 for supplementary. It may be understood that, when this embodiment is applicable to a CA scenario, a second base station may serve a secondary component carrier of a UE, and a first base station may serve a primary component carrier of the UE.

Figure 11:
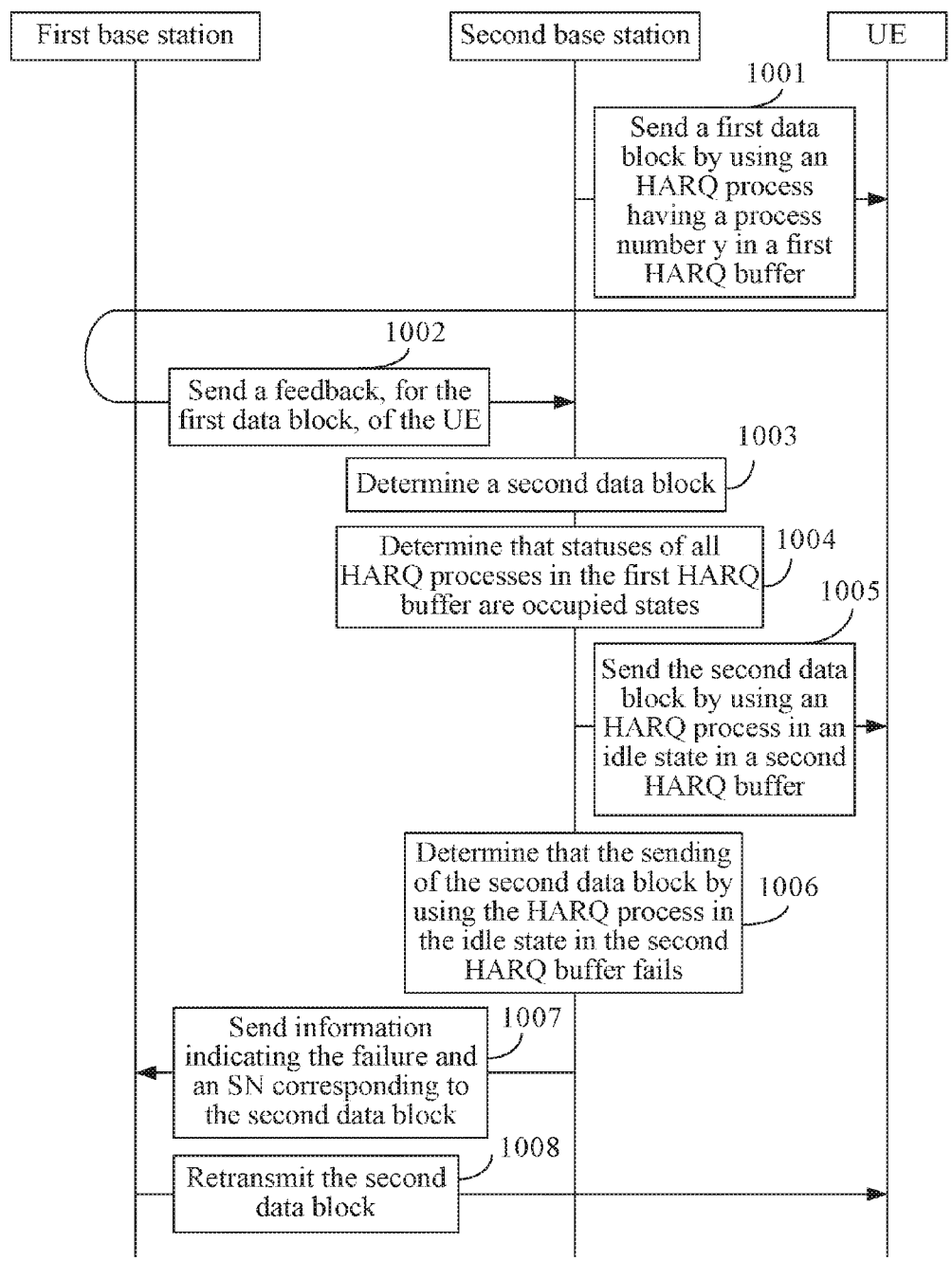
FIG. 11 is a schematic diagram of a data transmission method according to Embodiment 8 of the present invention.

This embodiment of the present invention provides a data transmission method. As shown in FIG. 11, the method includes the following steps:

Step 1001: The second base station sends a first data block to the UE by using an HARQ process having a process number y in a first HARQ buffer.

Step 1002: The second base station receives a feedback, for the first data block, of the UE.

Optionally, the second base station receives the feedback from the first base station, where the feedback is sent by the UE to the first base station by using a first PUCCH code channel resource. An identifier of the first PUCCH code channel resource is determined and sent to the first base station and the UE by the second base station; or, an identifier of the first PUCCH code channel resource is received from the first base station after the second base station requests allocation of a PUCCH code channel resource from the first base station. For a specific process, reference may be made to corresponding descriptions in Embodiment 3 and Embodiment 7, and no further description is provided in this embodiment.

Step 1003: The second base station determines a second data block.

The second data block may be classified into two types, namely, new data and retransmission data, where the new data is data transmitted to the UE for the first time, and the retransmission data is data transmitted to the UE for the second time or more.

Optionally, if the feedback includes an NACK, the second data block is a data block, corresponding to the NACK, in the first data block, and in this case, the second data block is retransmission data; or, if the feedback includes an acknowledgement ACK, the second data block is a data block different from the first data block, and in this case, the second data block is new data.

Optionally, in this embodiment of the present invention, data needing to be transmitted to the UE may be temporarily stored at an RLC layer of the first base station or the second base station, and when a priority of the UE is greater than a priority of another UE accessing the second base station, the second base station acquires second data from a service temporarily stored at a local RLC layer or from a service temporarily stored at the RLC layer of the first base station, and the second data is new data. After data is sent to the UE for the first time, the data is temporarily stored at a MAC layer of the first base station or the second base station, and the second base station receives a feedback sent by the first base station; if the feedback includes an NACK, data corresponding to the NACK and acquired from the MAC layer is used as the retransmission data. Therefore, if the second data acquired by the second base station is from the RLC layer, the data is new data if the second data acquired by the second base station is from the MAC layer, the data is retransmission data.

Step 1004: The second base station determines that statuses of all HARQ processes in the first HARQ buffer are occupied states.

In this embodiment of the present invention, a status of an HARQ process in an HARQ buffer generally may be classified into two types: one is an idle state, that is, the HARQ process is not occupied by data; the other is an occupied state, that is, the HARQ buffer performs data transmission by using the HARQ process, and the HARQ process is occupied by data and waits for corresponding feedback information. Generally, each HARQ process can transmit two data blocks.

Step 1005: The second base station sends the second data block to the user equipment UE by using an HARQ process in an idle state in a second HARQ buffer.

The first HARQ buffer and the second HARQ buffer are different HARQ buffers disposed in the second base station. Optionally, process numbers of the HARQ processes in the first HARQ buffer correspond to process numbers of HARQ processes in the second HARQ buffer in a one-to-one manner.

Optionally, if the feedback includes an NACK, and a status of an HARQ process having the process number y in the second HARQ buffer is an idle state, the second base station sends the second data block to the UE by using the HARQ process having the process number y in the second HARQ buffer, and sends a downlink scheduling authorization message to the UE, where the downlink scheduling authorization message carries an NDI value, and the NDI value is the same as an NDI (New Data Index, new data index) value previously sent by the second base station to the UE.

Optionally, if the feedback includes an NACK, and a status of an HARQ process having the process number y in the second HARQ buffer is an occupied state, the second base station retransmits the retransmission data to the UE by using another process in the second HARQ buffer, and sends a downlink scheduling authorization message to the UE, where the downlink scheduling authorization message carries an NDI value, a process number of the another process is not y, a status of the another process is an idle state, and the NDI value is different from an NDI value previously sent by the second base station to the UE.

It should be noted that, the NDI value is used for indicating whether transmitted data is new data. If the NDI value is the same as the NDI value previously sent by the second base station to the UE, it indicates that currently transmitted data is retransmission data; if the NDI value is different from the NDI value previously sent by the second base station to the UE, it indicates that currently transmitted data is new data, and the UE determines, according to the received NDI value, whether the corresponding second data block is the new data. Specially, if the feedback includes an NACK, and the status of the HARQ process having the process number y in the second HARQ buffer is the occupied state, the second base station retransmits the retransmission data to the UE by using the another process in the second HARQ buffer. Although the second base station side actually performs retransmission of the second data block, that is, the second base station can determine that the second data block is the retransmission data, the second base station adds a new NDI value to the downlink scheduling authorization message; therefore, after receiving the NDI value, the UE determines that the second data block is the new data, and a manner of processing new data is used to process the second data block which is not described in detail in the present invention again.

Generally, 0 and 1 are used to identify whether the transmitted data is new data. Exemplarily, if a currently received NDI value is 0, and the NDI value previously sent by the second base station to the UE is 0, the UE considers that the currently received data is retransmission data; if the NDI value previously sent by the second base station to the UE is 1, the UE considers that the currently received data is new data.

Step 1006: The second base station determines that the of sending the second data block by using the HARQ process in the idle state in the second HARQ buffer fails.

Step 1007: The second base station sends information indicating the failure and an SN corresponding to the second data block to the first base station, where the information indicating the failure is used for triggering the first base station to retransmit the second data block to the UE.

Step 1008: The first base station retransmits the second data block to the UE.

The first base station may acquire corresponding first retransmission data by means of a query according to the sequence number (SN) corresponding to the second data block in the first base station, and retransmit the first retransmission data to the UE in an ARQ retransmission manner. In this way, after the second base station fails to perform retransmission for the first time, the first base station retransmits the first retransmission data again, which can ensure that the first retransmission data is effectively sent to the UE, thereby reducing a sending failure rate of data.

Specially, an HARQ buffer different from the first and the second HARQ buffers may also be disposed in the second base station, and is used as a standby HARQ buffer. When statuses of all the HARQ processes in the first and the second HARQ buffers are occupied states, an HARQ process in an idle state in the standby HARQ buffer is used to send the second data block to the UE.

It should be noted that, in the data transmission method provided in this embodiment, a sequence of the steps may be adjusted appropriately, steps may be added or deleted correspondingly according to situations, and specific steps may also be adjusted with reference to the steps in the foregoing embodiments and Embodiment 7. Any changed method easily figured out by a person skilled in the art within the technical scope disclosed in the present invention shall fall within the protection scope of the present invention, and therefore is not described again.

In the data transmission method provided in this embodiment of the present invention, a first HARQ buffer and a second HARQ buffer are disposed in a second base station to increase the number of HARQ buffers; when statuses of all HARQ processes in the first HARQ buffer are occupied states, an HARQ process in an idle state in the second HARQ buffer is used to send a second data block, which reduces a stop and wait phenomenon in a data transmission process, and reduces a delay caused by the stop and wait, thereby improving data transmission efficiency.

The present invention further provides an apparatus and a system for implementing the data transmission methods provided in the foregoing embodiments, and the following makes description by using an example.

Embodiment 9

Figure 12:
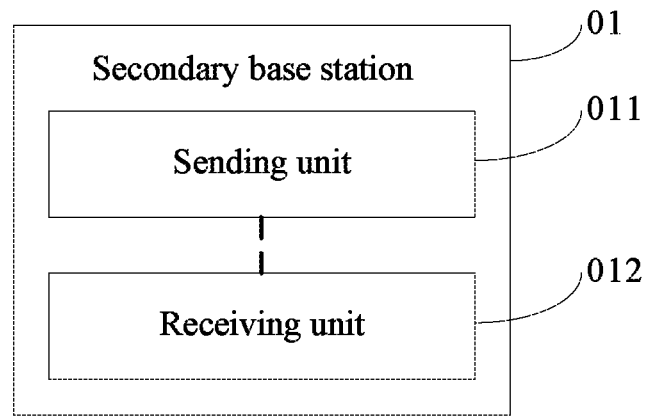
FIG. 12 is a schematic structural diagram of a base station according to Embodiment 9 of the present invention.

This embodiment of the present invention provides a base station 01. As shown in FIG. 12, the base station 01 includes a sending unit 011 and a receiving unit 012, where the sending unit 011 is configured to send an identifier of a first physical uplink control channel PUCCH code channel resource to a first base station at a first time, so that the first base station determines to receive, by using the first PUCCH code channel resource, a feedback, for a first data block, sent by a user equipment UE:

the sending unit 011 is further configured to send the identifier of the first PUCCH code channel resource and the first data block to the UE at a second time; and the receiving unit 012 is configured to receive the feedback from the first base station, where the feedback is received by the first base station from the UE by using the first PUCCH code channel resource, where the second time is later than the first time, an interval T between the second time and the first time is greater than or equal to one transmission delay t between the base station 01 and the first base station, the base station 01 serves a secondary component carrier of the UE, and the first base station serves a primary component carrier of the UE.

Figure 13:
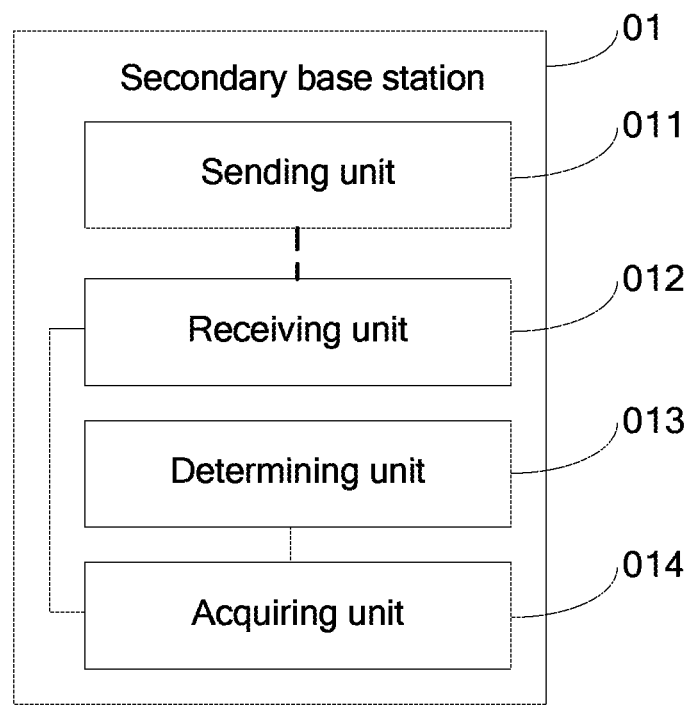
FIG. 13 is a schematic structural diagram of another base station according to Embodiment 9 of the present invention.

Optionally, as shown in FIG. 13, the base station 01 may further include:

a determining unit 013, configured to: before the first time, determine x, where x is the number of first data blocks, and the receiving unit 012 is further configured to receive and temporarily store a service sent by the first base station; and an acquiring unit 014, configured to: before the second time, acquire the x first data blocks from the temporarily stored service.

Figure 14:
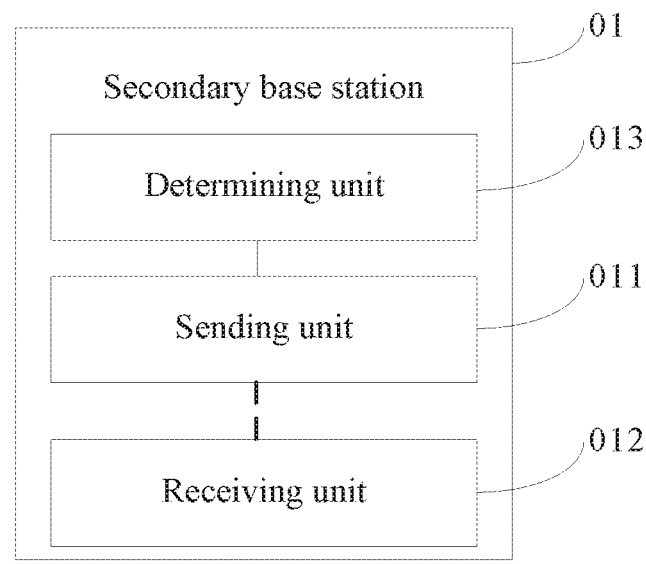
FIG. 14 is a schematic structural diagram of still another base station according to Embodiment 9 of the present invention.

Optionally, as shown in FIG. 14, the base station 01 may include:

a determining unit 013, configured to: before the first time, determine x, where x is the number of first data blocks, the sending unit 011 is further configured to send x to the first base station at the first time, and the receiving unit 012 is further configured to: before the second time, receive the x first data blocks sent by the first base station.

Optionally, when a first condition is satisfied, the acquiring unit 014 is configured to acquire the x first data blocks from the temporarily stored service, or the sending unit 011 sends x to the first base station, where the first condition includes: A priority of the UE is higher than a priority of another UE accessing the base station 01. Optionally, the first condition may further include: A priority of the service is higher than a priority of a message that is sent by the base station 01 to the another UE accessing the base station 01.

Optionally, the unidirectional inter-station transmission delay t between the base station 01 and the first base station satisfies the following formula:

$$t=t1*A+B,$$

where t1 is a theoretical transmission delay between the first base station and the base station 01, A is a constant for adjusting t1, and B is an offset constant of t1.

Figure 15:
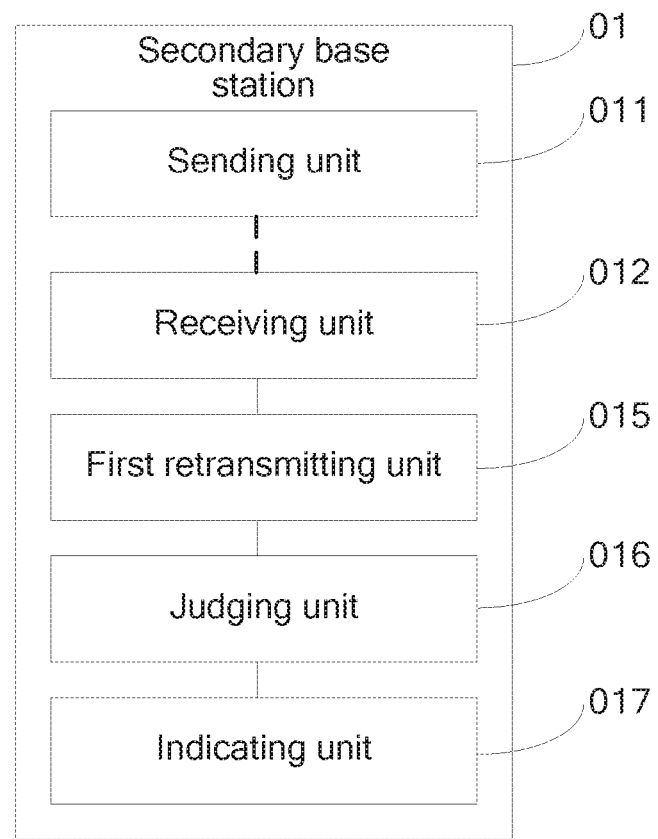
FIG. 15 is a schematic structural diagram of yet another base station according to Embodiment 9 of the present invention.

Optionally, as shown in FIG. 15, the base station 01 may further include:

a first retransmitting unit 015, configured to: when the feedback includes a negative acknowledgement NACK, retransmit retransmission data to the UE, where the retransmission data includes a data block, corresponding to the NACK, in the first data block;

a judging unit 016, configured to determine whether the retransmission fails; and an indicating unit 017, configured to: when the judging unit 016 determines that the retransmission fails, send information indicating that the retransmission fails and a sequence number corresponding to the retransmission data to the first base station, where the information indicating that the retransmission fails is used for triggering the first base station to retransmit the retransmission data to the UE.

Figure 16:
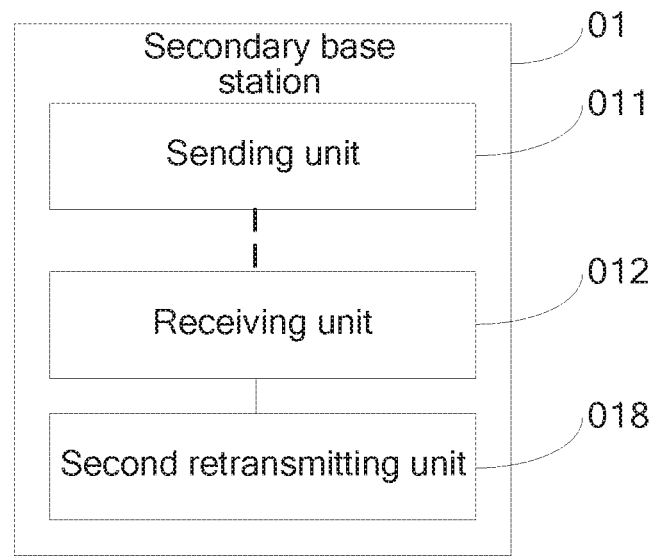
FIG. 16 is a schematic structural diagram of yet another base station according to Embodiment 9 of the present invention.

Optionally, as shown in FIG. 16, the base station 01 may further include:

a second retransmitting unit 018, configured to: when the feedback is received from the first base station within a preset time period, and the feedback includes an NACK, retransmit retransmission data to the UE in an automatic repeat request ARQ manner, where the retransmission data includes a data block, corresponding to the NACK, in the first data block.

Figure 17:
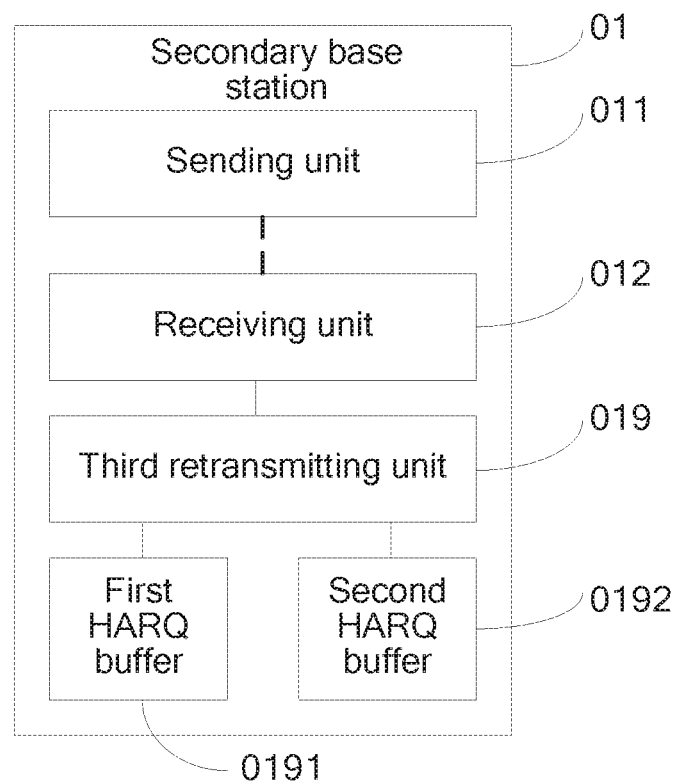
FIG. 17 is a schematic structural diagram of yet further base station according to Embodiment 9 of the present invention.

Optionally, as shown in FIG. 17, the base station 01 further includes a first HARQ buffer 0191 and a second HARQ buffer 0192, and a third retransmitting unit 019, and the base station 01 may further include:

the third retransmitting unit 019 is configured to: when the feedback includes a negative acknowledgement NACK, and statuses of all HARQ processes in the first HARQ buffer 0191 are occupied states, retransmit retransmission data to the UE by using an HARQ process in the second HARQ buffer 0192, where the retransmission data includes a data block, corresponding to the NACK, in the first data block.

Optionally, process numbers of the HARQ processes in the first HARQ buffer 0191 correspond to process numbers of HARQ processes in the second HARQ buffer 0192 in a one-to-one manner.

When an HARQ process having a process number y in the first HARQ buffer 0191 is used for sending the first data block to the UE, the third retransmitting unit 019 may be specifically configured to:

if a status of an HARQ process having the process number y in the second HARQ buffer 0192 is an occupied state, retransmit the retransmission data to the UE by using another process in the second HARQ buffer 0192, and send a downlink scheduling authorization message to the UE, where the downlink scheduling authorization message carries an NDI value, the another process is different from the HARQ process having the process number y in the second HARQ buffer, a status of the another process is an idle state, and the NDI value is different from an NDI value previously sent by the base station to the UE, or if a status of an HARQ process having the process number y in the second HARQ buffer 0192 is an idle state, retransmit the retransmission data to the UE by using the HARQ process having the process number y in the second HARQ buffer 0192, and send a downlink scheduling authorization message to the UE, where the downlink scheduling authorization message carries an NDI value, and the NDI value is the same as an NDI value previously sent by the base station to the UE.

In this way, a sending unit sends an identifier of a first PUCCH code channel resource to a first base station at a first time; therefore, the first base station receives the identifier of the first PUCCH code channel resource at an intermediate time between the first time and a second time, which ensures that, at the second time, that is, when a base station sends the identifier of the first PUCCH code channel resource and a first data block to a UE, the first base station has acquired a demodulation basis for a feedback for the first data block, so that the first base station can demodulate and forward the feedback in a timely manner, thereby improving data transmission efficiency.

Embodiment 10

Figure 18:
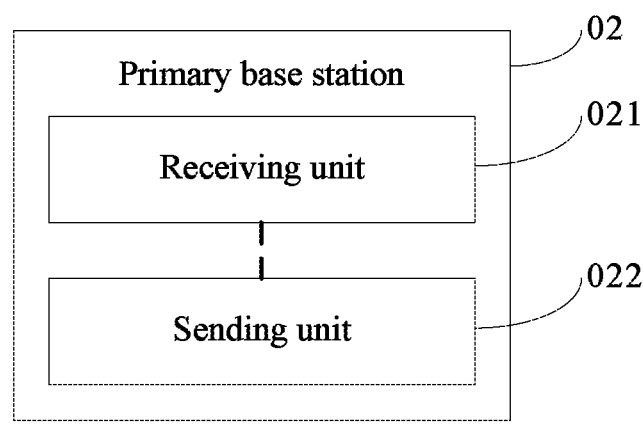
FIG. 18 is a schematic structural diagram of a base station according to Embodiment 10 of the present invention.

This embodiment of the present invention provides a base station 02. As shown in FIG. 18, the base station 02 includes a receiving unit 022 and a sending unit 021, where the receiving unit 021 is configured to receive an identifier of a first physical uplink control channel PUCCH code channel resource sent at a first time by a second base station;

the receiving unit 022 is further configured to receive, by using the first PUCCH code channel resource, a feedback sent by a user equipment UE, where the feedback is a feedback sent by the UE for a first data block that is sent at a second time by the second base station; and the sending unit 021 is configured to send the feedback to the second base station, where the second time is later than the first time, an interval T between the second time and the first time is greater than or equal to one transmission delay t between the second base station and the base station 02, the second base station serves a secondary component carrier of the UE, and the base station 02 serves a primary component carrier of the UE.

Optionally, the receiving unit 021 is further configured to: before the first time, receive a service bearer establishment request sent by the UE or a gateway, where the service bearer establishment request is used for requesting establishment of a service bearer among the UE, the gateway and the base station 02.

Figure 19:
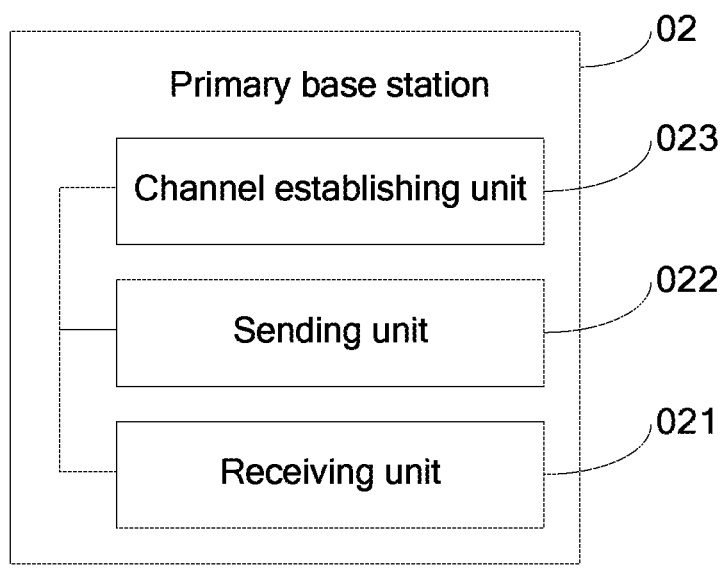
FIG. 19 is a schematic structural diagram of another base station according to Embodiment 10 of the present invention.

As shown in FIG. 19, the base station 02 may further include:

a channel establishing unit 023, configured to establish a first Radio Link Control layer RLC layer logical channel and a second RLC layer logical channel, where the first RLC layer logical channel is used for transmission between the base station and the UE, and the second RLC layer logical channel is used for transmission between the base station and the second base station.

Figure 20:
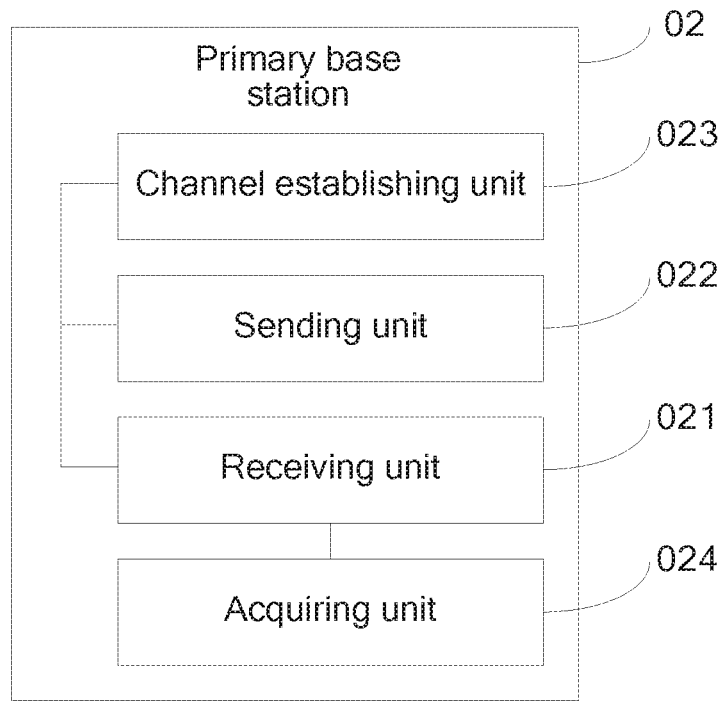
FIG. 20 is a schematic structural diagram of still another base station according to Embodiment 10 of the present invention.

Optionally, in this embodiment, the receiving unit 021 is further configured to receive a service sent by the gateway, and the sending unit 022 is further configured to: before the first time, send a service whose service type is non-delay-sensitive data in the service to the second base station by using the second RLC layer logical channel. Alternatively, in this embodiment, the receiving unit 021 is further configured to receive x sent at the first time by the second base station, where x is the number of first data blocks sent at the second time by the second base station to the UE; as shown in FIG. 20, the base station 02 may further include an acquiring unit 024, configured to: before the second time, acquire the x first data blocks from a service whose service type is non-delay-sensitive data in the service, and the sending unit 022 sends the x first data blocks to the second base station by using the second RLC layer logical channel.

Figure 21:
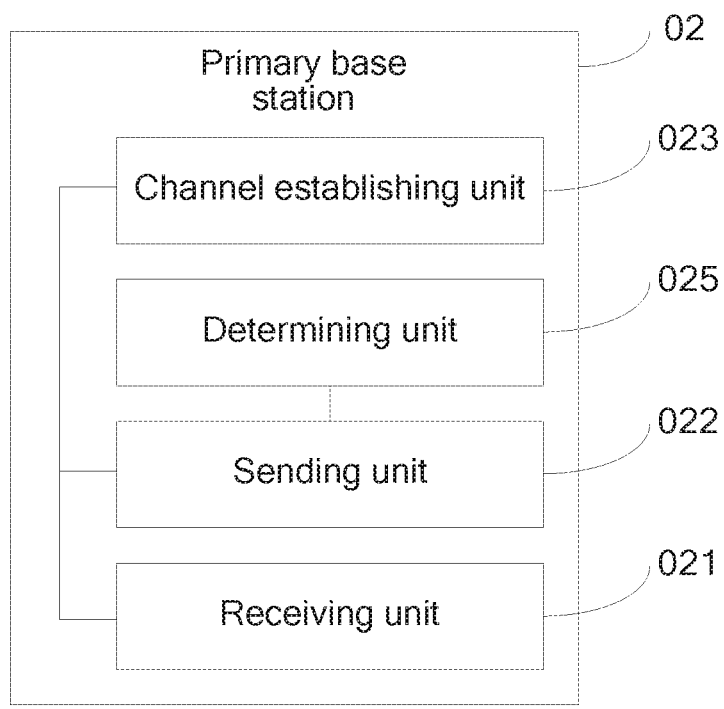
FIG. 21 is a schematic structural diagram of yet another base station according to Embodiment 10 of the present invention.

Optionally, in this embodiment, the receiving unit 021 is further configured to receive a service sent by the gateway; as shown in FIG. 21, the base station 02 further includes a determining unit 025, configured to determine a second PUCCH code channel resource, where the second PUCCH code channel resource is used for sending a feedback for a second data block to the base station 02 by the UE; the sending unit 022 is further configured to send an identifier of the second PUCCH code channel resource and the second data block to the UE by using the first RLC layer logical channel, where the second data block is a data block corresponding to a service whose service type is delay-sensitive in the service.

Optionally, the unidirectional inter-station transmission delay t between the second base station and the base station satisfies the following formula:

$$t=t1*A+B,$$

where t1 is a theoretical transmission delay between the base station 02 and the second base station, A is a constant for adjusting t1, and B is an offset constant of t1.

Figure 22:
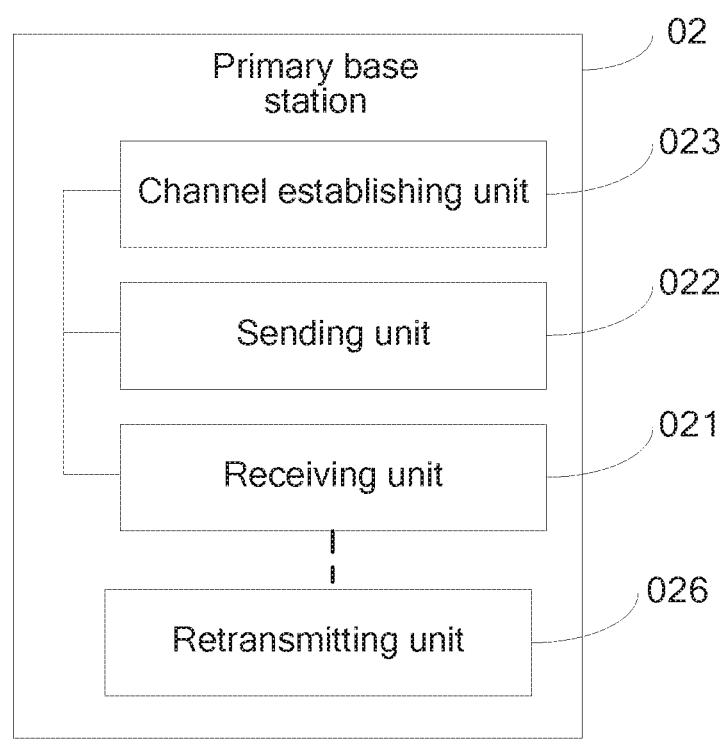
FIG. 22 is a schematic structural diagram of yet another base station according to Embodiment 10 of the present invention.

Optionally, in this embodiment of the present invention, the receiving unit 021 is further configured to: after the base station 02 sends the feedback to the second base station, receive information indicating that retransmission fails and a sequence number corresponding to retransmission data that are sent by the second base station, where the information indicating that the retransmission fails is sent by the second base station to the base station 02 after the feedback includes an NACK and the second base station fails to retransmit the retransmission data to the UE; optionally, as shown in FIG. 22, the base station 02 further includes a retransmitting unit 026, configured to retransmit the retransmission data to the UE, where the retransmission data is a data block, corresponding to the NACK, in the first data block.

Before a second time, a receiving unit receives an identifier of a first PUCCH code channel resource, which ensures that at the second time, that is, when a second base station sends the identifier of the first PUCCH code channel resource and a first data block to a UE, a base station has acquired a demodulation basis for a feedback for the first data block, so that the base station can demodulate and forward the feedback in a timely manner, thereby improving data transmission efficiency.

Embodiment 11

Figure 23:
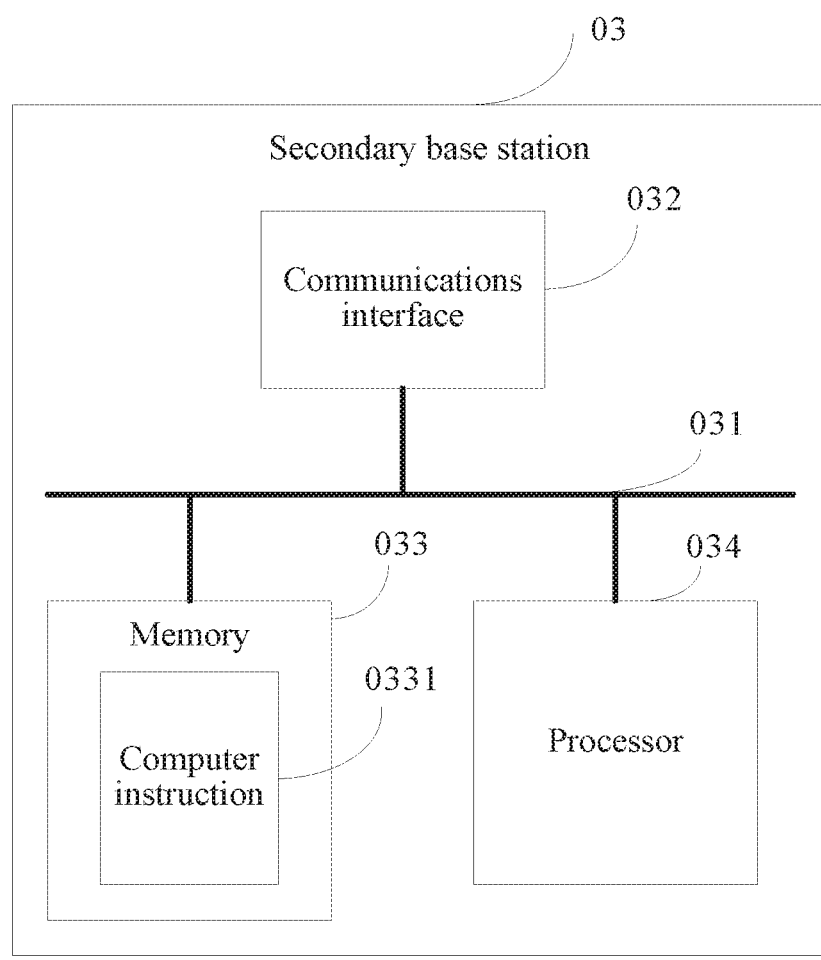
FIG. 23 is a schematic structural diagram of a base station according to Embodiment 11 of the present invention.

This embodiment of the present invention further provides another base station 03. As shown in FIG. 23, the base station 03 includes a bus 031, and a memory 033 and a processor 034 that are connected by using the bus 031. Optionally, the base station 03 further includes a communications interface 032 connected to the bus 031, where the communications interface 032 is configured to communicate with another network element, for example, the processor 034 performs actions including sending, receiving and the like by using the communications interface 032.

In this embodiment, the memory 033 is configured to store a computer instruction 0331; the processor 034 executes the computer instruction 0331 to:

send an identifier of a first physical uplink control channel PUCCH code channel resource to a first base station at a first time, so that the first base station determines to receive, by using the first PUCCH code channel resource, a feedback, for a first data block, sent by a user equipment UE;

send the identifier of the first PUCCH code channel resource and the first data block to the UE at a second time; and receive the feedback from the first base station, where the feedback is received by the first base station from the UE by using the first PUCCH code channel resource, where the second time is later than the first time, an interval T between the second time and the first time is greater than or equal to one transmission delay t between the base station 03 and the first base station, the base station 03 serves a secondary component carrier of the UE, and the first base station serves a primary component carrier of the UE.

Optionally, the processor 034 executes the computer instruction 0331 to further:

before the first time, determine x, where x is the number of first data blocks, and receive and temporarily store a service sent by the first base station, and before the second time, acquire the x first data blocks from the temporarily stored service; or before the first time, determine x, where x is the number of first data blocks; send x to the first base station at the first time; and before the second time, receive the x first data blocks sent by the first base station.

Optionally, the processor 034 executes the computer instruction 0331 to:

when a first condition is satisfied, acquire the x first data blocks from the temporarily stored service, or send x to the first base station, where the first condition includes: A priority of the UE is higher than a priority of another UE accessing the base station 03; optionally, the first condition further includes: A priority of the service is higher than a priority of a message that is sent by the base station 03 to the another UE accessing the base station 03.

Optionally, the unidirectional inter-station transmission delay t between the base station and the first base station satisfies the following formula:

$t=t1*A+B$, where t1 is a theoretical transmission delay between the first base station and the base station 03, A is a constant for adjusting t1, and B is an offset constant of t1.

Optionally, the processor 034 executes the computer instruction 0331 to further:

if the feedback includes a negative acknowledgement NACK, retransmit retransmission data to the UE, where the retransmission data includes a data block, corresponding to the NACK, in the first data block;

determine whether the retransmission fails; and if it is determined that the retransmission fails, send information indicating that the retransmission fails and a sequence number corresponding to the retransmission data to the first base station, where the information indicating that the retransmission fails is used for triggering the first base station to retransmit the retransmission data to the UE.

Optionally, the processor 034 executes the computer instruction 0331 to:

if the feedback is received by the base station 03 from the first base station within a preset time period, and the feedback includes an NACK, retransmit retransmission data to the UE in an automatic repeat request ARQ manner, where the retransmission data includes a data block, corresponding to the NACK, in the first data block.

Optionally, the base station 03 further includes a first HARQ buffer and a second HARQ buffer, for example, the memory further includes the first HARQ buffer and the second HARQ buffer. Correspondingly, the processor 034 executes the computer instruction 0331 to:

if the feedback includes a negative acknowledgement NACK, and statuses of all HARQ processes in the first HARQ buffer are occupied states, retransmit retransmission data to the UE by using an HARQ process in the second HARQ buffer, where the retransmission data includes a data block, corresponding to the NACK, in the first data block, where, optionally, process numbers of the HARQ processes in the first HARQ buffer correspond to process numbers of HARQ processes in the second HARQ buffer in a one-to-one manner.

If an HARQ process having a process number y in the first HARQ buffer is used for sending the first data block to the UE, the processor 034 executes the computer instruction 0331 to:

if a status of an HARQ process having the process number y in the second HARQ buffer is an occupied state, retransmit the retransmission data to the UE by using another process in the second HARQ buffer, and send a downlink scheduling authorization message to the UE, where the downlink scheduling authorization message carries an NDI value, the another process is different from the HARQ process having the process number y in the second HARQ buffer, a status of the another process is an idle state, and the NDI value is different from an NDI value previously sent by the base station to the UE, or if a status of an HARQ process having the process number y in the second HARQ buffer is an idle state, retransmit the retransmission data to the UE by using the HARQ process having the process number y in the second HARQ buffer, and send a downlink scheduling authorization message to the UE, where the downlink scheduling authorization message carries an NDI value, and the NDI value is the same as an NDI value previously sent by the base station to the UE.

In this way, a processor sends an identifier of a first PUCCH code channel resource to a first base station at a first time; therefore, the first base station receives the identifier of the first PUCCH code channel resource at an intermediate time between the first time and a second time, which ensures that, at the second time, that is, when a base station sends the identifier of the first PUCCH code channel resource and a first data block to a UE, the first base station has acquired a demodulation basis for a feedback for the first data block, so that the first base station can demodulate and forward the feedback in a timely manner, thereby improving data transmission efficiency.

Embodiment 12

Figure 24:
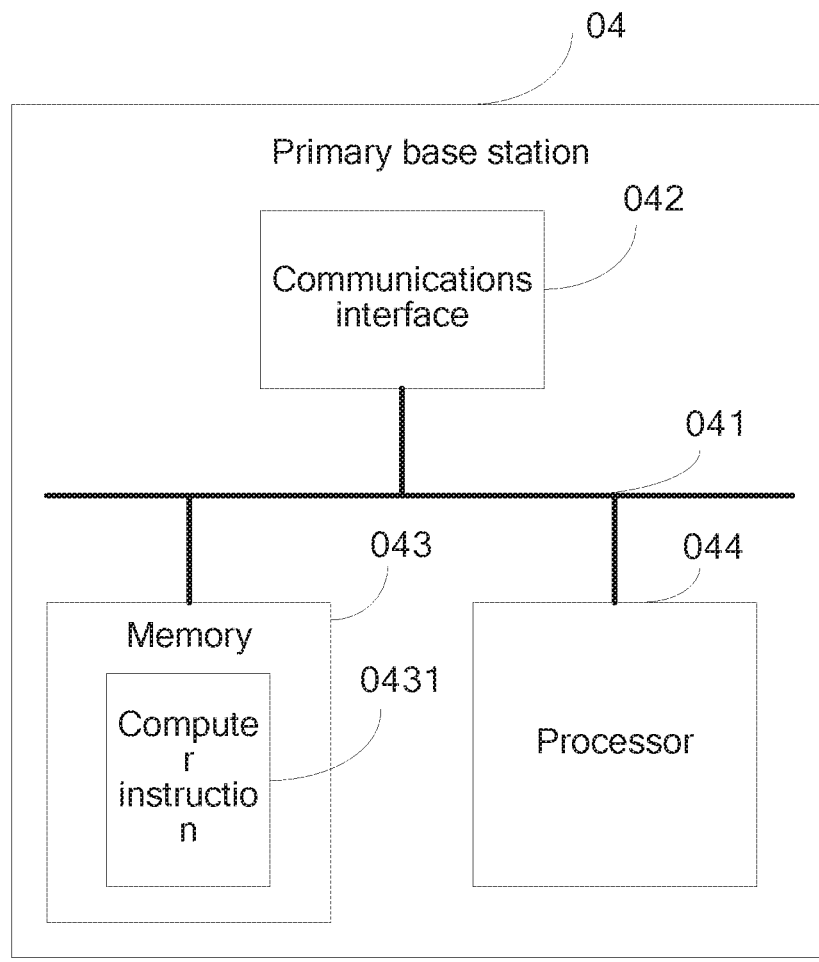
FIG. 24 is a schematic structural diagram of a base station according to Embodiment 12 of the present invention.

This embodiment of the present invention provides a base station 04. As shown in FIG. 24, the base station 04 includes a bus 041, and a memory 043 and a processor 044 that are connected by using the bus 041. Optionally, the base station 04 further includes a communications interface 042 connected to the bus 041, where the communications interface 042 is configured to communicate with another network element, for example, the processor 044 performs actions including sending, receiving and the like by using the communications interface 042.

In this embodiment, the memory 043 is configured to store a computer instruction 0431; the processor 043 executes the computer instruction 0431 to:

receive an identifier of a first physical uplink control channel PUCCH code channel resource sent at a first time by a second base station;

receive, by using the first PUCCH code channel resource, a feedback sent by a user equipment UE, where the feedback is a feedback sent by the UE for a first data block that is sent at a second time by the second base station; and send the feedback to the second base station, where the second time is later than the first time, an interval T between the second time and the first time is greater than or equal to one transmission delay t between the second base station and the base station 04, the second base station serves a secondary component carrier of the UE, and the base station 04 serves a primary component carrier of the UE.

Optionally, the processor 04 executes the computer instruction 0431 to further:

before the first time, receive a service bearer establishment request sent by the UE or a gateway, where the service bearer establishment request is used for requesting establishment of a service bearer among the UE, the gateway and the base station 04; and establish a first Radio Link Control layer RLC layer logical channel and a second RLC layer logical channel, where the first RLC layer logical channel is used for transmission between the base station 04 and the UE, and the second RLC layer logical channel is used for transmission between the base station 04 and the second base station.

Optionally, the processor 044 executes the computer instruction 0431 to further: receive a service sent by the gateway; and before the first time, send a service whose service type is non-delay-sensitive data in the service to the second base station by using the second RLC layer logical channel, or receive x sent at the first time by the second base station, where x is the number of first data blocks sent at the second time by the second base station to the UE, and before the second time, acquire the x first data blocks from a service whose service type is non-delay-sensitive data in the service, and send the x first data blocks to the second base station by using the second RLC layer logical channel.

Optionally, the processor 04 executes the computer instruction 0431 to further: receive a service sent by the gateway; determine a second PUCCH code channel resource, where the second PUCCH code channel resource is used for sending a feedback for a second data block to the base station 04 by the UE; and send an identifier of the second PUCCH code channel resource and the second data block to the UE by using the first RLC layer logical channel, where the second data block is a data block corresponding to a service whose service type is delay-sensitive in the service.

Optionally, the unidirectional inter-station transmission delay t between the second base station and the base station 04 satisfies the following formula:

$$t=t1*A+B,$$

where t1 is a theoretical transmission delay between the base station 04 and the second base station, A is a constant for adjusting t1, and B is an offset constant of t1.

Optionally, the processor 04 executes the computer instruction 0431 to further:

after the base station 04 sends the feedback to the second base station, receive information indicating that retransmission fails and a sequence number corresponding to retransmission data that are sent by the second base station, where the information indicating that the retransmission fails is sent by the second base station to the base station 04 after the feedback includes an NACK and the second base station fails to retransmit the retransmission data to the UE; and retransmit the retransmission data to the UE, where the retransmission data is a data block, corresponding to the NACK, in the first data block.

In this way, a processor receives an identifier of a first PUCCH code channel resource before a second time, which ensures that at the second time, that is, when a second base station sends the identifier of the first PUCCH code channel resource and a first data block to a UE, a base station has acquired a demodulation basis for a feedback for the first data block, so that the base station can demodulate and forward the feedback in a timely manner, thereby improving data transmission efficiency.

Embodiment 13

This embodiment of the present invention provides a data transmission system, including any base station described in Embodiment 9 and any base station described in Embodiment 10.

This embodiment of the present invention provides a data transmission system, including any base station described in Embodiment 11 and any base station described in Embodiment 12.

Embodiment 14

Figure 25:
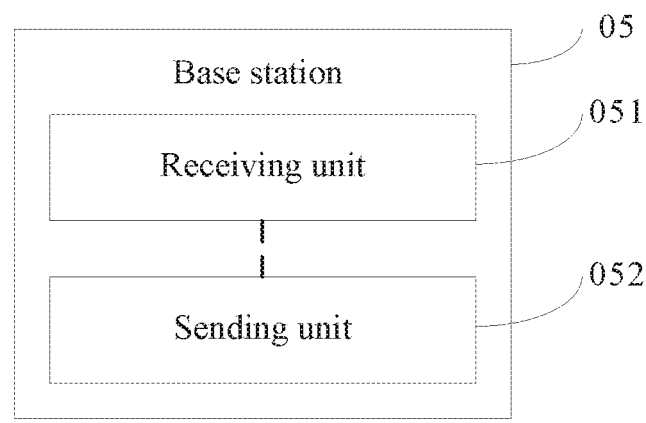
FIG. 25 is a schematic structural diagram of a base station according to Embodiment 14 of the present invention.

This embodiment of the present invention provides a base station 05. As shown in FIG. 25, the base station 05 includes a sending unit 051 and a receiving unit 052, where the sending unit 051 is configured to send first information to a first base station, where the first information includes one of the number x of first physical uplink control channel PUCCH code channel resources, the number x of first data blocks sent by the base station to a user equipment UE, and a first channel code word, so that the first base station determines identifiers of the x first PUCCH code channel resources and the x first data blocks, where the first PUCCH code channel resource is used for sending a feedback for the first data block to the first base station by the UE, and the first channel code word is a channel code word corresponding to the x first data blocks;

the receiving unit 052 is configured to receive the identifiers of the x first PUCCH code channel resources and the x first data blocks that are sent by the first base station;

the sending unit 051 is further configured to send the identifiers of the x first PUCCH code channel resources and the x first data blocks to the UE; and the receiving unit 052 is further configured to receive the feedback from the first base station, where the feedback is received by the first base station from the UE by using the first PUCCH code channel resource, where the base station 05 serves a secondary component carrier of the UE, and the first base station serves a primary component carrier of the UE.

Optionally, the sending unit 051 is specifically configured to: when the base station determines that a priority of the UE is higher than a priority of another UE accessing the base station, send the first information to the first base station.

Figure 26:
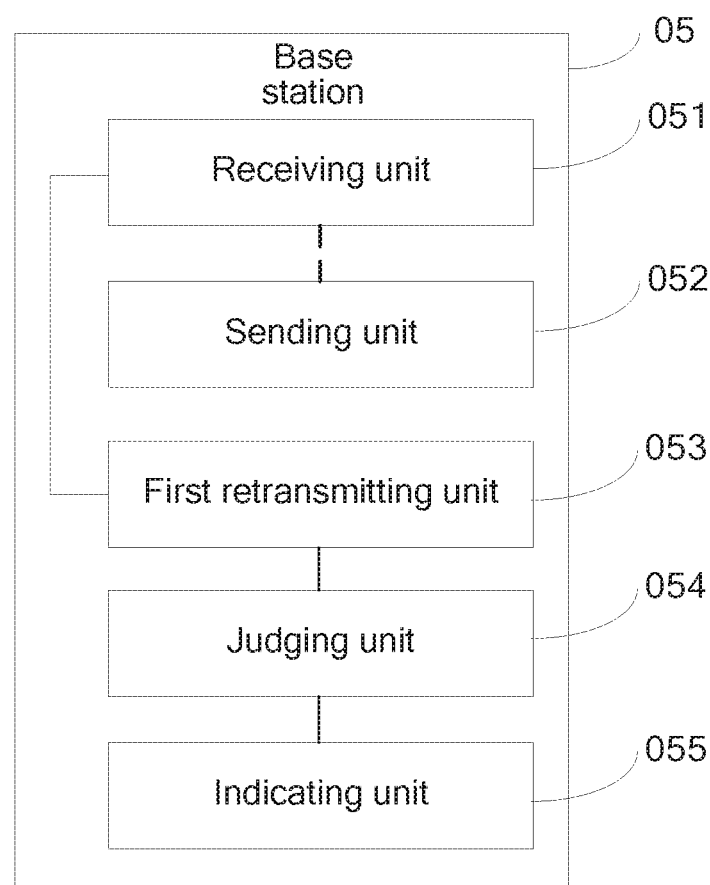
FIG. 26 is a schematic structural diagram of another base station according to Embodiment 14 of the present invention.

Optionally, as shown in FIG. 26, the base station 05 further includes:

a first retransmitting unit 053, configured to: if the feedback includes a negative acknowledgement NACK, retransmit retransmission data to the UE, where the retransmission data includes a data block, corresponding to the NACK, in the x data blocks;

a judging unit 054, configured to determine whether the retransmission fails; and an indicating unit 055, configured to: if it is determined that the retransmission fails, send information indicating that the retransmission fails and a sequence number corresponding to the retransmission data to the first base station, where the information indicating that the retransmission fails is used for triggering the first base station to retransmit the retransmission data to the UE.

Figure 27:
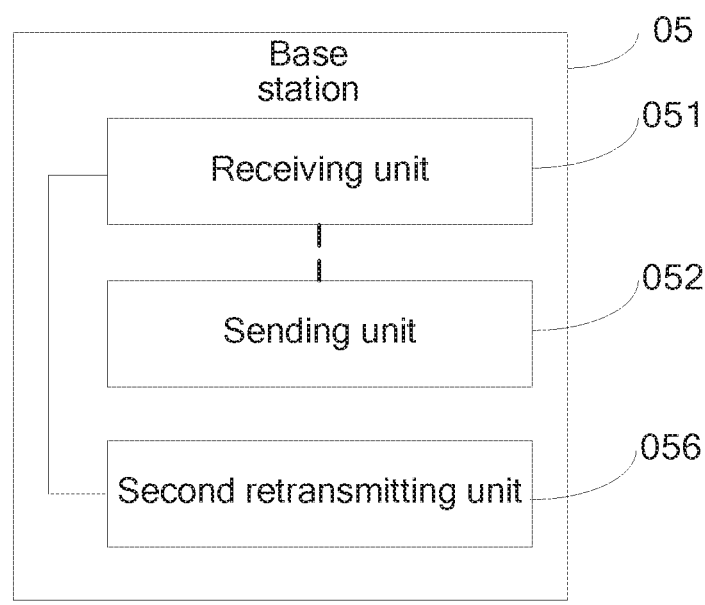
FIG. 27 is a schematic structural diagram of still another base station according to Embodiment 14 of the present invention.

Optionally, as shown in FIG. 27, the base station 05 further includes:

a second retransmitting unit 056, configured to: when the base station receives the feedback from the first base station within a preset time period, and the feedback includes an NACK, retransmit retransmission data to the UE in an automatic repeat request ARQ manner, where the retransmission data includes a data block, corresponding to the NACK, in the x data blocks.

Figure 28:
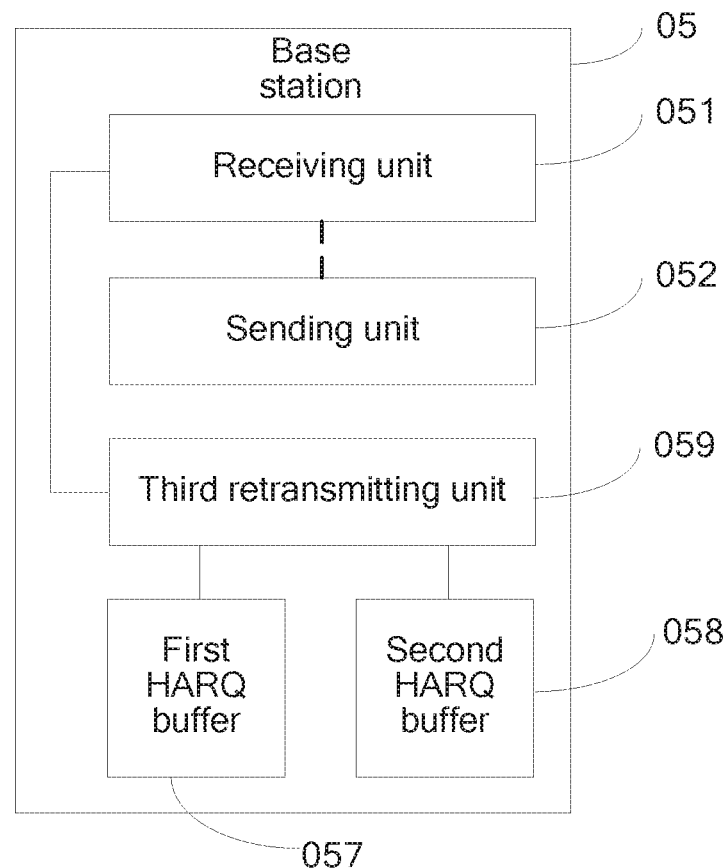
FIG. 28 is a schematic structural diagram of yet another base station according to Embodiment 14 of the present invention.

Optionally, as shown in FIG. 28, the base station 05 further includes a first hybrid automatic repeat request HARQ buffer 057, a second HARQ buffer 058, and a third retransmitting unit 059, where the third retransmitting unit 059 is configured to: when the feedback includes a negative acknowledgement NACK, and statuses of all HARQ processes in the first HARQ buffer 057 are occupied states, retransmit retransmission data to the UE by using an HARQ process in the second HARQ buffer 058, where the retransmission data includes a data block, corresponding to the NACK, in the x data blocks.

Optionally, process numbers of the HARQ processes in the first HARQ buffer 057 correspond to process numbers of HARQ processes in the second HARQ buffer 058 in a one-to-one manner.

If an HARQ process having a process number y in the first HARQ buffer 057 is used for sending the first data block to the UE, the third retransmitting unit 059 is specifically configured to:

if a status of an HARQ process having the process number y in the second HARQ buffer 058 is an occupied state, retransmit the retransmission data to the UE by using another process in the second HARQ buffer 058, and send a downlink scheduling authorization message to the UE, where the downlink scheduling authorization message carries an NDI value, the another process is different from the HARQ process having the process number y in the second HARQ buffer 058, a status of the another process is an idle state, and the NDI value is different from an NDI value previously sent by the base station to the UE; or if a status of an HARQ process having the process number y in the second HARQ buffer 058 is an idle state, retransmit the retransmission data to the UE by using the HARQ process having the process number y in the second HARQ buffer 058, and send a downlink scheduling authorization message to the UE, where the downlink scheduling authorization message carries an NDI value, and the NDI value is the same as an NDI value previously sent by the base station to the UE.

Optionally, the sending unit 051 is further configured to send second information to the first base station, where the second information includes one of the number m of third PUCCH code channel resources, the number m of data blocks of the retransmission data sent by the base station to the UE, and a second channel code word, so that the first base station determines an identifier of the third PUCCH code channel resource, where the third PUCCH code channel resource is used for sending a feedback for the retransmission data to the first base station by the UE, and the second channel code word is a channel code word corresponding to a data block of the retransmission data; correspondingly, the receiving unit 052 is further configured to receive identifiers of the m third PUCCH code channel resources sent by the first base station; the sending unit 051 is further configured to send the identifiers of the m third PUCCH code channel resources to the UE; the receiving unit 052 is further configured to receive the feedback for the retransmission data from the first base station, where the feedback for the retransmission data is received by the first base station from the UE by using the third PUCCH code channel resource.

Optionally, the feedback includes an NACK, and the receiving unit 052 is specifically configured to receive the feedback and an identifier of a third PUCCH code channel resource from the first base station, where the third PUCCH code channel resource is used for sending a feedback for the retransmission data to the first base station by the UE; correspondingly, the sending unit 051 is further configured to send the identifier of the third PUCCH code channel resource to the UE; the receiving unit 052 is further configured to receive the feedback for the retransmission data from the first base station, where the feedback for the retransmission data is received by the first base station from the UE by using the third PUCCH code channel resource.

In this way, a first base station determines identifiers of x first PUCCH code channel resources, and a sending unit sends the identifiers of the x first PUCCH code channel resources and x first data blocks to a UE; therefore, when the first base station receives the identifiers of the first PUCCH code channel resources and the first data blocks, the first base station has acquired a demodulation basis for feedbacks for the first data blocks, so that the first base station can demodulate and forward the feedbacks in a timely manner, thereby improving data transmission efficiency.

Embodiment 15

Figure 29:
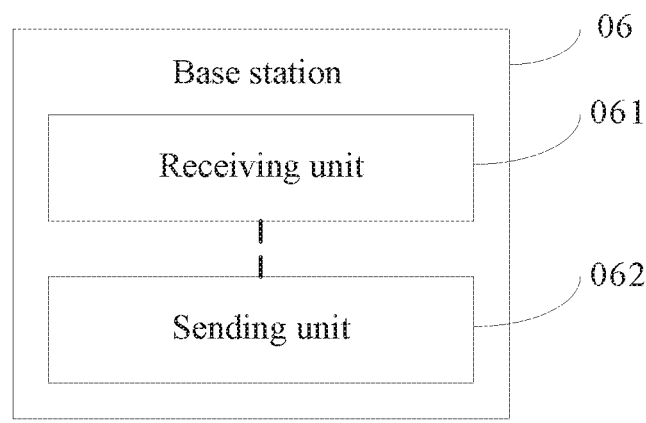
FIG. 29 is a schematic structural diagram of a base station according to Embodiment 15 of the present invention.

This embodiment of the present invention provides a base station 06. As shown in FIG. 29, the base station 06 includes a receiving unit 061 and a sending unit 062, where the receiving unit 061 is configured to receive first information sent by a second base station, where the first information includes one of the number x of first physical uplink control channel PUCCH code channel resources, the number x of first data blocks sent by the second base station to a user equipment UE, and a first channel code word, the first PUCCH code channel resource is used for sending a feedback for the first data block to the base station by the UE, and the first channel code word is a channel code word corresponding to the x first data blocks;

the sending unit 062 is configured to send identifiers of the x first PUCCH code channel resources and the x first data blocks to the second base station, so that the second base station sends the identifiers of the x first PUCCH code channel resources and the x first data blocks to the UE;

the receiving unit 061 is further configured to receive, by using the first PUCCH code channel resource, the feedback sent by the UE; and the sending unit 062 is further configured to send the feedback to the second base station, where the second base station serves a secondary component carrier of the UE, and the base station 06 serves a primary component carrier of the UE.

Figure 30:
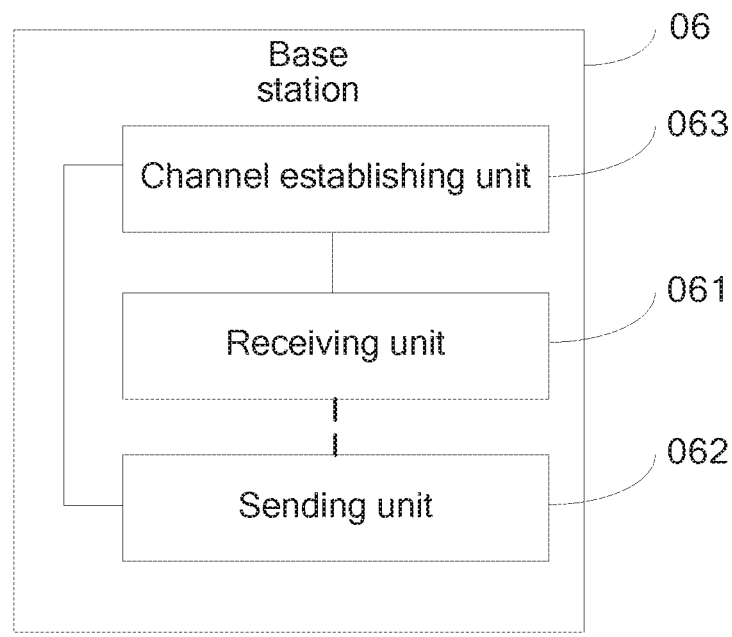
FIG. 30 is a schematic structural diagram of another base station according to Embodiment 15 of the present invention.

Optionally, the receiving unit 061 is further configured to: before receiving the first information sent by the second base station, receive a service bearer establishment request sent by the UE or a gateway, where the service bearer establishment request is used for requesting establishment of a service bearer among the UE, the gateway and the base station; as shown in FIG. 30, the base station 06 further includes: a channel establishing unit 063, configured to establish a first Radio Link Control RLC layer logical channel and a second RLC layer logical channel, where the first RLC layer logical channel is used for transmission between the base station and the UE, and the second RLC layer logical channel is used for transmission between the base station and the second base station.

Figure 31:
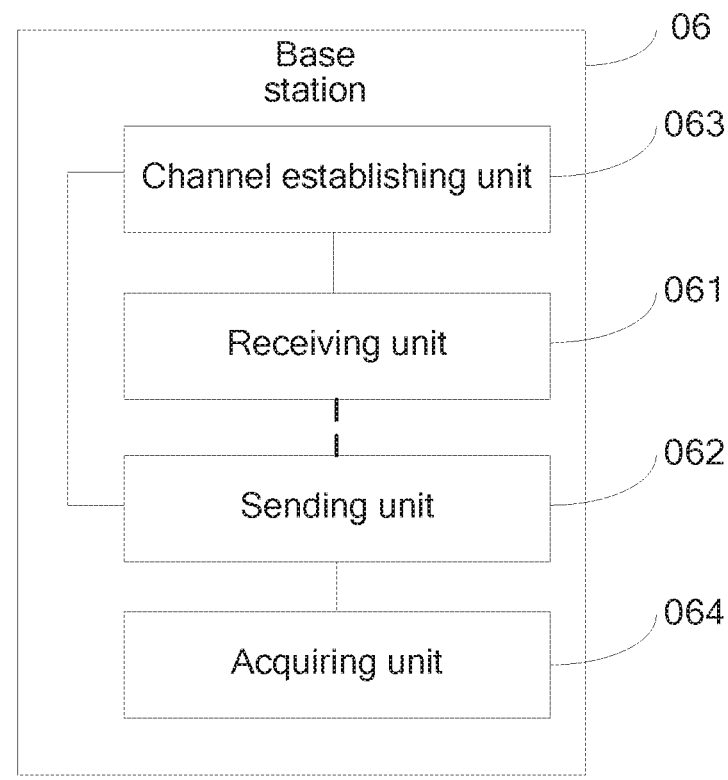
FIG. 31 is a schematic structural diagram of still another base station according to Embodiment 15 of the present invention.

Optionally, the receiving unit 061 is further configured to receive a service sent by the gateway; as shown in FIG. 31, the base station 06 further includes an acquiring unit 064, configured to acquire the x first data blocks from a service whose service type is non-delay-sensitive data in the service, and determine the identifiers of the x first PUCCH code channel resources; correspondingly, that the sending unit 062 is further configured to send the identifiers of the x first PUCCH code channel resources and the x first data blocks to the second base station includes: the sending unit 062 is further configured to send the identifiers of the x first PUCCH code channel resources and the x first data blocks to the second base station by using the second RLC layer logical channel.

Figure 32:
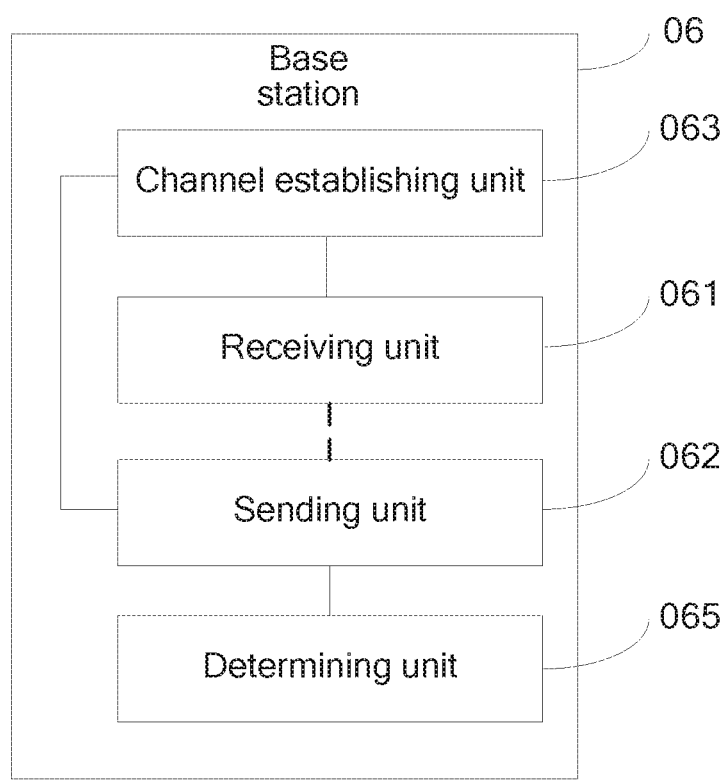
FIG. 32 is a schematic structural diagram of yet another base station according to Embodiment 15 of the present invention.

Optionally, the receiving unit 061 is further configured to receive a service sent by the gateway; as shown in FIG. 32, the base station 06 further includes a determining unit 065, configured to determine an identifier of a second PUCCH code channel resource, where the second PUCCH code channel resource is used for sending a feedback for a second data block to the base station by the UE; correspondingly, the sending unit 062 is further configured to send the identifier of the second PUCCH code channel resource and the second data block to the UE by using the first RLC layer logical channel, where the second data block is a data block corresponding to a service whose service type is delay-sensitive in the service.

Figure 33:
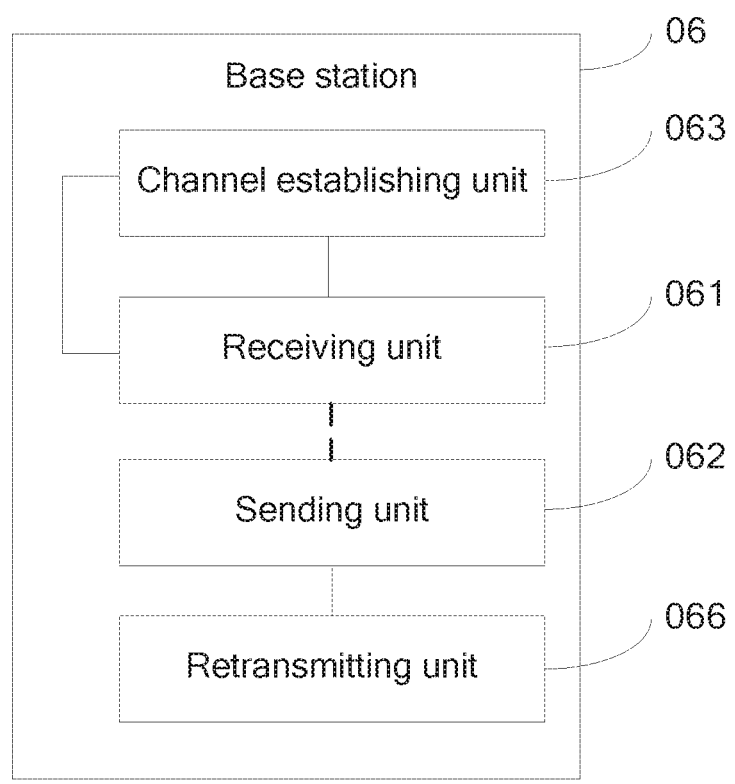
FIG. 33 is a schematic structural diagram of yet another base station according to Embodiment 15 of the present invention.

Optionally, the feedback includes a negative acknowledgement NACK, and after the feedback is sent to the second base station, the receiving unit 061 is further configured to receive information indicating that retransmission fails and a sequence number corresponding to retransmission data that are sent by the second base station, where the information indicating that the retransmission fails is sent by the second base station to the base station after the feedback includes the NACK and the second base station fails to retransmit the retransmission data to the UE; as shown in FIG. 33, the base station 06 further includes a retransmitting unit 066, configured to retransmit the retransmission data to the UE, where the retransmission data includes a data block, corresponding to the NACK, in the x first data blocks.

Optionally, the feedback includes an NACK, and after the feedback is sent to the second base station, the receiving unit 061 is further configured to receive second information sent by the second base station, where the second information includes one of the number m of third PUCCH code channel resources, the number m of data blocks of retransmission data sent by the second base station to the UE, and a second channel code word, the third PUCCH code channel resource is used for sending a feedback for the retransmission data to the base station by the UE, the second channel code word is a channel code word corresponding to a data block of the retransmission data, and the retransmission data includes a data block, corresponding to the NACK, in the x first data blocks; correspondingly, the sending unit 062 is further configured to send identifiers of the m third PUCCH code channel resources to the second base station, so that the second base station sends the identifiers of the m third PUCCH code channel resources to the UE; the receiving unit 061 is further configured to receive the feedback for the retransmission data from the UE by using the third PUCCH code channel resource; the sending unit 062 is further configured to send the feedback for the retransmission data to the second base station.

Optionally, the feedback includes an NACK, and the sending unit 062 is specifically configured to: send the feedback and an identifier of a third PUCCH code channel resource to the second base station, so that the second base station sends the identifier of the third PUCCH code channel resource to the UE, where the third PUCCH code channel resource is used for sending a feedback for retransmission data to the base station by the UE, and the retransmission data includes a data block, corresponding to the NACK, in the x first data blocks, and is sent by the second base station to the UE; correspondingly, the receiving unit 061 is further configured to receive the feedback for the retransmission data from the UE by using the third PUCCH code channel resource; the sending unit 062 is further configured to send the feedback for the retransmission data to the second base station.

In this way, a base station determines identifiers of x first PUCCH code channel resources, and a secondary base station sends the identifiers of the x first PUCCH code channel resources and x first data blocks to a UE; therefore, when a receiving unit receives the identifiers of the first PUCCH code channel resources and the first data blocks, the base station has acquired a demodulation basis for feedbacks for the first data blocks, so that the base station can demodulate and forward the feedbacks in a timely manner, thereby improving data transmission efficiency.

Embodiment 16

Figure 34:
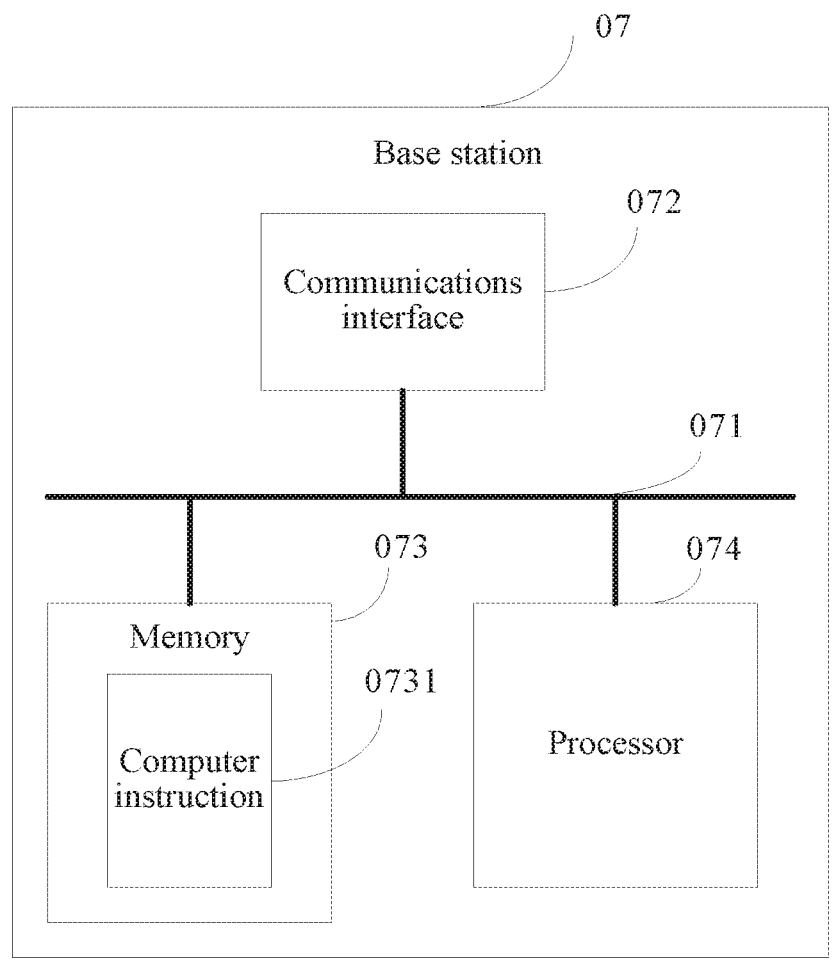
FIG. 34 is a schematic structural diagram of a base station according to Embodiment 16 of the present invention.

This embodiment of the present invention provides a base station 07. As shown in FIG. 34, the base station 07 includes a bus 071, and a memory 073 and a processor 074 that are connected by using the bus 071. Optionally, the base station 07 further includes a communications interface 072 connected to the bus 071, where the communications interface 072 is configured to communicate with another network element, for example, the processor 074 performs actions including sending, receiving and the like by using the communications interface 072.

In this embodiment, the memory 073 is configured to store a computer instruction 0731; the processor 074 executes the computer instruction 0731 to:

send first information to a first base station, where the first information includes one of the number x of first physical uplink control channel PUCCH code channel resources, the number x of first data blocks sent by the base station to a user equipment UE, and a first channel code word, so that the first base station determines identifiers of the x first PUCCH code channel resources and the x first data blocks, where the first PUCCH code channel resource is used for sending a feedback for the first data block to the first base station by the UE, and the first channel code word is a channel code word corresponding to the x first data blocks;

receive the identifiers of the x first PUCCH code channel resources and the x first data blocks that are sent by the first base station;

send the identifiers of the x first PUCCH code channel resources and the x first data blocks to the UE; and receive the feedback from the first base station, where the feedback is received by the first base station from the UE by using the first PUCCH code channel resource, where the base station 07 serves a secondary component carrier of the UE, and the first base station serves a primary component carrier of the UE.

Optionally, the processor 074 executes the computer instruction 0731 to further: when it is determined that a priority of the UE is higher than a priority of another UE accessing the base station 07, send the first information to the first base station.

Optionally, the processor 074 executes the computer instruction 0731 to: if the feedback includes a negative acknowledgement NACK, retransmit retransmission data to the UE, where the retransmission data includes a data block, corresponding to the NACK, in the x data blocks; determine whether the retransmission fails; and if it is determined that the retransmission fails, send information indicating that the retransmission fails and a sequence number corresponding to the retransmission data to the first base station, where the information indicating that the retransmission fails is used for triggering the first base station to retransmit the retransmission data to the UE.

Optionally, the processor 074 executes the computer instruction 0731 to: if the feedback is received from the first base station within a preset time period, and the feedback includes an NACK, retransmit retransmission data to the UE in an automatic repeat request ARQ manner, where the retransmission data includes a data block, corresponding to the NACK, in the x data blocks.

Figure 35:
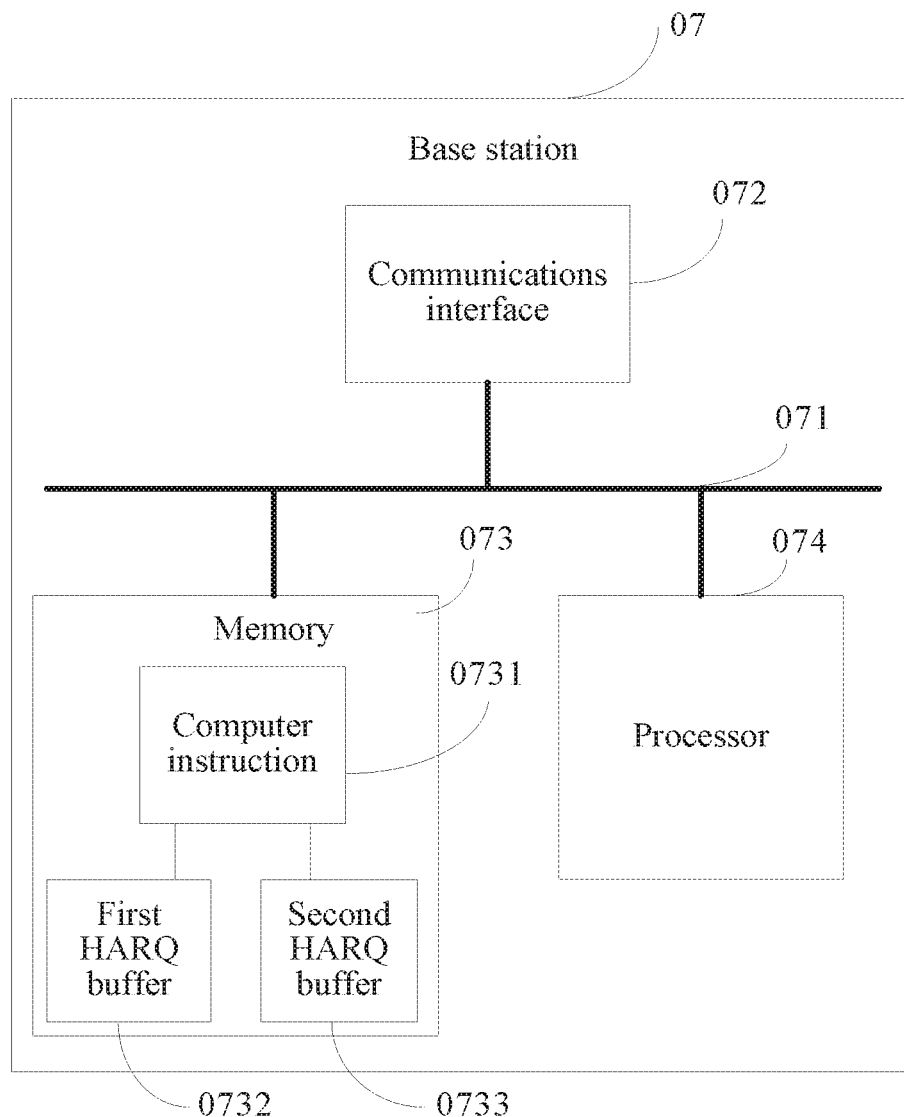
FIG. 35 is a schematic structural diagram of another base station according to Embodiment 16 of the present invention.

Optionally, as shown in FIG. 35, for example, in the memory 073, the base station 07 further includes a first hybrid automatic repeat request HARQ buffer 0732 and a second HARQ buffer 0733; the processor 0731 executes the computer instruction 0731 to: if the feedback includes a negative acknowledgement NACK, and statuses of all HARQ processes in the first HARQ buffer 0732 are occupied states, retransmit retransmission data to the UE by using an HARQ process in the second HARQ buffer 0733, where the retransmission data includes a data block, corresponding to the NACK, in the x data blocks.

Optionally, process numbers of the HARQ processes in the first HARQ buffer 0732 correspond to process numbers of HARQ processes in the second HARQ buffer 0733 in a one-to-one manner; if an HARQ process having a process number y in the first HARQ buffer 0732 is used for sending the first data block to the UE, the processor 074 executes the computer instruction 0731 to:

if a status of an HARQ process having the process number y in the second HARQ buffer 0733 is an occupied state, retransmit the retransmission data to the UE by using another process in the second HARQ buffer 0733, and send a downlink scheduling authorization message to the UE, where the downlink scheduling authorization message carries an NDI value, the another process is different from the HARQ process having the process number y in the second HARQ buffer 0733, a status of the another process is an idle state, and the NDI value is different from an NDI value previously sent by the base station to the UE; or if a status of an HARQ process having the process number y in the second HARQ buffer 0733 is an idle state, retransmit the retransmission data to the UE by using the HARQ process having the process number y in the second HARQ buffer 0733, and send a downlink scheduling authorization message to the UE, where the downlink scheduling authorization message carries an NDI value, and the NDI value is the same as an NDI value previously sent by the base station to the UE.

Optionally, the processor 074 executes the computer instruction 0731 to: send second information to the first base station, where the second information includes one of the number m of third PUCCH code channel resources, the number m of data blocks of the retransmission data sent by the base station to the UE, and a second channel code word, so that the first base station determines an identifier of the third PUCCH code channel resource, where the third PUCCH code channel resource is used for sending a feedback for the retransmission data to the first base station by the UE, and the second channel code word is a channel code word corresponding to a data block of the retransmission data; receive identifiers of the m third PUCCH code channel resources sent by the first base station; send the identifiers of the m third PUCCH code channel resources to the UE; and receive the feedback for the retransmission data from the first base station, where the feedback for the retransmission data is received by the first base station from the UE by using the third PUCCH code channel resource.

Optionally, the feedback includes an NACK, and the processor 074 executes the computer instruction 0731 to specifically: receive the feedback and an identifier of a third PUCCH code channel resource from the first base station, where the third PUCCH code channel resource is used for sending a feedback for the retransmission data to the first base station by the UE; correspondingly, the processor 074 executes the computer instruction 0731 to further: send the identifier of the third PUCCH code channel resource to the UE; and receive the feedback for the retransmission data from the first base station, where the feedback for the retransmission data is received by the first base station from the UE by using the third PUCCH code channel resource.

In this way, a first base station determines identifiers of x first PUCCH code channel resources, and a processor sends the identifiers of the x first PUCCH code channel resources and x first data blocks to a UE; therefore, when the first base station receives the identifiers of the first PUCCH code channel resources and the first data blocks, the first base station has acquired a demodulation basis for feedbacks for the first data blocks, so that the first base station can demodulate and forward the feedbacks in a timely manner, thereby improving data transmission efficiency.

Embodiment 17

Figure 36:
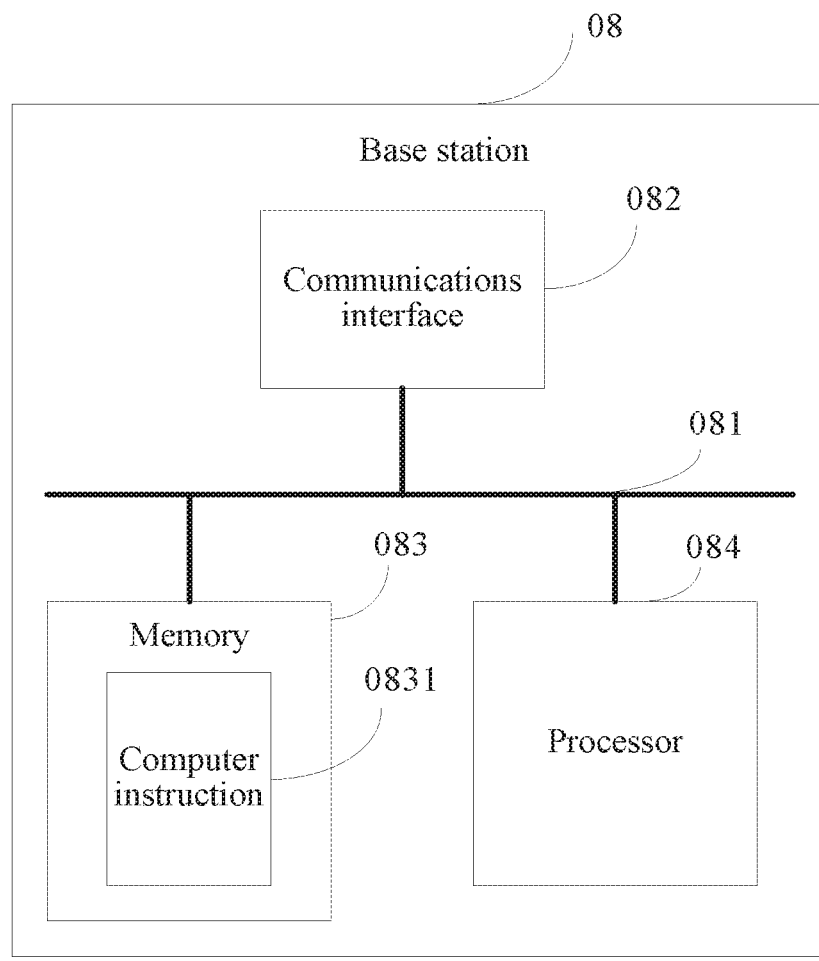
FIG. 36 is a schematic structural diagram of a base station according to Embodiment 17 of the present invention.

This embodiment of the present invention provides a base station 08. As shown in FIG. 36, the base station 08 includes a bus 081, and a memory 083 and a processor 084 that are connected by using the bus 081. Optionally, the base station 08 further includes a communications interface 082 connected to the bus 081, where the communications interface 082 is configured to communicate with another network element, for example, the processor 084 performs actions including sending, receiving and the like by using the communications interface 082.

In this embodiment, the memory 083 is configured to store a computer instruction 0831; the processor 084 executes the computer instruction 0831 to:

receive first information sent by a second base station, where the first information includes one of the number x of first physical uplink control channel PUCCH code channel resources, the number x of first data blocks sent by the second base station to a user equipment UE, and a first channel code word, the first PUCCH code channel resource is used for sending a feedback for the first data block to the base station by the UE, and the first channel code word is a channel code word corresponding to the x first data blocks:

send identifiers of the x first PUCCH code channel resources and the x first data blocks to the second base station, so that the second base station sends the identifiers of the x first PUCCH code channel resources and the x first data blocks to the UE;

receive, by using the first PUCCH code channel resource, the feedback sent by the UE; and send the feedback to the second base station, where the second base station serves a secondary component carrier of the UE, and the base station 08 serves a primary component carrier of the UE.

Optionally, before the base station 08 receives the first information sent by the second base station, the processor 084 executes the computer instruction 0831 to: receive a service bearer establishment request sent by the UE or a gateway, where the service bearer establishment request is used for requesting establishment of a service bearer among the UE, the gateway and the base station; and establish a first Radio Link Control RLC layer logical channel and a second RLC layer logical channel, where the first RLC layer logical channel is used for transmission between the base station and the UE, and the second RLC layer logical channel is used for transmission between the base station and the second base station.

Optionally, the processor 084 executes the computer instruction 0831 to further: receive a service sent by the gateway; acquire the x first data blocks from a service whose service type is non-delay-sensitive data in the service, and determine the identifiers of the x first PUCCH code channel resources; correspondingly, the sending identifiers of the x first PUCCH code channel resources and the x first data blocks to the second base station includes: sending the identifiers of the x first PUCCH code channel resources and the x first data blocks to the second base station by using the second RLC layer logical channel.

Optionally, the processor 084 executes the computer instruction 0831 to further: receive a service sent by the gateway; determine an identifier of a second PUCCH code channel resource, where the second PUCCH code channel resource is used for sending a feedback for a second data block to the base station by the UE; and send the identifier of the second PUCCH code channel resource and the second data block to the UE by using the first RLC layer logical channel, where the second data block is a data block corresponding to a service whose service type is delay-sensitive in the service.

Optionally, the feedback includes a negative acknowledgement NACK, and after the base station sends the feedback to the second base station, the processor 084 executes the computer instruction 0831 to further: receive information indicating that retransmission fails and a sequence number corresponding to retransmission data that are sent by the second base station, where the information indicating that the retransmission fails is sent by the second base station to the base station after the feedback includes the NACK and the second base station fails to retransmit the retransmission data to the UE; and retransmit the retransmission data to the UE, where the retransmission data includes a data block, corresponding to the NACK, in the x first data blocks.

Optionally, the feedback includes an NACK, and after the base station 08 sends the feedback to the second base station, the processor 084 executes the computer instruction 0831 to further: receive second information sent by the second base station, where the second information includes one of the number m of third PUCCH code channel resources, the number m of data blocks of retransmission data sent by the second base station to the UE, and a second channel code word, the third PUCCH code channel resource is used for sending a feedback for the retransmission data to the base station by the UE, the second channel code word is a channel code word corresponding to a data block of the retransmission data, and the retransmission data includes a data block, corresponding to the NACK, in the x first data blocks; send identifiers of the m third PUCCH code channel resources to the second base station, so that the second base station sends the identifiers of the m third PUCCH code channel resources to the UE; receive the feedback for the retransmission data from the UE by using the third PUCCH code channel resource; and send the feedback for the retransmission data to the second base station.

Optionally, the feedback includes an NACK, and the processor 084 executes the computer instruction 0831 to specifically: send the feedback and an identifier of a third PUCCH code channel resource to the second base station, so that the second base station sends the identifier of the third PUCCH code channel resource to the UE, where the third PUCCH code channel resource is used for sending a feedback for retransmission data to the base station by the UE, and the retransmission data includes a data block, corresponding to the NACK, in the x first data blocks, and is sent by the second base station to the UE; correspondingly, the processor executes the computer instruction to further: receive the feedback for the retransmission data from the UE by using the third PUCCH code channel resource; and send the feedback for the retransmission data to the second base station.

In this way, a processor determines identifiers of x first PUCCH code channel resources, and the processor sends the identifiers of the x first PUCCH code channel resources and x first data blocks to a UE; therefore, when the processor receives the identifiers of the first PUCCH code channel resources and the first data blocks, the processor has acquired a demodulation basis for feedbacks for the first data blocks, so that the processor can demodulate and forward the feedbacks in a timely manner, thereby improving data transmission efficiency.

Embodiment 18

This embodiment of the present invention provides a data transmission system, including any base station described in Embodiment 14 and any base station described in Embodiment 15.

This embodiment of the present invention provides a data transmission system, including any base station described in Embodiment 16 and any base station described in Embodiment 17.

Embodiment 19

Figure 37:
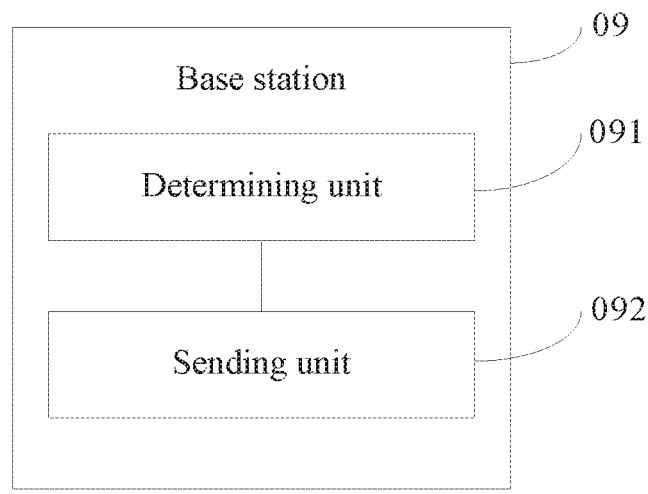
FIG. 37 is a schematic structural diagram of a base station according to Embodiment 19 of the present invention.

This embodiment of the present invention further provides another base station 09. As shown in FIG. 37, the base station 09 includes:

a determining unit 091, configured to determine that statuses of all HARQ processes in a first hybrid automatic repeat request HARQ buffer are occupied states; and a sending unit 092, configured to send a second data block to a user equipment UE by using an HARQ process in an idle state in a second HARQ buffer, where the first HARQ buffer and the second HARQ buffer are different HARQ buffers disposed in the base station.

Optionally, process numbers of the HARQ processes in the first HARQ buffer correspond to process numbers of HARQ processes in the second HARQ buffer in a one-to-one manner.

Figure 38:
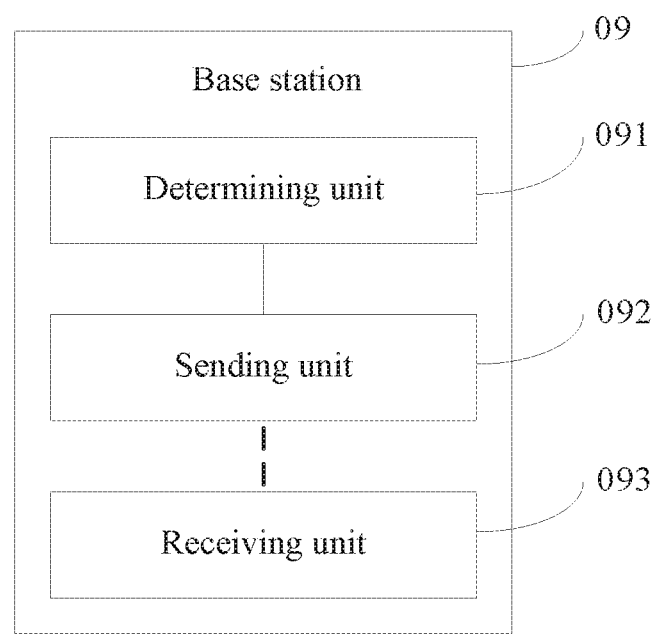
FIG. 38 is a schematic structural diagram of another base station according to Embodiment 19 of the present invention.

Optionally, the sending unit 092 is further configured to: before the base station 09 determines that the statuses of all the HARQ processes in the first HARQ buffer are occupied states, send a first data block to the UE by using an HARQ process having a process number y in the first HARQ buffer; as shown in FIG. 38, the base station 09 further includes: a receiving unit 093, configured to: before the second data block is sent to the UE by using the HARQ process in the idle state in the second HARQ buffer, receive a feedback, for the first data block, of the UE, where if the feedback includes a negative acknowledgement NACK, the second data block is a data block, corresponding to the NACK, in the first data block; or, if the feedback includes an acknowledgement ACK, the second data block is a data block different from the first data block.

Optionally, if the feedback includes an NACK, and a status of an HARQ process having the process number y in the second HARQ buffer is an idle state, the sending unit 092 is specifically configured to send the second data block to the UE by using the HARQ process having the process number y in the second HARQ buffer, and send a downlink scheduling authorization message to the UE, where the downlink scheduling authorization message carries an NDI value, and the NDI value is the same as an NDI value previously sent by the base station to the UE.

Figure 39:
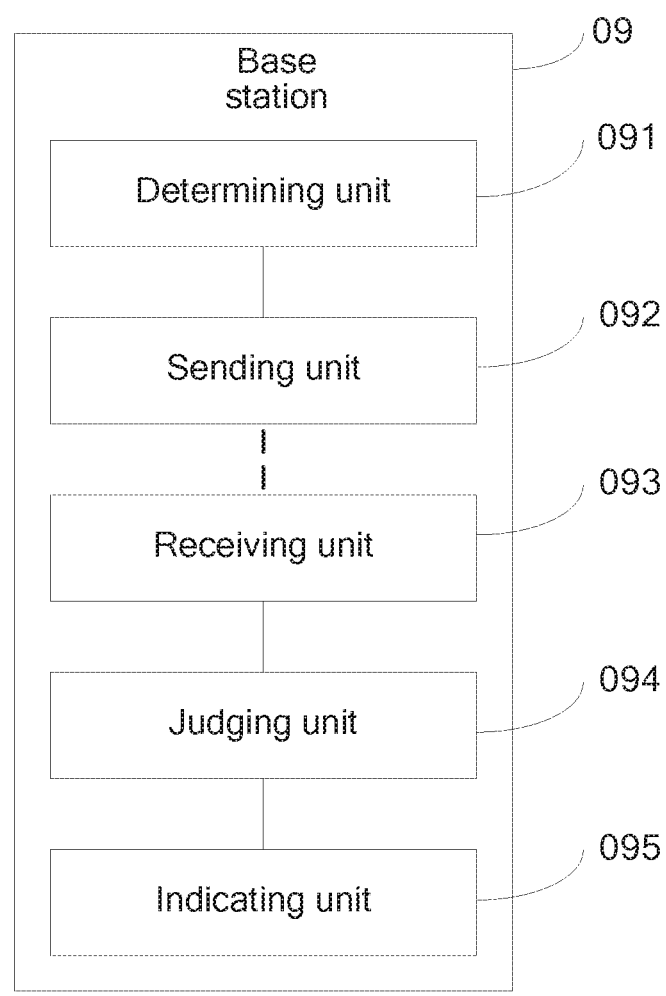
FIG. 39 is a schematic structural diagram of still another base station according to Embodiment 19 of the present invention.

Optionally, if the feedback includes an NACK, as shown in FIG. 39, the base station 09 further includes: a judging unit 094, configured to: after the second data block is sent to the UE by using the HARQ process in the idle state in the second HARQ buffer, determine that the sending of the second data block by using the HARQ process in the idle state in the second HARQ buffer fails; and an indicating unit 095, configured to send information indicating the failure and a sequence number corresponding to the second data block to a first base station, where the information indicating the failure is used for triggering the first base station to retransmit the second data block to the UE, the base station 09 serves a secondary component carrier of the UE, and the first base station serves a primary component carrier of the UE.

Optionally, the receiving unit 093 is specifically configured to: receive the feedback from the first base station, where the feedback is sent by the UE to the first base station by using a first physical uplink control channel PUCCH code channel resource, and an identifier of the first PUCCH code channel resource is determined and sent to the first base station and the UE by the base station; or, an identifier of the first PUCCH code channel resource is received from the first base station after the base station requests allocation of a PUCCH code channel resource from the first base station.

In this way, a first HARQ buffer and a second HARQ buffer are disposed in a second base station to increase the number of HARQ buffers; when statuses of all HARQ processes in the first HARQ buffer are occupied states, a sending unit sends a second data block by using an HARQ process in an idle state in the second HARQ buffer, which reduces a stop and wait phenomenon in a data transmission process, and reduces a delay caused by the stop and wait, thereby improving data transmission efficiency.

Embodiment 20

Figure 40:
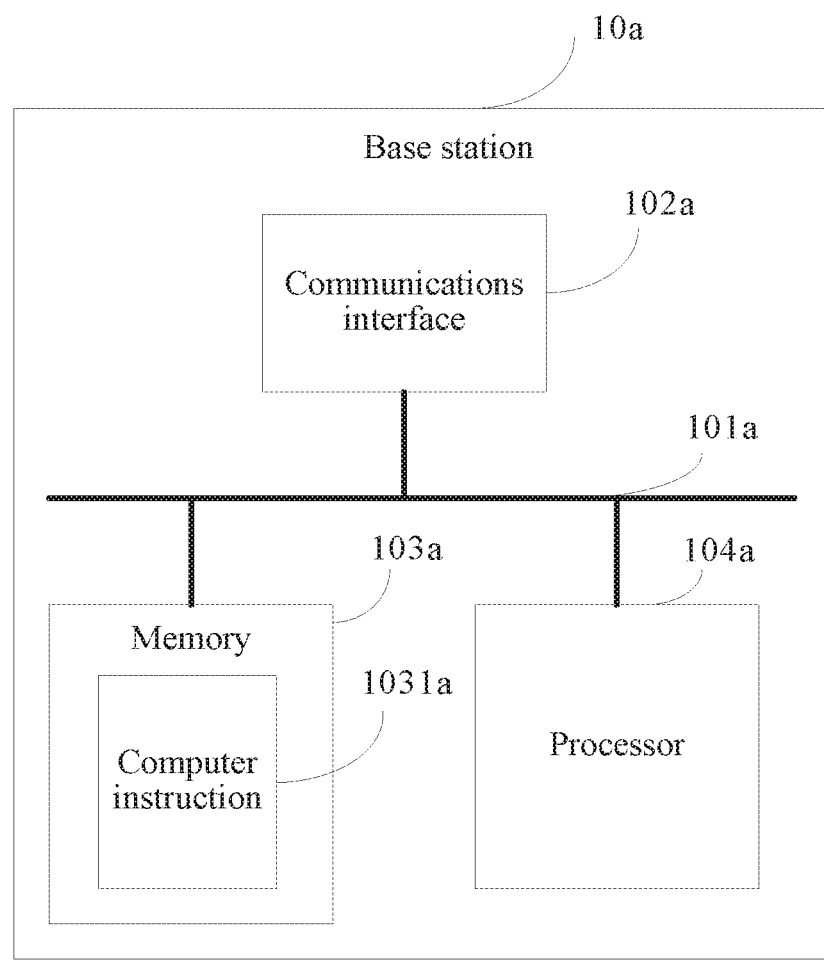
FIG. 40 is a schematic structural diagram of a base station according to Embodiment 20 of the present invention.

This embodiment of the present invention further provides a base station 10*a*. As shown in FIG. 40, the base station 10*a* includes a bus 101*a*, and a memory 103*a* and a processor 104*a* that are connected by using the bus 101*a*. Optionally, the base station 10*a* further includes a communications interface 102*a* connected to the bus 101*a*, where the communications interface 102*a* is configured to communicate with another network element, for example, the processor 104*a* performs actions including sending, receiving and the like by using the communications interface 102*a*.

In this embodiment, the memory 103*a* is configured to store a computer instruction 1031*a*; the processor 104*a* executes the computer instruction 1031*a* to:

determine that statuses of all HARQ processes in a first hybrid automatic repeat request HARQ buffer are occupied states; and send a second data block to a user equipment UE by using an HARQ process in an idle state in a second HARQ buffer, where the first HARQ buffer and the second HARQ buffer are different HARQ buffers disposed in the base station; optionally, the first HARQ buffer and the second HARQ buffer are a part of the memory.

Optionally, process numbers of the HARQ processes in the first HARQ buffer correspond to process numbers of HARQ processes in the second HARQ buffer in a one-to-one manner.

Optionally, the processor 104*a* executes the computer instruction 1031*a* to further: before it is determined that the statuses of all the HARQ processes in the first HARQ buffer are occupied states, send a first data block to the UE by using an HARQ process having a process number y in the first HARQ buffer; before the second data block is sent to the UE by using the HARQ process in the idle state in the second HARQ buffer, receive a feedback, for the first data block, of the UE, where if the feedback includes a negative acknowledgement NACK, the second data block is a data block, corresponding to the NACK, in the first data block; or, if the feedback includes an acknowledgement ACK, the second data block is a data block different from the first data block.

Optionally, if the feedback includes an NACK, and a status of an HARQ process having the process number y in the second HARQ buffer is an idle state, the processor 104*a* executes the computer instruction 1031*a* to specifically: send the second data block to the UE by using the HARQ process having the process number y in the second HARQ buffer, and send a downlink scheduling authorization message to the UE, where the downlink scheduling authorization message carries an NDI value, and the NDI value is the same as an NDI value previously sent by the base station to the UE.

Optionally, if the feedback includes an NACK, after the base station 10*a* sends the second data block to the UE by using the HARQ process in the idle state in the second HARQ buffer, the processor 104*a* executes the computer instruction 1031*a* to further: determine that the sending of the second data block by using the HARQ process in the idle state in the second HARQ buffer fails; and send information indicating the failure and a sequence number corresponding to the second data block to a first base station, where the information indicating the failure is used for triggering the first base station to retransmit the second data block to the UE, the base station 10a serves a secondary component carrier of the UE, and the first base station serves a primary component carrier of the UE.

Optionally, the processor 104a executes the computer instruction 1031a to specifically: receive the feedback from the first base station, where the feedback is sent by the UE to the first base station by using a first physical uplink control channel PUCCH code channel resource, and an identifier of the first PUCCH code channel resource is determined and sent to the first base station and the UE by the base station; or, an identifier of the first PUCCH code channel resource is received from the first base station after the base station requests allocation of a PUCCH code channel resource from the first base station.

In this way, a first HARQ buffer and a second HARQ buffer are disposed in a second base station to increase the number of HARQ buffers; when statuses of all HARQ processes in the first HARQ buffer are occupied states, a processor sends a second data block by using an HARQ process in an idle state in the second HARQ buffer, which reduces a stop and wait phenomenon in a data transmission process, and reduces a delay caused by the stop and wait, thereby improving data transmission efficiency.

Embodiment 21

This embodiment of the present invention provides a data transmission system, including any base station described in Embodiment 20.

This embodiment of the present invention provides a data transmission system, including any base station described in Embodiment 21.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms. For another example, in some accompanying drawings of the embodiments of the present invention, such as in FIG. 12 to FIG. 22, FIG. 25 to FIG. 33, and FIG. 37 to FIG. 39, some units are connected by using a solid line or a dashed line. It may be understood that the solid line represents that units may be connected directly, and the dashed line represents that units may be connected indirectly. Herein, the direct connection refers to that sending and receiving of information can be implemented without forwarding of another unit provided in the embodiments of the present invention, and the indirect connection refers to that sending and receiving or another processing action of information can be implemented by means of forwarding or triggering of another unit provided in the embodiments of the present invention.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

It may be understood that, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method of data transmission, comprising:
sending, by a secondary base station, first information to a primary base station, wherein x denotes a whole number greater than or equal to 1, wherein the first information comprises one of x first PUCCH (physical uplink control channel) code channel resources, x first data blocks sent by the secondary base station to a user equipment (UE), and a first channel code word, so that the primary base station determines identifiers of the x first PUCCH code channel resources and the x first data blocks, wherein the first PUCCH code channel resource is used for sending a feedback for the first data block to the primary base station by the UE, and wherein the first channel code word is a channel code word corresponding to the x first data blocks;
receiving, by the secondary base station, the identifiers of the x first PUCCH code channel resources and the x first data blocks that are sent by the primary base station;
sending, by the secondary base station, the identifiers of the x first PUCCH code channel resources and the x first data blocks to the UE; and
receiving, by the secondary base station, the feedback from the primary base station, wherein the feedback is received by the primary base station from the UE by using the first PUCCH code channel resource, wherein the secondary base station serves a secondary component carrier of the UE, and the primary base station serves a primary component carrier of the UE.

2. The method according to claim 1, wherein the sending, by the secondary base station, first information to a the primary base station comprises:
when the secondary base station determines that a priority of the UE is higher than a priority of another UE accessing the secondary base station, sending, by the secondary base station, the first information to the primary base station.

3. The method according to claim 1, wherein the method further comprises:
if the feedback comprises a negative acknowledgement (NACK), retransmitting, by the secondary base station, retransmission data to the UE, wherein the retransmission data comprises a data block, corresponding to the NACK, in the x data blocks;
determining, by the secondary base station, whether the retransmission fails; and
if the secondary base station determines that the retransmission fails, sending, by the secondary base station, information indicating that the retransmission fails and a sequence number corresponding to the retransmission data to the primary base station, wherein the information indicating that the retransmission fails is used for triggering the primary base station to retransmit the retransmission data to the UE.

4. The method according to claim 3, wherein the method further comprises:
sending, by the secondary base station, second information to the primary base station, wherein the second information comprises one of a number m of third PUCCH code channel resources, the number m of data blocks of the retransmission data sent by the secondary base station to the UE, and a second channel code word, so that the primary base station determines an identifier of the third PUCCH code channel resource, the third PUCCH code channel resource is used for sending a feedback for the retransmission data to the primary base station by the UE, and the second channel code word is a channel code word corresponding to a data block of the retransmission data;
receiving, by the secondary base station, identifiers of the m third PUCCH code channel resources sent by the primary base station;
sending, by the secondary base station, the identifiers of the m third PUCCH code channel resources to the UE; and
receiving, by the secondary base station, the feedback for the retransmission data from the primary base station, wherein the feedback for the retransmission data is received by the primary base station from the UE by using the third PUCCH code channel resource.

5. The method according to claim 3, wherein the feedback comprises the NACK, and wherein the receiving, by the secondary base station, the feedback from the primary base station comprises:
receiving, by the secondary base station, the feedback and an identifier of a third PUCCH code channel resource from the primary base station, wherein the third PUCCH code channel resource is used for sending a feedback for the retransmission data to the primary base station by the UE; and
the method further comprises:
sending, by the secondary base station, the identifier of the third PUCCH code channel resource to the UE; and receiving, by the secondary base station, the feedback for the retransmission data from the primary base station, wherein the feedback for the retransmission data is received by the primary base station from the UE by using the third PUCCH code channel resource.

6. The method according to claim 1, wherein if the secondary base station receives the feedback from the primary base station within a preset time period, and the feedback comprises a negative acknowledgement (NACK), the method further comprises:
retransmitting, by the secondary base station, retransmission data to the UE in an automatic repeat request (ARQ) manner, wherein the retransmission data comprises a data block, corresponding to the NACK, in the x data blocks.

7. The method according to claim 1, wherein a first hybrid automatic repeat request (HARQ) buffer and a second HARQ buffer are disposed in the secondary base station, and wherein the method further comprises:
if the feedback comprises a negative acknowledgement (NACK), and statuses of all HARQ processes in the first HARQ buffer are occupied states, retransmitting, by the secondary base station, retransmission data to the UE by using a HARQ process in the second HARQ buffer, wherein the retransmission data comprises a data block, corresponding to the NACK, in the x data blocks.

8. The method according to claim 7, wherein:
process numbers of the HARQ processes in the first HARQ buffer correspond to process numbers of HARQ processes in the second HARQ buffer in a one-to-one manner;
if an HARQ process having a process number y in the first HARQ buffer is used for sending the first data block to the UE, the retransmitting, by the secondary base station, retransmission data to the UE by using an HARQ process in the second HARQ buffer comprises:
if a status of an HARQ process having the process number y in the second HARQ buffer is an occupied state, retransmitting, by the secondary base station, the retransmission data to the UE by using another process in the second HARQ buffer, and sending a downlink scheduling authorization message to the UE, wherein the downlink scheduling authorization message carries an a new data indicator (NDI) value, the another process is different from the HARQ process having the process number y in the second HARQ buffer, a status of the another process is an idle state, and the NDI value is different from an NDI value previously sent by the secondary base station to the UE; or,
if a status of an HARQ process having the process number y in the second HARQ buffer is an idle state, retransmitting, by the secondary base station, the retransmission data to the UE by using the HARQ process having the process number y in the second HARQ buffer, and sending a downlink scheduling authorization message to the UE, wherein the downlink scheduling authorization message carries the NDI value, and the NDI value is the same as the NDI value previously sent by the secondary base station to the UE.

9. A method of data transmission, comprising:
receiving, by a primary base station, first information sent by a secondary base station, wherein x denotes a whole number greater than or equal to 1, wherein the first information comprises one of x first PUCCH (physical uplink control channel) code channel resources, the x first data blocks sent by the secondary base station to a user equipment (UE), and a first channel code word, wherein the first PUCCH code channel resource is used for sending a feedback for the first data block to the primary base station by the UE, and wherein the first channel code word is a channel code word corresponding to the x first data blocks;

sending, by the primary base station, identifiers of the x first PUCCH code channel resources and the x first data blocks to the secondary base station, so that the secondary base station sends the identifiers of the x first PUCCH code channel resources and the x first data blocks to the UE;

receiving, by the primary base station by using the first PUCCH code channel resource, the feedback sent by the UE; and sending, by the primary base station, the feedback to the secondary base station, wherein the secondary base station serves a secondary component carrier of the UE, and the primary base station serves a primary component carrier of the UE.

10. The method according to claim 9, wherein before the receiving, by the primary base station, first information sent by the secondary base station, the method further comprises:

receiving, by the primary base station, a service bearer establishment request sent by the UE or a gateway, wherein the service bearer establishment request is used for requesting establishment of a service bearer among the UE, the gateway and the primary base station; and establishing, by the primary base station, a first Radio Link Control (RLC) layer logical channel and a second RLC layer logical channel, wherein the first RLC layer logical channel is used for transmission between the primary base station and the UE, and the second RLC layer logical channel is used for transmission between the primary base station and the secondary base station.

11. The method according to claim 10, wherein the method further comprises:

receiving, by the primary base station, a service sent by the gateway; and acquiring, by the primary base station, the x first data blocks from a service whose service type is non-delay-sensitive data in the service, and determining the identifiers of the x first PUCCH code channel resources; and wherein the sending, by the primary base station, identifiers of the x first PUCCH code channel resources and the x first data blocks to the secondary base station comprises:

sending, by the primary base station, the identifiers of the x first PUCCH code channel resources and the x first data blocks to the secondary base station by using the second RLC layer logical channel.

12. The method according to claim 10, wherein the method further comprises:

receiving, by the primary base station, the service sent by the gateway;

determining, by the primary base station, an identifier of a second PUCCH code channel resource, wherein the second PUCCH code channel resource is used for sending a feedback for a second data block to the primary base station by the UE; and sending, by the primary base station, the identifier of the second PUCCH code channel resource and the second data block to the UE by using the first RLC layer logical channel, wherein the second data block is a data block corresponding to a service whose service type is delay-sensitive in the service.

13. The method according to claim 9, wherein the feedback comprises a negative acknowledgement (NACK), and after the sending, by the primary base station, the feedback to the secondary base station, the method further comprises:

receiving, by the primary base station, information indicating that retransmission fails and a sequence number corresponding to retransmission data that are sent by the secondary base station, wherein the information indicating that the retransmission fails is sent by the secondary base station to the primary base station after the feedback comprises the NACK and the secondary base station fails to retransmit the retransmission data to the UE; and retransmitting, by the primary base station, the retransmission data to the UE, wherein the retransmission data comprises a data block, corresponding to the NACK, in the x first data blocks.

14. The method according to claim 9, wherein the feedback comprises a negative acknowledgement (NACK), and after the sending, by the primary base station, the feedback to the secondary base station, the method further comprises:

receiving, by the primary base station, second information sent by the secondary base station, wherein the second information comprises one of a number m of third PUCCH code channel resources, the number m of data blocks of retransmission data sent by the secondary base station to the UE, and a second channel code word, the third PUCCH code channel resource is used for sending a feedback for the retransmission data to the primary base station by the UE, the second channel code word is a channel code word corresponding to a data block of the retransmission data, and the retransmission data comprises a data block, corresponding to the NACK, in the x first data blocks;

sending, by the primary base station, identifiers of the m third PUCCH code channel resources to the secondary base station, so that the secondary base station sends the identifiers of the m third PUCCH code channel resources to the UE;

receiving, by the primary base station, the feedback for the retransmission data from the UE by using the third PUCCH code channel resource; and sending, by the primary base station, the feedback for the retransmission data to the secondary base station.

15. The method according to claim 9, wherein the feedback comprises a negative acknowledgement (NACK), and the sending, by the primary base station, the feedback to the secondary base station comprises:

sending, by the primary base station, the feedback and an identifier of a third PUCCH code channel resource to the secondary base station, so that the secondary base station sends the identifier of the third PUCCH code channel resource to the UE, wherein the third PUCCH code channel resource is used for sending a feedback for retransmission data to the primary base station by the UE, and the retransmission data comprises a data block, corresponding to the NACK, in the x first data blocks, and is sent by the secondary base station to the UE; and the method further comprises:

receiving, by the primary base station, the feedback for the retransmission data from the UE by using the third PUCCH code channel resource; and sending, by the primary base station, the feedback for the retransmission data to the secondary base station.

16. A base station, comprising:
a bus;
a memory coupled to the bus and configured to store computer instructions; and
a processor coupled to the bus and to execute the computer instructions to:
send first information to a first base station, wherein x denotes a whole number greater than or equal to 1, wherein the first information comprises one of x first PUCCH (physical uplink control channel) code channel resources, the x first data blocks sent by the base station to a user equipment (UE), and a first channel code word, so that the first base station determines identifiers of the x first PUCCH code channel resources and the x first data blocks, wherein the first PUCCH code channel resource is used for sending a feedback for the first data block to the first base station by the UE, and wherein the first channel code word is a channel code word corresponding to the x first data blocks;
receive the identifiers of the x first PUCCH code channel resources and the x first data blocks that are sent by the first base station;
send the identifiers of the x first PUCCH code channel resources and the x first data blocks to the UE; and
receive the feedback from the first base station, wherein the feedback is received by the first base station from the UE by using the first PUCCH code channel resource, wherein
the base station serves a secondary component carrier of the UE, and the first base station serves a primary component carrier of the UE.

17. The base station according to claim 16, wherein the processor executes the computer instructions to further:
when it is determined that a priority of the UE is higher than a priority of another UE accessing the base station, send the first information to the first base station.

18. The base station according to claim 16, wherein the processor executes the computer instructions to:
if the feedback comprises a negative acknowledgement (NACK), retransmit retransmission data to the UE, wherein the retransmission data comprises a data block, corresponding to the NACK, in the x data blocks;
determine whether the retransmission fails; and
if it is determined that the retransmission fails, send information indicating that the retransmission fails and a sequence number corresponding to the retransmission data to the first base station, wherein the information indicating that the retransmission fails is used for triggering the first base station to retransmit the retransmission data to the UE.

19. The base station according to claim 16, wherein the processor executes the computer instructions to:
if the feedback is received from the first base station within a preset time period, and the feedback comprises a negative acknowledgement (NACK), retransmit retransmission data to the UE in an automatic repeat request (ARQ) manner, wherein the retransmission data comprises a data block, corresponding to the NACK, in the x data blocks.

20. The base station according to claim 16, wherein the memory further comprises a first hybrid automatic repeat request (HARQ) buffer and a second HARQ buffer, and the processor executes the computer instructions to:
if the feedback comprises a negative acknowledgement (NACK), and statuses of all HARQ processes in the first HARQ buffer are occupied states, retransmit retransmission data to the UE by using an HARQ process in the second HARQ buffer, wherein the retransmission data comprises a data block, corresponding to the NACK, in the x data blocks.

21. A base station, comprising:
a bus; and
a memory coupled to the bus and configured to store computer instructions; and
a processor coupled to the bus and to execute the computer instructions to:
receive first information sent by a second base station, wherein x denotes a whole number greater than or equal to 1, wherein the first information comprises one of x first PUCCH (physical uplink control channel) code channel resources, x first data blocks sent by the second base station to a user equipment (UE), and a first channel code word, wherein the first PUCCH code channel resource is used for sending a feedback for the first data block to the base station by the UE, and wherein the first channel code word is a channel code word corresponding to the x first data blocks;
send identifiers of the x first PUCCH code channel resources and the x first data blocks to the second base station, so that the second base station sends the identifiers of the x first PUCCH code channel resources and the x first data blocks to the UE;
receive, by using the first PUCCH code channel resource, the feedback sent by the UE; and
send the feedback to the second base station, wherein
the second base station serves a secondary component carrier of the UE, and the base station serves a primary component carrier of the UE.

22. The base station according to claim 21, wherein before the base station receives the first information sent by the second base station, the processor executes the computer instructions to further:
receive a service bearer establishment request sent by the UE or a gateway, wherein the service bearer establishment request is used for requesting establishment of a service bearer among the UE, the gateway and the base station; and
establish a first Radio Link Control (RLC) layer logical channel and a second RLC layer logical channel, wherein the first RLC layer logical channel is used for transmission between the base station and the UE, and the second RLC layer logical channel is used for transmission between the base station and the second base station.

23. The base station according to claim 22, wherein the processor executes the computer instructions to further:
receive a service sent by the gateway; and
acquire the x first data blocks from a service whose service type is non-delay-sensitive data in the service, and determine the identifiers of the x first PUCCH code channel resources; and
wherein the sending identifiers of the x first PUCCH code channel resources and the x first data blocks to the second base station comprises:
sending the identifiers of the x first PUCCH code channel resources and the x first data blocks to the second base station by using the second RLC layer logical channel.

* * * * *